United States Patent
Rosen et al.

(10) Patent No.: US 10,631,380 B2
(45) Date of Patent: **\*Apr. 21, 2020**

(54) INFORMATION AND HUB LIGHTS

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,646

(22) Filed: Feb. 8, 2019

(65) Prior Publication Data

US 2019/0191528 A1 Jun. 20, 2019

Related U.S. Application Data

(63) Continuation of application No. 16/044,073, filed on Jul. 24, 2018, now Pat. No. 10,251,242.

(Continued)

(51) Int. Cl.
*H05B 37/02* (2006.01)
*H04L 12/28* (2006.01)

(52) U.S. Cl.
CPC ....... *H05B 37/0227* (2013.01); *H04L 12/282* (2013.01); *H05B 37/0272* (2013.01)

(58) Field of Classification Search
CPC .. H05B 37/02; H05B 37/0227; H05B 37/029; H04L 12/28; H04L 12/281; H04L 12/2816; H04L 12/282
See application file for complete search history.

(56) References Cited

U.S. PATENT DOCUMENTS 6,147,624 A 11/2000 Clapper
8,283,812 B2 10/2012 Azancot et al.
(Continued)

OTHER PUBLICATIONS

Non-Final Office Action received for U.S. Appl. No. 16/044,047 dated Dec. 26, 2018, 22 pages.
(Continued)

*Primary Examiner* — Thai Pham
(74) *Attorney, Agent, or Firm* — Amin, Turocy & Watson, LLP

(57) ABSTRACT

Techniques for employing an enhanced light device to determine desirable information to a user are presented. Such light device(s) can comprise or be associated with a light management component (LMC) that can employ sensors to monitor respective characteristics or conditions of a device, an environment, and/or a user to determine respective contexts for the device, environment, or user, wherein the user can interact with or be in proximity to the device or environment. The light device(s) collects data, including sensor data, relating to the device or environment from the device, the environment, or other data sources. The LMC determines a desirable subset of information to present to the user based on the respective contexts. The LMC facilitates presenting the desirable subset of information to the user via the light device or a communication device of the user that is communicatively connected to the light device.

20 Claims, 18 Drawing Sheets

Related U.S. Application Data

(60) Provisional application No. 62/636,462, filed on Feb. 28, 2018, provisional application No. 62/568,294, filed on Oct. 4, 2017.

(56) References Cited

U.S. PATENT DOCUMENTS

| | | | |
|---|---|---|---|
| 8,362,713 | B2 | 1/2013 | Recker et al. |
| 8,600,786 | B2 | 12/2013 | Stefik et al. |
| 9,594,956 | B2 | 3/2017 | Cohen et al. |
| 9,644,799 | B2 | 5/2017 | Crayford et al. |
| 10,251,242 | B1 | 4/2019 | Rosen et al. |
| 2002/0171562 | A1 | 11/2002 | Muraki |
| 2005/0248299 | A1* | 11/2005 | Chemel ............... H05B 37/029 315/312 |
| 2010/0007525 | A1 | 1/2010 | Shanbhag et al. |
| 2010/0060485 | A1 | 3/2010 | Kim |
| 2010/0309024 | A1 | 12/2010 | Mimeault |
| 2013/0002587 | A1* | 1/2013 | Biggs ..................... G06F 3/016 345/173 |
| 2013/0073350 | A1 | 3/2013 | Blustein |
| 2015/0195100 | A1* | 7/2015 | Imes ..................... H04L 12/282 455/420 |
| 2015/0286938 | A1 | 10/2015 | Blair et al. |
| 2016/0047164 | A1* | 2/2016 | Lundy ....................... E06B 9/68 160/5 |
| 2016/0085884 | A1* | 3/2016 | Schafer ............. H05B 37/0272 703/1 |
| 2016/0216443 | A1 | 7/2016 | Morgan et al. |
| 2016/0359325 | A1* | 12/2016 | Kawata .................. G16H 40/67 |
| 2017/0073074 | A1 | 3/2017 | Gagnon et al. |
| 2017/0247289 | A1 | 8/2017 | Waldschmidt et al. |
| 2017/0322350 | A1 | 11/2017 | Montagne |
| 2018/0096634 | A1 | 4/2018 | Walker et al. |
| 2018/0156429 | A1 | 6/2018 | Carlet et al. |
| 2018/0211503 | A1* | 7/2018 | Baliga ................. H04L 12/2816 |
| 2018/0216791 | A1 | 8/2018 | Leung et al. |
| 2018/0224596 | A1 | 8/2018 | Creasman et al. |
| 2018/0259141 | A1 | 9/2018 | Yamaguchi et al. |
| 2018/0313660 | A1 | 11/2018 | Eyster et al. |
| 2019/0069379 | A1 | 2/2019 | Kastee et al. |
| 2019/0104181 | A1 | 4/2019 | Rosen et al. |

OTHER PUBLICATIONS

Notice of Allowance received for U.S. Appl. No. 16/044,073 dated Nov. 8, 2018, 20 pages.
Non-Final Office Action received for U.S. Appl. No. 16/043,974 dated May 2, 2019, 28 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/739,627 dated Feb. 7, 2020, 19 pages.

* cited by examiner

INFORMATION AND HUB LIGHTS

CROSS-REFERENCE TO RELATED APPLICATIONS

This application is a continuation of, and claims priority to each of, U.S. patent application Ser. No. 16/044,073, filed on Jul. 24, 2018, entitled "INFORMATION AND HUB LIGHTS", and now issued as U.S. Pat. No. 10,251,242, which claims the benefit of U.S. Provisional Patent Application Ser. No. 62/636,462 filed on Feb. 28, 2018, entitled "INFORMATION AND HUB LIGHTS" and U.S. Provisional Patent Application Ser. No. 62/568,294 filed on Oct. 4, 2017, entitled "SELF AWARE LIGHTS THAT SELF-CONFIGURE." The entireties of the aforementioned applications are incorporated by reference herein.

BACKGROUND

Typical smart lights have limited capabilities focused primarily on basic lighting adjustments, such as changing lighting colors, based on a user's configuration. Furthermore, such smart lights usually can require extensive manual user configuration using applications (e.g. mobile phone apps, computer programs, etc.) that are not intuitive and can involve an undesirable amount of learning on the part of the user.

The above-described description is merely intended to provide a contextual overview relating to lighting devices, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus, and/or computer program products that can facilitate a self-aware light that can perform light and information management are described.

According to one or more embodiments, a system is provided. The system can comprise a light component of an enhanced light device, the light component configured to emit light to facilitate illumination of an area associated with the enhanced light device. The system also can include a memory that stores machine-executable components, and a processor that executes the machine-executable components stored in the memory. The machine-executable components can comprise an information component of the enhanced light device, the information component configured to receive information relating to an environment, a device, or a user located in the environment, wherein at least a portion of the information comprises sensor data received from a sensor component. The machine-executable components also can include a light management component of the enhanced light device, the light management component configured to determine an environment context relating to the environment, a device context relating to the device, or a user context relating to the user, based at least in part on a result of analyzing a first subset of the information, comprising the sensor data, and determine a second subset of the information that relates to the environment or the device to present to the user based at least in part on the environment context, the device context, or the user context.

In accordance with one or more other embodiments, a method is provided. The method can comprise obtaining, by a system comprising a processor, data relating to an environment, a device, or a user located in the environment, wherein at least a portion of the data comprises sensor data received from a set of sensors. The method also can comprise determining, by the system, user characteristics and user conditions associated with the user and at least one of environmental characteristics and environmental conditions associated with the environment or device characteristics and device conditions associated with the device based at least in part on a first result of analyzing the data, wherein the user conditions comprises an interaction of the user with or a proximity of the user to the device or the environment. The method further can include determining, by the system, a subset of the data relating to at least one of the device or the environment based at least in part on a second result of analyzing the user characteristics and the user conditions and at least one of the environmental characteristics and the environmental conditions associated with the environment or the device characteristics and the device conditions associated with the device. The method also can comprise controlling, by the system, emission of light to an area associated with at least one of the device or the environment based at least in part on a third result of the analyzing. The method further can comprise initiating, by the system, presentation of the subset of the data to the user.

In yet one or more other embodiments, a light device is presented. The light device can comprise a light component configured to emit light to facilitate illumination of an area associated with the device. The light device also can include a sensor component configured to comprise one or more sensors configured to sense environment conditions or environment characteristics associated with the area, device conditions or device characteristics associated with a device, or user conditions or user characteristics associated with a user, and generate sensor data based at least in part on the sensing of the environment conditions, the environment characteristics, the device conditions, or the device characteristics. The light device also can include a memory that stores machine-executable components; and a processor that executes the machine-executable components stored in the memory. The machine-executable components can comprise an information component configured to receive information relating to the environment, the device, or the user located in the environment, wherein at least a portion of the information comprises the sensor data received from the sensor component. The machine-executable components also can include a light management component configured to determine an environment context of the environment, a device context of the device, or a user context of the user, based at least in part on a result of analyzing a first subset of the information, comprising the sensor data, and determine a second subset of the information that relates to the environment or the device to communicate to the user based at least in part on the environment context, the device context, or the user context, wherein the user context comprises an interaction of the user with or a proximity of the user to the device or the environment. The light device also can comprise an instrument component configured to communicate the second subset of the information, relating to the environment or the device, to the user via at least one interface of the light device via transmission of the second subset of the information to a communication device associated with the user.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

DETAILED DESCRIPTION

Figure 1:
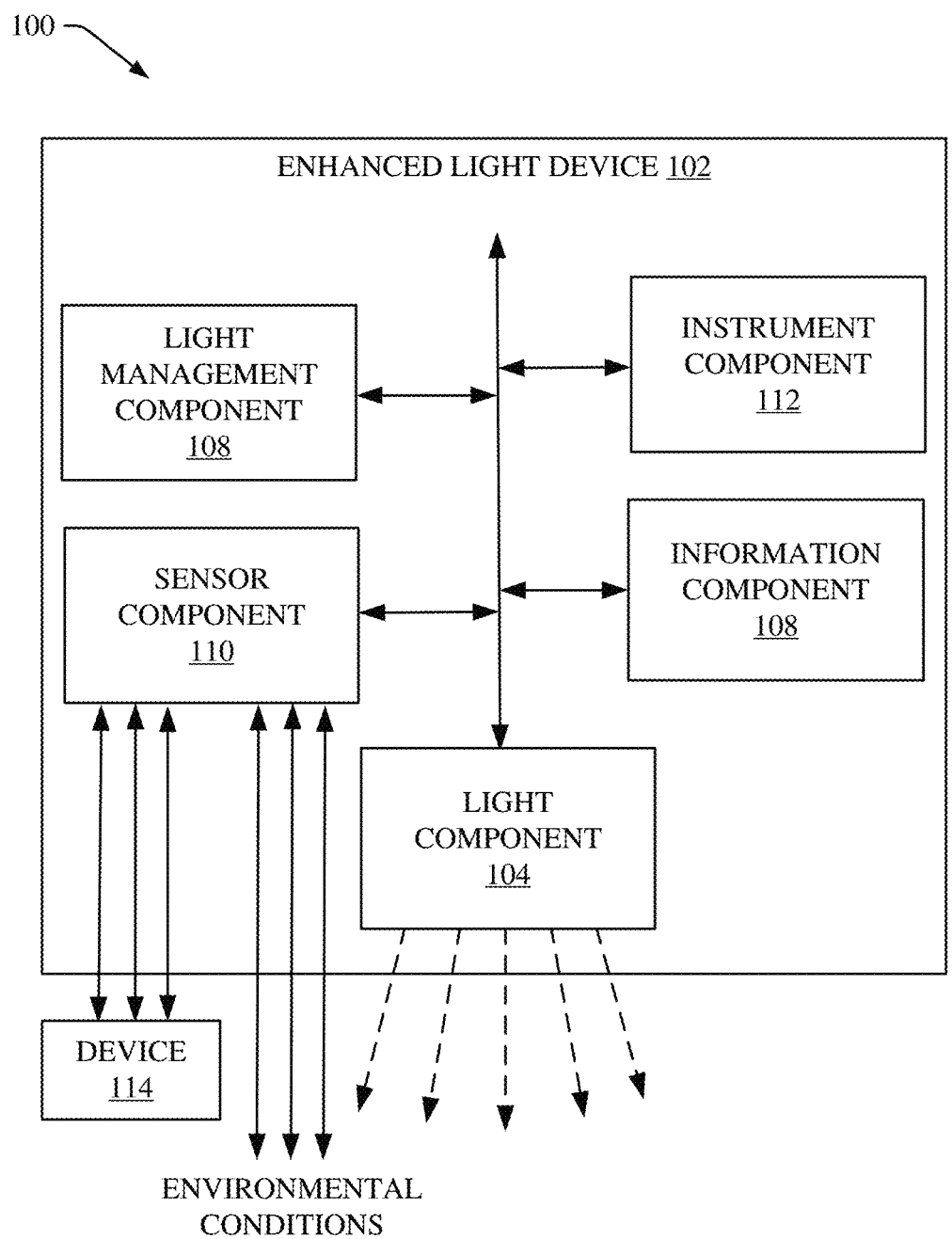
FIG. 1 illustrates a block diagram of an example system for an enhanced light device, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Traditional light devices, can include, for example, standard lights and smart lights that may be employed to adjust lighting conditions. However, standard lights typically are merely capable of being turned on to illuminate or off. Also, typical smart lights generally have relatively limited capabilities that can focus primarily on basic lighting adjustments, such as changing lighting colors, based on a user's configuration. Further, such smart lights usually can require extensive manual user configuration using applications (e.g. mobile phone apps, computer programs, etc.) that are not intuitive and can involve an undesirable amount of learning on the part of the user.

Light devices can be employed in a variety of locations to provide illumination in the areas such light devices are employed (e.g., placed, installed). For instance, light devices can be employed in external areas (e.g., in an open or relatively open area outside of a building or on a street), internal areas (e.g., inside a room, closet, garage, or pantry of a home or other building structure), or on or inside of an appliance or other device (e.g., refrigerator, oven, microwave oven, automobile).

When a person enters an unfamiliar area or interacts with an unfamiliar device, a person often can desire information regarding the unfamiliar area or the unfamiliar device to enable the user to navigate the unfamiliar area or interact with an unfamiliar device. Further, even with regard to areas or devices with which a user is generally familiar, there can be changes in conditions associated with such areas or devices and/or there can be other information (e.g., extrinsic information) that can relate or be relevant to such areas or devices, and a person may desire information regarding such changes in conditions and/or other information relating to such areas or devices.

It can be time consuming, cumbersome, and/or difficult for a person to try to locate an information source (e.g., a manual, another person with knowledge of the area or device) for an area or a device, read information in documents or signs associated with the area or device, and/or search the area or device for desired information.

With light devices being utilized in a variety of locations, it can be desirable and useful to leverage and take advantage of the presence of light devices in such locations to employ light devices to provide desirable (e.g., relevant) information to people in the area in which a light device is located. The disclosed subject matter can provide enhanced (e.g., improved) light devices that provide users with desirable information relating to an area or a device associated with such enhanced light device(s), can provide for an improved user experience, and/or can provide for improved safety and security of users.

In accordance with various aspects and embodiments, techniques for creating, configuring, and employing enhanced light devices for providing desired information relating to associated areas, environments, or devices are presented. An enhanced light device can comprise a light management component that can control and enhance (e.g., improve or optimize) the emission of light, determine desirable information regarding the area, environment, and/or device associated with the enhanced light device, present such desirable information to a user(s), and control other operations associated with the enhanced light device based at least in part on conditions associated with the enhanced light device and/or other enhanced light devices associated with (e.g., in communication with) the enhanced light device and/or user preferences of a user(s) of the enhanced light device. The enhanced light device can comprise a sensor component that can comprise a set of sensors that can sense conditions (e.g., environmental conditions, user conditions) associated with an area or device where the enhanced light device is located and/or a user associated with the enhanced light device. In some embodiments, the enhanced light device can be mobile or movable (e.g., can readily be moved), wherein the area where the enhanced light device is located can change.

The enhanced light device can include a light component that can be associated with (e.g., communicatively connected to) the light management component. The light component can comprise one or more light elements (e.g., one or more light-emitting diodes (LEDS) or other type of light element) that can emit light from the light component. The light management component can control operations of the light component, and can control properties and/or characteristics of the light being emitted from the light component.

The light management component can monitor conditions associated with the area (e.g., the environment), the device, and/or the user. For instance, the light management component can monitor and receive (e.g., from sensors of the sensor component) sensor data relating the conditions associated with the area, the device, and/or the user. The light management component can analyze the sensor data to facilitate determining the conditions associated with the area, device, and/or user, determining a context of the area, device, and/or user, and controlling operations, parameters, characteristics, and/or properties of the enhanced light device based at least in part on the conditions or context associated with the area, device, and/or user. The light management component also can analyze user preferences (e.g., preference data) associated with the user of the enhanced light device.

Based at least in part on the results of the analysis of the sensor data and/or the user preferences, the light management component can determine information regarding the area or device, and/or other information, that can be desired by the user, can facilitate obtaining or generating such information, and can present (e.g., visually or audially via a display or audio speakers) such information to the user. Also, based at least in part on the results of the analysis of the sensor data and/or the user preferences, the light management component can determine and facilitate implementing adjustments to make to operations, parameters, characteristics, and/or properties of the enhanced light device in response to the conditions associated with the area, device, and/or user. To facilitate controlling the operations, parameters, characteristics, and/or properties of the enhanced light device, the light management component can perform adjustments to the operations, parameters, characteristics, and/or properties of the enhanced light device or can communicate instructions to other components (e.g., light component and/or sensor component) to facilitate adjusting respective operations, parameters, characteristics, and/or properties of or associated with respective components of the enhanced light device, wherein the respective components can perform such respective adjustments to the respective operations, parameters, characteristics, and/or properties of or associated with the respective components based at least in part on the instructions.

In some implementations, the light management component of the enhanced light device can determine a device (e.g., refrigerator, oven, microwave oven, automobile) and/or an environment in which the enhanced light device is installed or located, or with which it is otherwise associated, can learn about the device and/or environment, and/or can obtain, determine, and/or store information (e.g., information relating to the device or environment), based at least in part on the results of the analysis of the sensor data. In response to detecting a user in proximity to or interacting with the device, or at another desired time (e.g., prior to detecting the user), the enhanced light device, or the environment, the light management component can determine a context of the user, the device, the enhanced light device, and/or the environment, based at least in part on the results of analyzing sensor data obtained from one or more sensors of the sensor component. The light management component can determine certain information that can be desired by or useful to the user, based at least in part on the context of the user, the device, the enhanced light device, and/or the environment. The light management component can present or facilitate presenting such certain information (e.g., visually, audially, haptically) to the user via a desired interface (e.g., display screen, audio speakers, haptic component) of the enhanced light device or via a communication device (e.g., a mobile phone, a computer, an electronic tablet, an electronic gaming device, a television, electronic eyewear or bodywear, . . . ) associated with (e.g., communicatively connected to) the enhanced light device.

In certain implementations, information, such as information related to the device or environment in which the enhanced light device is to be installed or located, can be pre-loaded into the enhanced light device. The light management component can update (e.g., modify) or supplement the pre-loaded information based at least in part on conditions sensed by the sensor component and/or a context determined for the device, enhanced light device, and/or user. The enhanced light device can be installed in a device as an original installation or a retrofit installation, for example.

In some aspects, the enhanced light device can communicate (e.g., via a communication network) with one or more other enhanced light devices and/or other types of devices (e.g., communication devices, such as mobile phones, computers, electronic pads or tablets, electronic gaming devices, . . . ; a camera; a Wi-Fi or other type of modem; a security system; an appliance; . . . ) to facilitate desirable (e.g., enhanced, improved, optimized, acceptable) function and operation of the enhanced light device and/or the one or more other enhanced light devices to manage light emission or other processing of light in the area(s) associated with (e.g., covered by) the enhanced light device and/or the one or more other enhanced light devices, determine and provide (e.g., present) desired information regarding the device or environment to the user, enhance user experience and enjoyment of the device and/or the area(s), and enhance safety and security of the user, other people, and/or vehicle traffic associated with such area(s). An enhanced light device can understand its environment and device ecosystem using the sensors and instruments of the enhanced light device, and can perform (e.g., automatically perform) a self-configuration to enhance (e.g., optimize or improve) its functionality for the environment and device ecosystem.

It is to be appreciated and understood that, in some embodiments, an enhanced light device can be a retrofit light bulb with components (e.g., light management component, light component, sensor component, instrument component) integrated therein. In certain embodiments, an enhanced light device can have all or a portion of the sensors of the sensor component, instruments of the instrument component, or other components integrated into a light fixture (e.g., socket, holder, ballast) associated with the enhanced light device.

With regard to the example aspects and embodiments disclosed herein, there can be coordination amongst a set of enhanced light devices to achieve a desired objective (e.g. goal, intention, purpose, action, operation, configuration, etc.), whether explicitly stated or not. Further, although the terms "enhanced light device," "self-aware enhanced light device," and "self-aware light" are used herein, in accordance with various embodiments, the example implementations of enhanced light devices (e.g., self-aware light devices) disclosed herein can include one or more enhanced light devices operating independently or in a distributed fashion, as applicable. All such embodiments are envisaged by and part of the disclosed subject matter.

These and other aspects and embodiments of the disclosed subject matter will now be described with respect to the drawings.

FIG. 1 illustrates a block diagram of an example system 100 for an enhanced light device, in accordance with various aspects and embodiments of the disclosed subject matter. The disclosed subject matter is directed to machine (e.g., computer) processing systems, machine-implemented methods, apparatus, and/or machine program products that can facilitate efficiently, effectively, and automatically (e.g., with little or no direct involvement from a user) employing one or more enhanced light devices (e.g., one or more self-aware light devices) that can perform (e.g., automatically perform) self-configuration (e.g., self-configuration of parameters) to facilitate providing desired information to users, enhanced user experience, and enhanced safety and security of users.

For example, when (and if) installed in a desired place, the system 100 (e.g., the enhanced light device 102 of the system 100) can employ sensors, tools, and communication components (e.g., communication devices) to facilitate determining the place of the enhanced light device 102 in the environment and device ecosystem and perform (e.g., automatically perform) a configuration (e.g., an auto-configuration) of the enhanced light device 102 (e.g., respective configuration the respective components of the enhanced light device 102). In an example, the system 100 (e.g., the enhanced light device 102 of the system 100) can employ one or more sensors that can provide information (e.g., sensor information) that can facilitate understanding the physical environment in which the enhanced light device 102 is installed, and facilitate determining how the enhanced light device 102 fits into and/or can desirably interact with the physical environment. In another example, the system 100 (e.g., the enhanced light device 102) can communicate via one or more communication networks to facilitate identifying and communicating with one or more other systems (e.g., other enhanced light devices of other systems) and/or other devices in the device ecosystem, and facilitate determining how the enhanced light device 102 fits into and/or can desirably interact with the device ecosystem. As more fully disclosed herein, based at least in part on such determinations, the system 100 (e.g., the enhanced light device 102 of the system 100) can generate a light profile for the enhanced light device 102 and can perform (e.g., automatically perform) a configuration (e.g., an auto-configuration) of the enhanced light device 102 according to (e.g., conforming to) the light profile. It is to be appreciated and understood that a user interface (not shown) can be provided that can allow a user to manually adjust the light profile and/or configuration generated by the enhanced light device 102.

To facilitate self-configuration, when more than one enhanced light device is employed, the enhanced light devices (e.g., 102) described herein can be in communication with each other, and/or can communicate with another device(s) (e.g., mobile phone, a computer, an electronic tablet, an electronic gaming device, a television, electronic headwear or bodywear, an appliance, a security system, a camera, a drone, . . . ), to exchange information that can be used (and analyzed) by the respective enhanced light devices to enable the respective enhanced light devices to each determine a desirable (e.g., suitable, enhanced, or optimal) configuration of such enhanced light device. The enhanced light devices (e.g., of or associated with the system 100) can coordinate amongst themselves to make decisions regarding respective actions to be taken by the respective enhanced light devices. In some implementations, the enhanced light devices (e.g., 102) can receive instructions from another device, such as a device of a control system or a communication device (e.g., mobile phone, computer, . . . ), regarding actions to be taken by the enhanced light devices. The enhanced light devices also can receive instructions from a user (e.g., an operator) regarding actions to be taken by the enhanced light devices or devices associated with the enhanced light devices. An enhanced light device 102 can autonomously make decisions regarding actions to be taken by the enhanced light device 102. It is to be appreciated and understood that enhanced light devices can employ any of the decision-making methods disclosed herein, alone or in combination, regarding actions to be taken by the enhanced light devices of or associated with the system 100.

The enhanced light device 102 can comprise a light component 104, a light management component 106, an information component 108, a sensor component 110, and an instrument component 112. The light component 104 can emit the light to an area in proximity to the location of the light component 104. The light component 104 can comprise one or more light elements (e.g., one or more LEDs or other type(s) of light element(s)) that can produce and emit respective portions of the light emitted by the light component 104, for example, in response to power received from a power source(s) (e.g., an electric grid system, a battery, a solar power cell system). The light component 104 can emit light of one or more colors, emit light at one or more illumination levels, and/or emit light in one or more directions.

The light management component 106 can comprise or be associated with (e.g., connected to) the light component 104, the information component 108, the sensor component 110, the instrument component 112, and/or another component(s) of the enhanced light device 102 to facilitate controlling operation of the enhanced light device 102 and production and presentation of desirable (e.g., relevant or useful, or at least potentially relevant or useful) information regarding a device 114 and/or the environment associated with the enhanced light device 102. For instance, the light management component 106 can control operation of the respective components (e.g., light component 104, information component 108, instrument component 112, . . . ) of the enhanced light device 102, and/or other enhanced light devices associated with the enhanced light device 102, and/or can determine desirable information regarding the device 114 and/or environment associated with the enhanced light device 102 that can be provided (e.g., presented to a user, based at least in part on the results of analyzing sensor data received from the sensor component 110 and/or other data (e.g., user preferences, commands, or requests; data obtained from extrinsic sources), in accordance with the light profile, environment profile, device profile (e.g., of device 114), and/or user profile, associated with the enhanced light device 102 and generated by the light management component 106, as more fully described herein.

The information component 108 can determine, generate, store, obtain (e.g., retrieve from a data store of the enhanced light device 102 and/or from an extrinsic (e.g., external) data source(s)), and/or provide desirable (e.g., relevant or useful, or at least potentially relevant or useful) information based at least in part on (e.g., in response to) interaction of the user with, or proximity of the user to, the environment or device 114, and/or characteristics, conditions, or context of the environment, device 114, or user, in accordance with the defined light management criteria. For example, in response to a detected interaction of the user with the device 114 or the environment, the information component 108 can determine or facilitate determining a subset of information that can be related to the device 114 and/or the environment where the device is located and can be desirable to the user, based at least in part on the interaction of the user with the device 114 and/or the environment, and/or the respective contexts of the user, device 114, and/or environment, in accordance with the defined light management criteria.

The light management component 106 and/or information component 108 can determine or identify a device 114 associated with (e.g., connected or attached to, or in proximity to) the enhanced light device 102 based at least in part on a result of analyzing sensor data relating to the device 114 that is obtained from the sensor component 110 and/or device-related data regarding the device 114 that can be pre-loaded or obtained from another data source(s), as more fully described herein. The light management component 106 and/or information component 108 can be employed to determine particular information that can be desirable (e.g., can be relevant and/or useful) to a user associated with (e.g., interacting with or in proximity to) the enhanced light device 102 and/or a device 114 or an environment associated with (e.g., in proximity or connected to) the enhanced light device 102, based at least in part on a context of the user, a context of the device 114, a context of the enhanced light device 102, and/or a context of the environment, as determined by the light management component 106 or information component 108, in accordance with defined light management criteria, as more fully described herein. The information component 108 can have all or a portion of the particular information stored in the information component 108 or a data store (not shown in FIG. 1) of or associated with the information component 108, can have all or a portion of the particular information determined by the light management component 106, the information component 108, or another component of the enhanced light device 102, and/or can obtain all or a portion of the particular information from the sensor component 110 (e.g., by sensing or scanning the device 114 and/or environment), the device 114, and/or one or more extrinsic data sources associated with (e.g., communicatively connected to) the enhanced light device 102. In some embodiments, all or a portion of the particular information (e.g., associated with a particular instance) and/or other information regarding the device 114 and/or environment can be pre-loaded into the information component 108 and/or associated data store of the enhanced light device 102.

In some embodiments, the device 114 can comprise communication functionality, and the enhanced light device 102 can receive at least a portion the information (e.g., identification information, functionality information, operation information, fault information, . . . ) relating to the device 114 from the device 114 via a direct communication connection or via a wireline or wireless communication connection with the communication network. In other embodiments, the light management component 106 or information component 108 can obtain information from extrinsic data sources, such as websites associated with communication devices that can be accessed via a communication network. The websites can be sites associated with the manufacturer or seller of the device 114, sites of other entities that can provide information regarding the device 114, and/or sites (e.g., weather website, environment-related website, government website, news website, . . . ) of other entities that can provide information regarding the environment.

In accordance with various embodiments, with regard to a device 114 associated with the enhanced light device 102, the light management component 106 and/or information component 108 can monitor conditions associated with the area (e.g., the environment) where the enhanced light device 102 is located or installed, the device 114 associated with the enhanced light device 102, and/or the user (e.g., user interacting with or in proximity to the device 114 or area). For instance, the light management component can monitor and receive (e.g., from one or more sensors of the sensor component 110) sensor data relating the conditions associated with and/or activities (e.g., by the user) taking place in or with respect to the area, the device 114, and/or the user. One or more sensors of the sensor component 110 can sense or detect a user interacting with or in proximity to the device 114 associated with the enhanced light device 102.

The light management component 106 and/or information component 108 can analyze sensor data relating to the user interacting with or being in proximity to the device 114. Based at least in part on the results of such analysis of the sensor data, the light management component 106 can identify or determine the interaction of the user with the device 114 or the environment and/or characteristics or conditions associated with the user being in proximity to the device 114 or in the environment, the identity (e.g., identify the name and associated user profile of the user), other information regarding the user, and/or context of the user (e.g., the user is attempting to use or manipulate the device 114, the user is attempting access an item or object of or associated with the device 114, actions or interaction of the user with respect to the environment in response to environmental conditions, and/or impact or effect of environmental conditions on the user, . . . ), the context of the device 114 (e.g., the operating state of the device 114, the available functions of the device 114, a malfunction of the device 114, . . . ), and/or the context of the environment (e.g., characteristics, conditions, features, etc., of or associated with the environment and/or the device 114 or other objects in or associated with the environment, . . . ).

Based at least in part on the interaction or proximity of the user with the device 114 or the environment, the context of the user, the context of the device 114, and/or the context of the environment, the light management component 106 and/or information component 108 can determine a particular subset of information (e.g., desirable information) that can be relevant and/or useful, or at least potentially relevant and/or useful, to the user, can determine a form of presentation (e.g., visual, audio, and/or haptic presentation; presentation via communication device of the user that is associated with the enhanced light device 102 and/or directly via the enhanced light device 102) of the subset of information to the user, and can present or facilitate presenting the subset of information to the user.

The sensor component 110 can comprise or employ one or more sensors that can sense respective conditions associated with device 114 or the environment(s) (e.g., physical environment, logical environment, communication network environment) in or on which the enhanced light device 102 is situated or with which the enhanced light device 102 is associated (e.g., to which the enhanced light device 102 is in proximity). The one or more sensors of the sensor component 110 can comprise, for example, a radio frequency identification (RFID) reader, a navigation device, a camera, a video camera, a three-dimensional camera, a global positioning system (GPS) device, a motion sensor, a radar sensor or device, a temperature or heat sensor, a weather sensor, a humidity sensor, a barometer, a Doppler radar, a light sensor, a thermal imaging sensor or device, an infrared camera, an audio sensor, an ultrasound imaging sensor or device, a light detection and ranging (LIDAR) sensor, a sound navigation and ranging (SONAR) sensor or device, a microwave sensor, a smoke detector, a chemical sensor, a radiation sensor, an electromagnetic field sensor, a pressure sensor, a spectrum analyzer, a scent sensor, a moisture sensor, a biohazard sensor, a touch sensor, a gyroscope, an accelerometer, an altimeter, a microscope, a magnetometer, a sensor or device capable of seeing through or inside of objects, or any other desired (e.g., suitable) sensors. It is to be appreciated and understood that the enhanced light device 102 can comprise one or more configurable and/or removably attached sensors of the sensor component 110. For instance, the enhanced light device 102 can comprise a modular configuration that can allow for one or more of the sensors of the sensor component 110 to be added or removed by a manufacturer or a user.

The instrument component 112 can comprise or employ one or more instruments, tools, or devices that can perform respective functions or tasks. The instrument component 112 can include, for example, a display screen, a video projector, or an audio speaker. The instrument component 112 also can comprise, for example, a projectile launcher, a liquid sprayer, an air blower, a flame thrower, a heat projector, a cold projector, a scent projector, a chemical projector, an electric discharge device, a fire extinguisher, a laser device, or any other suitable tools to perform any task. The instrument component 112 further can comprise, for example, indicators (e.g., visual indicators (e.g., LEDs) or audio indicators), or any other suitable instrument, tool, or device. It is to be appreciated and understood that the enhanced light device 102 can comprise configurable and/or removably attached instruments, tools, or devices. For example, the enhanced light device 102 can comprise a modular configuration that can allow for one or more instruments, tools, or devices to be added or removed by the manufacturer or user.

With further regard to the light management component 106 and the information component 108, the light management component 106 can determine or identify a device 114 (e.g., refrigerator, oven, microwave oven, automobile, . . . ) and/or an environment in which the enhanced light device 102 is installed or located, or with which it is otherwise associated, can learn about the device 114 and/or environment, and/or can obtain, determine, and/or store information (e.g., information relating to the device 114 or environment), based at least in part on the results of the analysis of the sensor data and/or other information available to the light management component 106. For instance, the light management component 106 can detect or identify a device 114 or an environment in proximity to or otherwise associated with (e.g., connected or attached to) the enhanced light device 102, based at least in part on sensor data relating to the device 114 obtained from the sensor component 110 or other information (e.g., device-related information) obtained by the light management component 106 from another data source.

For example, the enhanced light device 102 can be installed in or on a device 114 (e.g., appliance, vehicle, machine, . . . ). In some implementations, one or more sensors (e.g., camera) of the sensor component 110 can sense or detect information regarding the device 114 from the device 114. For instance, a sensor (e.g., camera) can detect and/or capture an image of a label on the device 114 that can contain information regarding the manufacturer, model, serial number, or other information (e.g., identifying information) associated with the device 114. The sensor or the light management component 106 can analyze the sensor data (e.g., the image of the label) and, as part of the analysis, can employ pattern recognition to recognize or identify the information on the label. The light management component 106 or information component 108 can identify the device 114 (e.g., identify the manufacturer, device model, serial number, etc., associated with the device 114), based at least in part on the results of the analysis of the sensor data.

As another example, one or more sensors (e.g., camera) can detect and/or capture an image of the shape of the device 114, or portion thereof. The sensor or the light management component 106 can analyze the sensor data (e.g., the image of the device or device portion) and, as part of the analysis, can employ pattern recognition to recognize or identify features of the device 114. The light management component 106 or information component 108 can identify the device 114 (e.g., identify the manufacturer or device model, etc., of the device 114), based at least in part on the results of the analysis of the sensor data (e.g., based at least in part on the features of the device 114 identified from the sensor data).

As still another example, one or more sensors of the sensor component 110 can sense or detect conditions, features, or characteristics of an environment where the enhanced light device 102 (and/or device 114) is (are) located or installed. For instance, with regard to an outdoor environment, the one or more sensors (e.g., camera, audio sensor, temperature sensor, humidity sensor, smoke sensor, air quality sensor, . . . ) can sense or detect the relative or respective locations, conditions, features, or characteristics (e.g., shapes, sizes, colors, sounds, . . . ) of people, animals, trees, streets, curbs, wires, holes, buildings, telephone poles, street lights, hills, ditches, or other objects, of the environment; can sense or detect air and/or weather conditions (e.g., air temperature, precipitation, humidity, air pressure level, air quality level, visibility level, . . . ) of the environment; and/or can sense or detect other conditions, features, or characteristics of the environment. With regard to an indoor environment (e.g., inside of a home or other building, inside of a vehicle or other device 114), the one or more sensors (e.g., camera, audio sensor, temperature sensor, humidity sensor, smoke sensor, air quality sensor, . . . ) can sense or detect the relative or respective locations, conditions, features, or characteristics (e.g., shapes, sizes, colors, sounds, . . . ) of people, animals, furniture, rooms, doors, or other objects, of the environment; can sense or detect air and/or weather conditions (e.g., air temperature, precipitation, humidity, air pressure level, air quality level, visibility level, . . . ) of the environment; and/or can sense or detect other conditions, features, or characteristics of the indoor environment.

In some implementations, the enhanced light device 102 can be located or installed in a device 114. In such instances, the one or more sensors of the sensor component 110 can be employed to sense or detect relative or respective locations, conditions, features, or characteristics of objects and/or the air inside the device 114 and outside of the device 114.

The light management component 106 can analyze the sensor data regarding the environment to identify the environment (e.g., identify the location of the environment, identify people in the environment, identify building or business names or addresses in the environment, identify the type of environment (e.g., vehicle, inside of an appliance, building (e.g., hospital, store, restaurant, . . . ), outdoor location (e.g., city location, park, rural location, . . . )), and/or identify other conditions, features, or characteristics of the environment. In some implementations, the light management component 106 can obtain other information relating to the environment from one or more extrinsic data sources (e.g., communication devices associated with the communication network), wherein the light management component 106 can utilize the other information to facilitate the identification of the environment, including objects in the environment, determining information (e.g., environment conditions, object-related information) regarding the environment, including objects in the environment, and/or determining the context of the environment. For instance, the light management component 106 can analyze the sensor data, and based at least in part on results of that analysis, the light management component 106 can determine or identify at least a portion of the conditions, features, or characteristics of the environment, including objects present in the environment. Further, based at least in part on (e.g., by using and leveraging) the analysis results and identification of at least the portion of the conditions, features, or characteristics of the environment, the light management component 106 can search for and receive additional information (e.g., the other information) from the one or more extrinsic data sources, can analyze the additional information, and can determine or identify another portion of the conditions, features, or characteristics of the environment, including objects present in the environment, which can further improve the accuracy of the identification of the environment, and objects associated therewith, can further provide additional information regarding the environment, and can further improve the accuracy of the determination of the context of the environment. The one or more extrinsic data sources can comprise, for example, a weather service or application, a mapping service or application, a utility company, a law enforcement or other government agency, a news service or application, and/or any other desired data source, wherein the one or more extrinsic data sources can be accessed or communicated with via respective communication devices of or associated with the respective extrinsic data sources.

In some embodiments, identification information that can identify the device 114 and/or environment, and/or other information regarding the device 114 and/or environment, can be pre-loaded on the enhanced light device 102 (e.g., pre-loaded into the information component 108 or data store of the enhanced light device 102). The light management component 106 also can update (e.g., modify) or supplement the pre-loaded information, or other collected information relating to the device and/or environment, based at least in part on sensor data relating to conditions sensed by the sensor component 110, a context(s) determined for the device 114, environment, enhanced light device 102, and/or user, and/or other information obtained from one or more other (e.g., extrinsic) data sources.

In accordance with various embodiments, the light management component 106 can generate, update, and maintain respective profiles for respective entities, such as, for example, an environment profile that can comprise information associated with and relating to the environment, a device profile that can comprise information associated with and relating to the device 114, a user profile that can comprise information associated with and relating to the user (e.g., respective user profiles for respective users), and/or a light profile that can comprise information associated with and relating to the enhanced light device 102. For instance, the environment profile can comprise information relating to the characteristics, conditions, features, etc., of the environment, as determined by the light management component 106 based at least in part on sensor data obtained from the sensor component 110 and/or information obtained from other (e.g., extrinsic) data sources. The device profile can comprise information relating to the characteristics, conditions, features, etc., of the device 114, as determined by the light management component 106 based at least in part on sensor data obtained from the sensor component 110, information obtained from the device 114, and/or information obtained from other (e.g., extrinsic) data sources. The user profile can comprise information relating to the characteristics, conditions, features, etc., of a user, including interactions of the user with the device 114 and/or environment, as determined by the light management component 106 based at least in part on sensor data obtained from the sensor component 110, information (e.g., user preferences, selections, and/or other input data) obtained from the user, and/or other information (e.g., demographic data) obtained from other (e.g., extrinsic) data sources. The light profile can comprise information relating to the characteristics, conditions, features, etc., of the enhanced light device 102, and/or information relating to the device 114, environment, and/or user (e.g., as obtained from the device profile, environment profile, and/or user profile), as determined by the light management component 106 based at least in part on sensor data obtained from the sensor component 110, information obtained from the device 114 or user, and/or other information obtained from other (e.g., extrinsic) data sources.

The light management component 106 can analyze the light profile, and based at least in part on the results of such analysis, the light management component 106 can determine one or more adjustments (e.g., modifications) that can be made to operations, parameters, characteristics, and/or properties of respective components (e.g., light component 104, information component 108, instrument component 112, . . . ) of the enhanced light device 102 to facilitate controlling operations, parameters, characteristics, and/or properties of the enhanced light device 102, in response to the respective characteristics, conditions, features, etc., associated with the device 114, the environment, the user, and/or the enhanced light device 102, in accordance with the defined light management criteria.

For example, the light management component 106 can update device profile associated with the device 114 based at least in part on a device-related context for the device 114 that can be determined as a result of analyzing the sensor data or other data, update the environment profile associated with the environment based at least in part on the environmental context for the environment that can be determined as a result of analyzing the sensor data and/or other data, update the user profile associated with the user based at least in part on the user context of the user that can be determined as a result of analyzing the user-related data, and/or update the light profile associated with the enhanced light device 102 based at least in part on the device context, device profile, environmental context, environmental profile, user context, user profile, and/or other information. Based at least in part on such updates to the device profile, environment profile, user profile, and/or light profile, the light management component 106 can determine the one or more adjustments that can be made to the operations, parameters, characteristics, and/or properties of respective components of the enhanced light device 102. Such updated profiles can be stored in a data store of or associated with the enhanced light device 102.

To facilitate controlling the respective operations, parameters, characteristics, and/or properties of the respective components (e.g., light component 104, information component 108, sensor component 110, instrument component 112, . . . ) of the enhanced light device 102, the light management component 106 can perform the adjustments to the operations, parameters, characteristics, and/or properties of the enhanced light device 102 or can communicate instructions to other components (e.g., light component 104, information component 108, sensor component 110, instrument component 112, . . . ) to facilitate adjusting the respective operations, parameters, characteristics, and/or properties of or associated with the respective components of the enhanced light device 102, wherein the respective components (e.g., light component 104, information component 108, sensor component 110, instrument component 112, . . . ) can perform such respective adjustments to the respective operations, parameters, characteristics, and/or properties of or associated with the respective components based at least in part on the instructions.

The light management component 106 can facilitate controlling the determination of desirable information to provide (e.g., present) to a user based at least in part on the light profile (e.g., as updated based at least in part on an interaction of the user with or proximity of the user to the device 114 and/or environment), in accordance with the defined light management criteria. As another example, the light management component 106 can facilitate controlling (e.g., adjusting or modifying) the respective operations, parameters, characteristics, and/or properties of the light component 104 in a number of ways. For instance, the light management component 106 can control switching the light component 104 between an on state (e.g., illuminated state) or off state (e.g., no light illumination), control (e.g., adjust) an illumination level of the light component 104 and/or control which light elements of the light component 104 are illuminated to facilitate controlling the illumination level of the light component 104, control a color of the light emitted by the light component 104, and/or control a direction of emission of light by the light component 104, based at least in part on the light profile of the enhanced light device 102, in accordance with defined light management criteria. The light management component 106 also can control the emission of light by the light component 104, the diffusion of light, and/or other processing of light by the enhanced light device 102 (e.g., a diffusion component and/or light processing component of the enhanced light device 102), based at least in part on the light profile of the enhanced light device 102, in accordance with defined light management criteria.

As still another example, the light management component 106 can control the respective operations, parameters, characteristics, and/or properties of the instrument component 112 in a number of ways. For instance, the light management component 106 can control the switching on or off of respective instruments of the instrument component 112, the setting of respective parameters of the respective instruments of the instrument component 112, and/or the presentation the desirable information via one or more interfaces (e.g., display screen, audio speaker(s), haptic component) of the instrument component 112, etc., based at least in part on the light profile (e.g., the results of analyzing the light profile (e.g., as updated with current information)), in accordance with the defined light management criteria. If, for example, a hazard is detected with respect to the device 114, the light management component 106 can determine desirable information (e.g., information relating to the hazard, hazard warning or indicator, and/or information regarding how to respond to the hazard) to provide to the user via the enhanced light device 102 or communication device of the user associated with the enhanced light device 102, and can determine one or more instruments (e.g., fire extinguisher or sprinkler system, smoke alarm, display screen and/or audio speakers to present a map or directions for safe exit to avoid the hazard, . . . ) of the instrument component 112 to utilize to respond to the hazard to facilitate eliminating or mitigating the hazard, and/or facilitate notifying the user of the hazard and guiding the user to a safe location to avoid the hazard, based at least in part on the light profile.

In accordance with various embodiments, the light management component 106 can control display of visual information, notifications, or indicators by the enhanced light device 102, control emission of audio information, notifications, or indicators by the enhanced light device 102, control emission of haptic information, notifications, or indicators (e.g., haptic feedback) by the enhanced light device 102, and/or control communication of information, notifications, or indicators (e.g., visual, audio, haptic information, notifications, or indicators) from the enhanced light device 102 to another device (e.g., another enhanced light device; the device 114; a communication device, such as a mobile phone, computer, etc.; and/or a device associated with law enforcement or an emergency response entity, . . . ), and/or control other elements, features, or parameters of the enhanced light device 102, based at least in part on the light profile of the enhanced light device 102, in accordance with the defined light management criteria, as more fully described herein.

In accordance with various embodiments, as more fully described herein, the enhanced light device 102 and/or one or more other enhanced light devices, which can be associated with (e.g., communicatively connected to) the enhanced light device 102 and each other, can control operations and parameters, determine responses to contexts or conditions, and/or determine which functionalities (e.g., instruments and/or sensors) to utilize (e.g., employ by and/or for the enhanced light device(s) and/or the user(s)) based at least in part on a determined context(s) (e.g., user context, device context, environmental context, . . . ), in accordance with the defined light management criteria. For instance, as more fully described herein, one or more enhanced light devices (e.g., enhanced light device 102) can be located (e.g., respectively located or distributed) throughout an area (e.g., to act as respective hub light devices). The respective enhanced light devices (e.g., 102) can employ processing capabilities and/or intelligence capabilities, which can be utilized to determine the respective contexts of the respective enhanced light devices, respectively associated devices (e.g., 114), respective environments, and/or respective users. The light management component(s) (e.g., 106) of the enhanced light device(s) (e.g., 102) can determine one or more respective functionalities (e.g., instruments) to utilize, determine desirable information to provide to a user, determine an instrument(s) to use, and/or determine parameters to use for components or instruments of the enhanced light device(s), etc., to respond to a particular context, situation, or condition of a device, environment, and/or user of an enhanced light device(s).

An enhanced light device(s) (e.g., 102) can comprise various sensors or instruments of the sensor component 110 and instrument component 112 (e.g., a display(s) (e.g., a projected display and/or a display screen), an audio speaker(s), a microphone(s), a communication device, a touch screen, a camera, and/or other sensors, tools, instruments, or components). As more fully described herein, an enhanced light device 102 (e.g., a hub light device) can communicate and coordinate with one or more other enhanced light devices (e.g., one or more other hub lights) or other devices (e.g., a camera(s) on or near a door and/or in another location(s); a Wi-Fi modem(s); a security system; a machine; an appliance; an automobile; . . . ) in a particular area.

In some embodiments, an enhanced light device 102 can be designed to have a form factor that can comport with (e.g., can desirably fit into) a décor of an area (e.g., room, building, . . . ) in which the enhanced light device 102 is located or installed. For example, an enhanced light device 102 (e.g., a hub light) can be in the form of a vase in a hotel room. As another example, an enhanced light device 102 can be in the form of a frame of a painting or a painting itself placed on a wall in a house or other building. In still another example, an enhanced light device 102 can be structured in the form of a globe of the Earth, which can be situated in a desired room or other location. An enhanced light device(s) 102 can comprise and perform various functions, as more fully described herein, such as, for example, a set of speakers, a radio, a television, a telephone, a home/room automation center or device, a door peephole, video conferencing, hotel check-in or check-out, concierge functions or services, room services, an alarm clock, a thermostat, a messaging or messing application, an electronic assistant, an electronic scheduler, an electronic note taker, security or fire alarm functions, and/or other functions or services, as more fully described herein.

In accordance with various implementations, the light management component 106 can control (e.g., automatically control, adjust, or modify) operations of the enhanced light device(s) 102 in relation to, for example, enhancing security and safety of people or traffic, emergency situations, business and sales operations, horticulture systems, and one or more other desired situations, systems, or objectives (e.g. goal, intention, purpose, action, operation, configuration, . . . ). These and other features of or associated with the enhanced light devices (e.g., 102) can reduce, minimize, or eliminate the need for a user to perform manual configuration of the enhanced light devices or other parameters associated with the enhanced light devices.

With further regard to the one or more sensors of the sensor component 110, the RFID reader of the sensor component 110 can sense and/or identify RFID tags in proximity to the enhanced light device 102 (e.g., in proximity to the RFID reader of the enhanced light device 102). The navigation device can facilitate generating directions in connection with or in relation to the enhanced light device 102. The camera, the video camera, and/or the three-dimensional camera respectively can capture multi-dimensional visual images in proximity to the enhanced light device 102. The GPS device can facilitate sensing a location of the enhanced light device 102 or an object(s) (e.g., device 114 or another object(s)) in proximity to the enhanced light device 102 and/or generating directions in connection with the enhanced light device 102. The motion sensor can sense movement and/or direction of movement of an object(s) in proximity and relation to the enhanced light device 102 (e.g., in proximity to the motion sensor of the enhanced light device 102). The radar sensor or device can employ radar technology to facilitate detecting an object(s), including detecting the location and/or movement of an object(s), in proximity to the enhanced light device 102 (e.g., in proximity to the radar sensor of the enhanced light device 102).

A temperature or heat sensor can sense, measure, determine, or facilitate determining a temperature of the environment or an object (e.g., device 114 or other object) in proximity to or otherwise associated with the enhanced light device 102 (e.g., in proximity to the temperature sensor of the enhanced light device 102). A weather sensor can sense weather conditions of or associated with the environment in proximity to or relevant to the enhanced light device 102. A humidity sensor can detect, measure, determine, or facilitate determining the humidity level of the environment or an object (e.g., device 114) in proximity to or otherwise associated with the enhanced light device 102 (e.g., in proximity to the humidity sensor of the enhanced light device 102). A barometer can sense, measure, determine, or facilitate determining the air pressure level of the environment or object (e.g., device 114) in proximity to the enhanced light device 102 (e.g., in proximity to the barometer of the enhanced light device 102). A Doppler radar can employ the Doppler effect to sense, measure, determine, or facilitate determining movement of objects and/or velocity of movement of objects in proximity to or otherwise associated with the enhanced light device 102 (e.g., in proximity to the Doppler radar of the enhanced light device 102).

A light sensor can detect or measure light or an amount of light in proximity to the enhanced light device 102 (e.g., in proximity to the light sensor of the enhanced light device 102). A thermal imaging sensor or device, or an infrared camera, can detect, measure, or determine an amount of radiation of the environment or objects (e.g., device 114 or other object) in the environment in proximity to the thermal imaging sensor or device, and can generate thermal images (e.g., thermograms) of the radiation of the environment or objects in the environment, based at least in part on the detecting, measuring, or determining the amount of radiation. An audio sensor can sense audio signals, measure audio signals, or facilitate identifying audio signals in proximity to the enhanced light device 102 (e.g., in proximity to the audio sensor of the enhanced light device 102). An ultrasound imaging sensor or device can employ ultrasound technology to detect features of or objects in an environment in proximity to or otherwise associated with the enhanced light device 102 (e.g., in proximity to the ultrasound imaging sensor or device of the enhanced light device 102), and can facilitate generation of images (e.g., ultrasound images) that can represent the features of or objects in the environment in proximity to the enhanced light device 102.

A LIDAR sensor or device can employ a laser light (e.g., a pulsed laser light) to detect features of or objects in an environment in proximity to the enhanced light device 102 (e.g., in proximity to the LIDAR sensor or device of the enhanced light device 102), and can facilitate generation of images (e.g., LIDAR images) that can represent the features of or objects (e.g., device 114 or other object) in the environment in proximity to or otherwise associated with the enhanced light device 102. A SONAR sensor or device that can employ ultrasound technology to detect features of or objects in the environment in proximity to the enhanced light device 102, and the distance between the features or objects and the enhanced light device 102, and can facilitate generation of images (e.g., SONAR images) that can represent the features of or objects in the environment in proximity to or otherwise associated with the enhanced light device 102 (e.g., in proximity to the SONAR sensor or device of the enhanced light device 102).

A microwave sensor can employ microwaves to facilitate detecting objects, including the movement of objects, in the environment in proximity to the enhanced light device 102 (e.g., in proximity to the microwave sensor of the enhanced light device 102). A smoke detector can detect smoke or other air impurities, or measure smoke or other air impurities, in the environment or associated with (e.g., in or in proximity to) the device 114 in proximity to or otherwise associated with the enhanced light device 102 (e.g., in proximity to the smoke detector of the enhanced light device 102). A chemical sensor can detect, measure, and/or facilitate identifying chemical elements or information in the environment or associated with (e.g., in or in proximity to) the device 114 in proximity to or otherwise associated with the enhanced light device 102. A radiation sensor can detect, measure, and/or facilitate identifying radiation, including an amount or a type of radiation, in the environment or associated with (e.g., in or in proximity to) the device in proximity to or otherwise associated with the enhanced light device 102 (e.g., in proximity to the radiation sensor of the enhanced light device 102). An electromagnetic field sensor can sense or measure electromagnetic fields in the environment or associated with (e.g., in or in proximity to) the device 114 in proximity to or otherwise associated with the enhanced light device 102 (e.g., in proximity to the electromagnetic field sensor of the enhanced light device 102).

A pressure sensor can detect or measure pressure (e.g., an amount of pressure) in the environment or associated with (e.g., in or in proximity to) the device 114 in proximity to or otherwise associated with the enhanced light device 102 (e.g., in proximity to the pressure sensor of the enhanced light device 102). A spectrum analyzer can detect and measure the spectral composition of electrical signals, acoustic pressure waves, optical light waves, or other signals that are in the environment or associated with (e.g., emanating from or impacting) the device 114 in proximity to or otherwise associated with the enhanced light device 102 (e.g., in proximity to the spectrum analyzer of the enhanced light device 102).

A scent sensor can sense and/or facilitate identifying scents in the environment (e.g., in the air of the environment or emitted by an object(s) in the environment) in proximity to the enhanced light device 102 (e.g., in proximity to the scent sensor of the enhanced light device 102). A moisture sensor can detect an amount of moisture in the environment (e.g., in the air of the environment or emitted by or associated with an object(s) (e.g., device 114 or another object) in the environment) in proximity to the enhanced light device 102 (e.g., in proximity to the moisture sensor of the enhanced light device 102). A biohazard sensor can detect, measure, and/or facilitate identifying a biohazardous condition in the environment (e.g., in the air of the environment or emitted by or associated with an object(s) (e.g., device 114 or other object) in the environment) in proximity to the enhanced light device 102 (e.g., in proximity to the biohazard sensor of the enhanced light device 102).

A touch sensor that can detect contact with the enhanced light device 102 or a device or surface associated with the enhanced light device 102, and/or can facilitate identifying a type of touch or contact (e.g., a touch or contact by a finger or hand of a user, a touch or contact by or with an inanimate object) with the enhanced light device 102 or the device or surface associated with the enhanced light device 102. A gyroscope can sense, measure, determine, and/or facilitate determining motion, direction of motion, position, orientation, and/or rotation of the enhanced light device 102 or an object (e.g., device 114 or other object) in proximity to or associated with the enhanced light device 102. An accelerometer can sense, measure, determine, and/or facilitate determining acceleration, velocity, motion, direction of motion, position, orientation, and/or rotation of the enhanced light device 102 or an object (e.g., device 114 or other object) in proximity to or associated with the enhanced light device 102. An altimeter can detect, measure, and/or identify an altitude of the enhanced light device 102 or an object (e.g., device 114 or other object) in proximity to the enhanced light device 102.

A microscope can be employed to detect or observe very small objects and/or small details on objects in the environment in proximity to the enhanced light device 102 (e.g., in proximity to the microscope of the enhanced light device 102). A magnetometer can detect, measure, determine, and/or facilitate determining magnetism, direction of a magnetic field (e.g., magnetic or electromagnetic field), strength of a magnetic field, or relative change of a magnetic field in the environment or associated with the device 114 in proximity to or otherwise associated with the enhanced light device 102 (e.g., in proximity to the magnetometer of the enhanced light device 102).

With further regard to the one or more instruments of the instrument component 112, the display screen and/or the video projector can be employed to facilitate displaying and/or projecting desired information (e.g., information relating to the device 114 and/or environment, location information, directions, emergency or hazard information, alerts or notifications, videos, . . . ) to a person (e.g., user) interacting with the device 114, in proximity to the device 114, and/or in the area where the enhanced light device 102 is located or installed. For instance, in response to an interaction of the user with the device 114 (e.g., use or attempt to use a function of the device 114 by the user) that is detected by one or more sensors (e.g., video camera, audio sensor) of the sensor component 110, the light management component 106 and/or the information component 108 can determine a subset of desirable information (e.g., information that can instruct the user with regard to the function of the device 114) that can be presented to the user to facilitate enabling the user to desirably use or interact with the device 114. The light management component 106 can employ the display screen and/or the video projector to display or project the subset of desirable information to the user.

The audio speaker(s) can be employed to provide audio information (e.g., information relating to the device 114 and/or environment, location information, directions, emergency or hazard information, alerts or notifications, music) to a person(s) located in the area in proximity to the enhanced light device 102. For instance, in response to the interaction of the user with the device 114 (e.g., use or attempt to use a function of the device 114 by the user) that is detected by one or more sensors, the light management component 106 and/or the information component 108 can determine a subset of desirable information (e.g., information that can instruct the user with regard to the function of the device 114) that can be presented to the user to facilitate enabling the user to desirably use or interact with the device 114. The light management component 106 can employ the audio speaker(s) to present the subset of desirable information to the user.

The projectile launcher can be employed to launch, emit, eject, or project a projectile from the enhanced light device 102, for example, at an object or entity. The projectile can be, for example, a tag (e.g., paint or chemical tag) that can permanently or semi-permanently mark the object or entity (e.g., criminal) it hits to tag the object or entity to facilitate identifying that the object or entity was present in proximity to the enhanced light device 102. The projectile also can be a weapon that can be employed to strike and disable an object or entity in proximity to the enhanced light device 102.

The liquid sprayer can spray or emit desired liquids, such as, for example, water, fire retardant, horticulture-related liquids on or in the direction of desired targets (e.g., object, entity, fire, plants or flowers, etc.) in proximity to the enhanced light device 102. For example, in response to a heat sensor and/or smoke detector sensing a fire in proximity to the enhanced light device 102, the light management component 106 can determine that fire retardant is to be sprayed on the fire, and can instruct the liquid sprayer to spray fire retardant on the fire. In response to the instruction, the liquid sprayer can spray fire retardant on the fire.

The air blower can blow air or create an air flow in the area (e.g., environment) in proximity to the enhanced light device 102. The air blower can be employed, for example, to try to blow smoke out of an area in proximity to the enhanced light device 102 (e.g., to another area outside of the building or to another desired area) or to create an air flow to blow or clear away a harmful chemical in the air in proximity to the enhanced light device 102. For instance, in response to the smoke detector detecting smoke in proximity to the enhanced light device 102, the light management component 106 can determine that the air blower is to be turned on to blow the smoke out of the area in proximity to the enhanced light device 102, and can instruct the air blower to blow air in a certain direction. In response to the instruction, the air blower can switch to an on state and blow air in the certain direction to blow the smoke out of the area.

The flame thrower can be employed to emit flames in a controlled manner and desired direction (e.g., at a desired target). The flame thrower can be employed, for example, to emit flames in a controlled manner to create a controlled burn of agriculture or other materials. For instance, as part of land management, in response to a determination by the light management component 106 of the enhanced light device 102 (e.g., on a land vehicle, or on an air vehicle (e.g., helicopter, plane, drone)) that a certain area of land should be cleared to facilitate desirable land management, in accordance with defined environment criteria, the light management component 106 can determine that the flame thrower is to be employed to clear that certain area of land, and can instruct the flame thrower to emit flames in a controlled manner in the direction of the certain area of land. In response to the instruction, the flame thrower can emit flames in a controlled manner in the direction of the certain area of land.

The heat projector can project, emit, or blow heat in a desired direction, in a desired area, or on a desired object or entity. For instance, the temperature sensor can sense a temperature level in the area of the enhanced light device 102. The light management component 106 can determine that the temperature is too low, in accordance with defined environment criteria. The light management component 106 can instruct the heat projector to emit heat to increase the temperature in the area in proximity to the enhanced light device 102 to a desired temperature, in accordance with the defined environment criteria.

The cold projector can project, emit, or blow colder air in a desired direction, in a desired area, or on a desired object or entity. For example, the temperature sensor can sense a temperature level in the area of the enhanced light device 102. The light management component 106 can determine that the temperature is too high based at least in part on the defined environment criteria. The light management component 106 can instruct the cold projector to emit colder air to decrease the temperature in the area in proximity to the enhanced light device 102 to a desired temperature, in accordance with the defined environment criteria.

The scent projector can emit, spray, or project one or more desired scents (e.g., fragrances, chemicals) in the area in proximity to the enhanced light device 102. This can, for example, facilitate achieving a desired scent or smell in the area. For instance, in accordance with the defined environment criteria relating to scent, the light management component 106 can determine that a particular scent is to be emitted in a particular amount in the area, or can determine that the amount of the particular scent being emitted in the area should be adjusted (e.g., increased, or decreased, in response to a detected change in environmental conditions in the area). The light management component 106 can instruct the scent projector to emit the particular scent in a specified amount to introduce a desired amount of the particular scent in the area in proximity to the enhanced light device 102, in accordance with the defined environment criteria.

The chemical projector can emit, spray, or project one or more desired chemicals in the area in proximity to the enhanced light device 102. For example, it can be desired to emit chemicals (e.g., pesticides) on agricultural land or plants, or in a room(s) of or an area around a building, to reduce or control insects, animals, weeds, fungus, and/or other undesired pests. For instance, in accordance with the defined environment criteria relating to chemicals, the light management component 106 can determine that a particular chemical is to be emitted in a particular amount in a particular area in which the enhanced light device 102 is located or to which the enhanced light device 102 can travel (e.g., via a vehicle associated with the enhanced light device 102), or can determine that the amount of the particular chemical being emitted in the particular area should be adjusted (e.g., increased, or decreased, in response to a detected change in environmental conditions in the area). The light management component 106 can instruct the chemical projector to emit the particular chemical in a specified amount to introduce a desired amount of the particular chemical in the particular area in proximity to the enhanced light device 102, in accordance with the defined environment criteria.

The electric discharge device that can be employed to discharge electricity or static in an area or of an object in proximity to the enhanced light device 102. For example, a sensor of the sensor component 110 can detect that an object in proximity to the enhanced light device 102 is electrically charged, wherein the light management component 106 determine that such electrical charge of the object (e.g., the device 114 or another object) is undesirable based at least in part on the defined environment criteria. The light management component 106 can instruct the electric discharge device to discharge the electrical charge of the object. In response to the instruction, the electric discharge device can operate to desirably discharge the electrical charge of the object.

The fire extinguisher can be employed to emit or spray fire retardant or another desired liquid and/or chemical to facilitate extinguishing a fire in an area in proximity to the enhanced light device 102 or reachable by the enhanced light device 102 (e.g., via a vehicle associated with the enhanced light device 102). For instance, in response to a heat sensor and/or smoke detector sensing a fire in the area or with respect to the device 114, the light management component 106 can determine that fire retardant is to be sprayed on the fire, and can instruct the fire extinguisher to spray fire retardant on the fire. In response to the instruction, the fire extinguisher can spray fire retardant on the fire to facilitate extinguishing the fire.

The laser device can be utilized to emit a laser light to perform one or more desired tasks. For example, in response a smoke detector detecting smoke in an area in proximity to the enhanced light device 102, wherein the smoke can make it difficult for a person to see a safe path through the area, the light management component 106 can determine that the laser device should be engaged to emit a laser light that can illuminate the area and/or facilitate illuminating a safe path through the area to enable the person to be able to better see the area and safely proceed through the area. In response to, and in accordance with, an instruction from the light management component 106, the laser device can emit laser light to the area or a desired portion (e.g., safe path) of the area in proximity to the enhanced light device 102.

The enhanced light device 102 also can employ one or more indicators, which can comprise visual indicators (e.g., LEDs) or audio indicators. For example, in addition to or as an alternative to other visual information or audio information that can be presented by the enhanced light device 102, the light management component 106 can facilitate the generation and presentation of one or more visual indicators (e.g., via one or more LED indicators) and/or audio indicators (e.g., via one or more audio speakers) to facilitate providing information to a person(s) in proximity to the enhanced light device 102, and/or notifying or alerting the person(s) to a condition (e.g., environmental, emergency, and/or hazardous condition) in or near the area in proximity to the enhanced light device 102. For instance, a visual indicator can be a green-colored light (e.g., green-colored LED) and/or arrow-shaped indicator light to indicate a person is on a desired (e.g., correct, appropriate, and/or safe) travel path by traveling in the area of the enhanced light device 102, whereas visual indicator can be a red-colored light (e.g., red-colored LED) and/or X-shaped indicator light to indicate a person is not on the desired (e.g., correct, appropriate, or safe) travel path by traveling in the area of the enhanced light device 102 and/or there may be a hazard in that area.

In some embodiments, the light component 104, the light management component 106, the information component 108, the sensor component 110, and the instrument component 112 can be integrated together to form an enhanced light device 102, as more fully described herein. In other embodiments, as more fully disclosed herein, all or a portion of the light management component 106 can be implemented in a device that can be distinct from, but associated with (e.g., connected to), the light component 104, the information component 108, the sensor component 110, and/or the instrument component 112; all or a portion of the information component 108 can be implemented in a device that can be distinct from, but associated with (e.g., connected to), the light component 104, the light management component 106, the sensor component 110, and/or the instrument component 112; all or a portion of the sensor component 110 (e.g., all or a portion of the sensors of the sensor component 110) can be implemented in a device that can be distinct from, but associated with, the light component 104, the light management component 106, the information component 108, and/or the instrument component 112; and/or all or a portion of the instrument component 112 (e.g., all or a portion of the instruments, tools, etc., of the instrument component 112) can be implemented in a device that can be distinct from, but associated with, the light component 104, the light management component 106, the information component 108, and/or the sensor component 110.

It is to be appreciated and understood that, in some embodiments, an enhanced light device 102 can be or can comprise a retrofit light bulb with components (e.g., light management component, light component, information component, sensor component, instrument component) integrated therein. In certain embodiments, an enhanced light device 102 can have all or a portion of the sensors of the sensor component 110, instruments of the instrument component 112, or other components integrated into a light fixture (e.g., socket, holder, ballast) associated with the enhanced light device 102.

Figure 2:
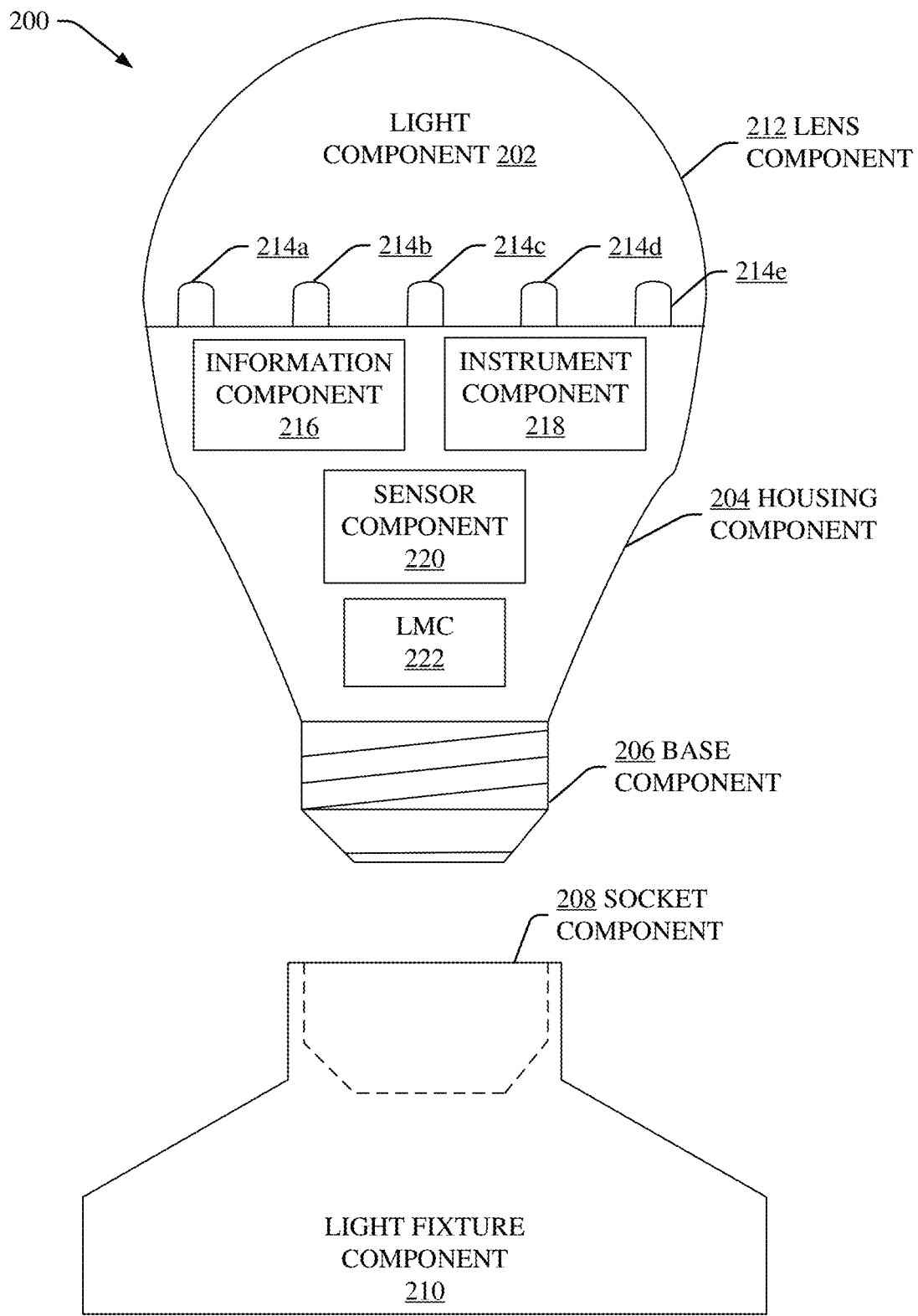
FIG. 2 depicts a block diagram of an example, non-limiting enhanced light device, in accordance with one or more aspects and embodiments described herein.

Referring briefly to FIG. 2, FIG. 2 depicts a block diagram of an example, non-limiting enhanced light device 200, in accordance with one or more aspects and embodiments described herein. The enhanced light device 200 can comprise a light component 202 (e.g., a light bulb), which can be associated with (e.g., integrated with, connected to, part of) a housing component 204 that can provide a structure or casing that can house or contain one or more components of the enhanced light device 200, wherein the structure or casing of the housing component 204 can be formed from one or more desired materials (e.g., metal, polymer material, glass, ceramic, fiberglass, etc.).

The enhanced light device 200 also can comprise a base component 206 that can be installed (e.g., as a retrofit) into a socket component 208 of a light fixture component 210 (e.g., holder or ballast) of or associated with the enhanced light device 200. The base component 206 at least partially can be formed of a conductive material (e.g., metal) to facilitate forming an electrical connection between the base component 206 and the socket component 208, when the base component 206 is inserted (e.g., screwed into or connected to) the socket component 208, to facilitate powering the enhanced light device 200. The enhanced light device 200 further can include a lens component 212 that can be associated with the light component 202 and housing component 204, wherein the lens component 212 can provide a desired lens, medium, or conduit through which light can be emitted from the light component 202 of the enhanced light device 200.

The light component 202 can comprise one or more light elements (e.g., light emitting elements or devices), such as, for example, light elements 214a, 214b, 214c, 214d, and/or 214e (e.g., LED, organic LED (OLED), filament, quantum dot, incandescent, high-intensity discharge (HID), neon, fluorescent, compact fluorescent (CFL), electroluminescent (EL), laser, or any other suitable light emitting element). The respective light elements (e.g., 214a, 214b, 214c, 214d, and/or 214e) can emit respective light beams of respective light intensities (e.g., respective illumination levels) and/or respective colors, in accordance with the defined light management criteria.

The enhanced light device 200 also can include an information component 216, an instrument component 218, a sensor component 220, and a light management component (LMC) 222. The information component 108 can determine, generate, store, obtain (e.g., retrieve from a data store of the enhanced light device 200 and/or from an extrinsic (e.g., external) data source(s)), and/or provide desirable (e.g., relevant or useful, or at least potentially relevant or useful) information based at least in part on (e.g., in response to) interaction of the user with, or proximity of the user to, the environment or the device, and/or characteristics, conditions, or context of the environment, the device, or the user, in accordance with the defined light management criteria, as more fully described herein.

The instrument component 218 can comprise one or more instruments, tools, or devices (e.g., a projectile launcher, a liquid sprayer, an air blower, . . . ) that can perform respective functions or tasks, as more fully disclosed herein. The sensor component 220 can comprise or employ one or more sensors (e.g., RFID reader, navigation device, video camera, GPS device, motion sensor, . . . ) that can sense respective conditions associated with the environment(s) (e.g., physical environment, logical environment, communication network environment) in which the enhanced light device 200 is situated or with which the enhanced light device 200 is associated, as more fully described herein.

The light management component 222 can be associated with (e.g., connected to) the light component 202, information component 216, instrument component 218, sensor component 220, and other components of the enhanced light device 200 to facilitate controlling operation of the enhanced light device 200, including controlling operation of the light component 202, information component 216, instrument component 218, sensor component 220, and other components of the enhanced light device 200, and/or other enhanced light devices associated with the enhanced light device 200, in accordance with the light profile, environment profile, device profile (e.g., of a device associated with the enhanced light device 200), and/or user profile associated with the enhanced light device 200 and generated or maintained by the light management component 222, as more fully disclosed herein. The light management component 222 can receive environment-related information from one or more sensors of the sensor component 220 and/or from another source(s) (e.g., another enhanced light device) of environment-related information and/or device-related information, wherein the environment-related information can relate to an environment in an area in which the enhanced light device 200 is installed or is located and the device-related information can relate to a device associated with (e.g. attached or in proximity to) the enhanced light device 200. The light management component 222 can analyze the environment-related information and/or device-related information to generate analysis results. The light management component 222 can determine and generate an environment profile that can describe characteristics of the environment and/or a device profile that can describe the characteristics of the device, based at least in part on the analysis results, in accordance with the defined light management criteria, which can comprise environment criteria and/or device criteria.

The light management component 222 also can determine and generate a light profile for the enhanced light device 200, based at least in part on the results of the analysis of the environment profile and/or device profile, light-related information associated with the enhanced light device 200, and/or a user profile associated with a user of the enhanced light device 200, in accordance with defined light management criteria. The light-related information can comprise information regarding the capabilities, specifications, features, characteristics, status, etc., of the enhanced light device 200 and components (e.g., light component 202, information component 216, instrument component 218, sensor component 220, . . . ) thereof. The light management component 222 can employ the light profile to configure (e.g., automatically, dynamically, or self configure) one or more parameters (e.g., by setting or modifying a parameter(s)) of the enhanced light device 200, wherein such configuration of the enhanced light device 200 can be based at least in part on conditions (e.g., current conditions, predicted future conditions) of the environment in the area in which the enhanced light device 200 is installed or is located, as determined, for example, by the light management component 222 from the environment profile, device profile, and/or the user profile. The configuration of the enhanced light device 200 and the operation of the enhanced light device 200, as controlled by the light management component 222, can enable the enhanced light device 200 to take action (e.g., perform a responsive action) in response to the characteristics or conditions of the environment in the area in which the enhanced light device 200 is installed or is located and/or the characteristics or conditions of the device associated with the enhanced light device 200. When the light management component 222 determines a particular action(s) is appropriate (e.g., in accordance with the defined light management criteria), the particular action(s) can comprise, for example, determining desirable (e.g., relevant or useful, or at least potentially relevant or useful) information and presenting such desirable information to the user, controlling (e.g., adjusting) one or more parameters of the light elements (e.g., 214a, 214b, 214c, 214d, and/or 214e) of the light component 202 to control one or more respective characteristics or properties of the respective light elements, and/or executing one or more tools (e.g., projectile launcher, liquid sprayer, and/or air blower, . . . ) of the instrument component 218.

It is to be appreciated and understood that, while five light elements 214*a*, 214*b*, 214*c*, 214*d*, and 214*e* are depicted in FIG. 2 for illustrative purposes only, the enhanced light device 200 can include any desired (e.g., suitable) number of light elements. It is also to be appreciated and understood that the enhanced light device 200 can comprise other components (not shown) or exclude one or more components. For example, the enhanced light device 200 can exclude the lens component 212 and/or the light fixture component 210. In another example, the enhanced light device 200 can comprise one or more reflectors, one or more shades, one or more positioning motors, and/or any other components desired (e.g., that are suitable), in accordance with functionality described herein.

Figure 3:
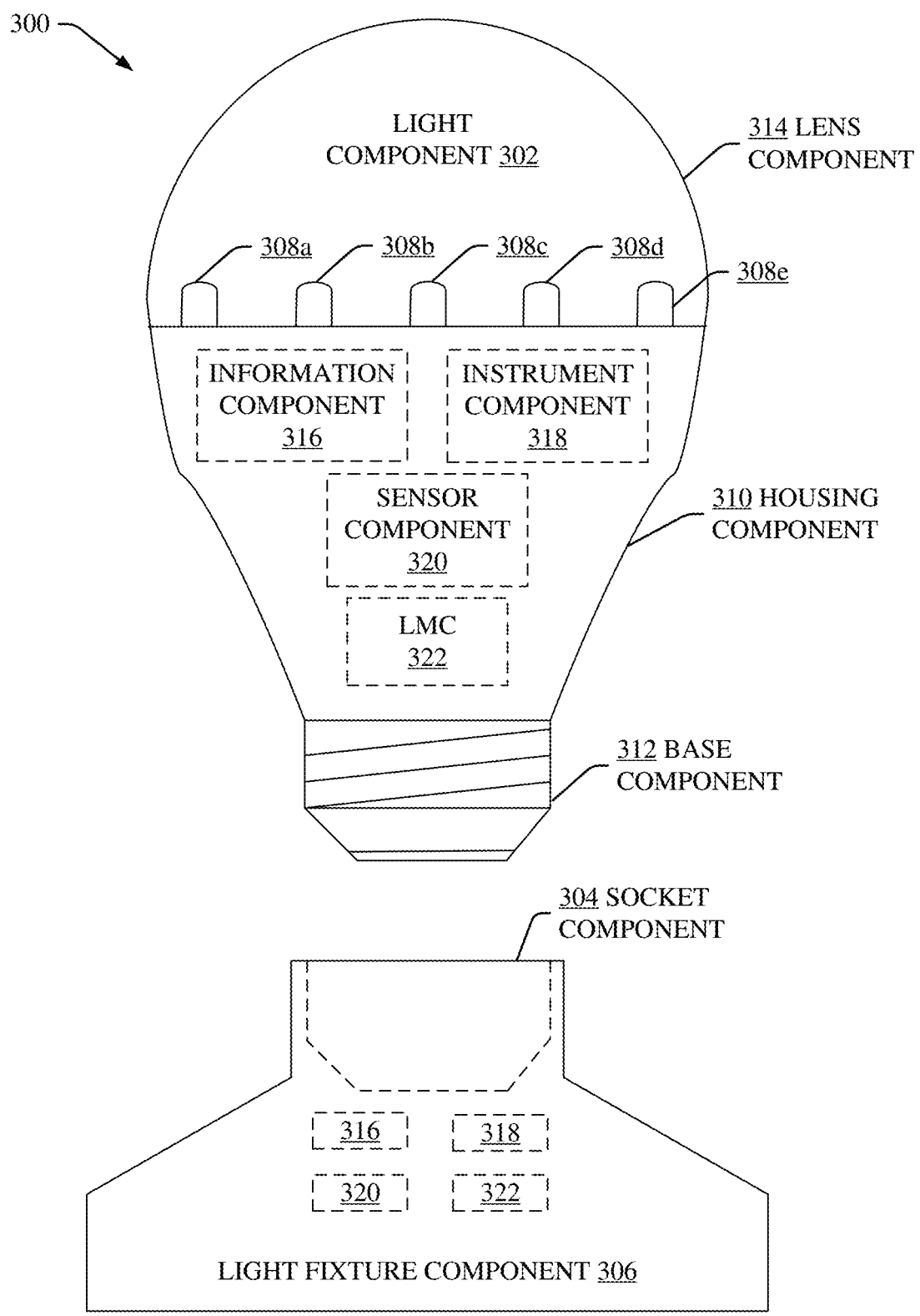
FIG. 3 illustrates a block diagram of an example, non-limiting enhanced light device, in accordance with one or more aspects and embodiments of the disclosed subject matter.

FIG. 3 illustrates a block diagram of an example, non-limiting enhanced light device 300, in accordance with one or more aspects and embodiments of the disclosed subject matter. The enhanced light device 300 can comprise a light component 302. The enhanced light device 300 can comprise a socket component 304 and a light fixture component 306 (e.g., self-aware light fixture component). The light component 302 can comprise one or more light emitting elements, such as, for example, light emitting elements 308*a*, 308*b*, 308*c*, 308*d*, and/or 308*e*. The enhanced light device 300 also can include a housing component 310, a base component 312, a lens component 314, an information component 316, an instrument component 318, a sensor component 320, and a light management component (LMC) 322. The base component 312 of the light component 302 can be installed into the socket component 304 of the light fixture component 306.

The enhanced light device 300 can comprise the same or similar functionality as the enhanced light device 200 of FIG. 2 (and enhanced light devices disclosed herein). The difference between the enhanced light device 300 and the enhanced light device 200 can be that a portion of the information component 316, all or a portion of instrument component 318, all or a portion of the sensor component 320, and/or all or a portion of the light management component 322 can be situated in or associated with the light fixture component 306, and/or none or a portion of the information component 316, none or a portion of the instrument component 318, none or a portion of the sensor component 320, and/or none or a portion of the light management component 322 can be situated in the housing component 310 of the enhanced light device 300.

It is to be appreciated and understood that the light fixture component 306 (e.g., self-aware light fixture component) can include other components (not shown) or exclude one or more components. For example, the light fixture component 306 can include one or more light elements (e.g., light emitting devices or indicators), one or more reflectors, one or more shades, one or more positioning motors, or any other suitable components needed according to functionality described herein. It is to be appreciated that the light component 302 can communicate with the light fixture component 306 via a wired or wireless communication connection. For example, the base component 312 can be connected to the socket component 304, which can form a wired communication connection.

While FIGS. 2 and 3 depict an enhanced light device (e.g., 200, 300) that can be fit or inserted into a light fixture component (e.g., 210, 306), it is to be appreciated and understood that a single light fixture component can comprise a plurality of socket components (e.g., 208, 304) for installation of a plurality of lights (e.g., light components or bulbs).

Figure 4:
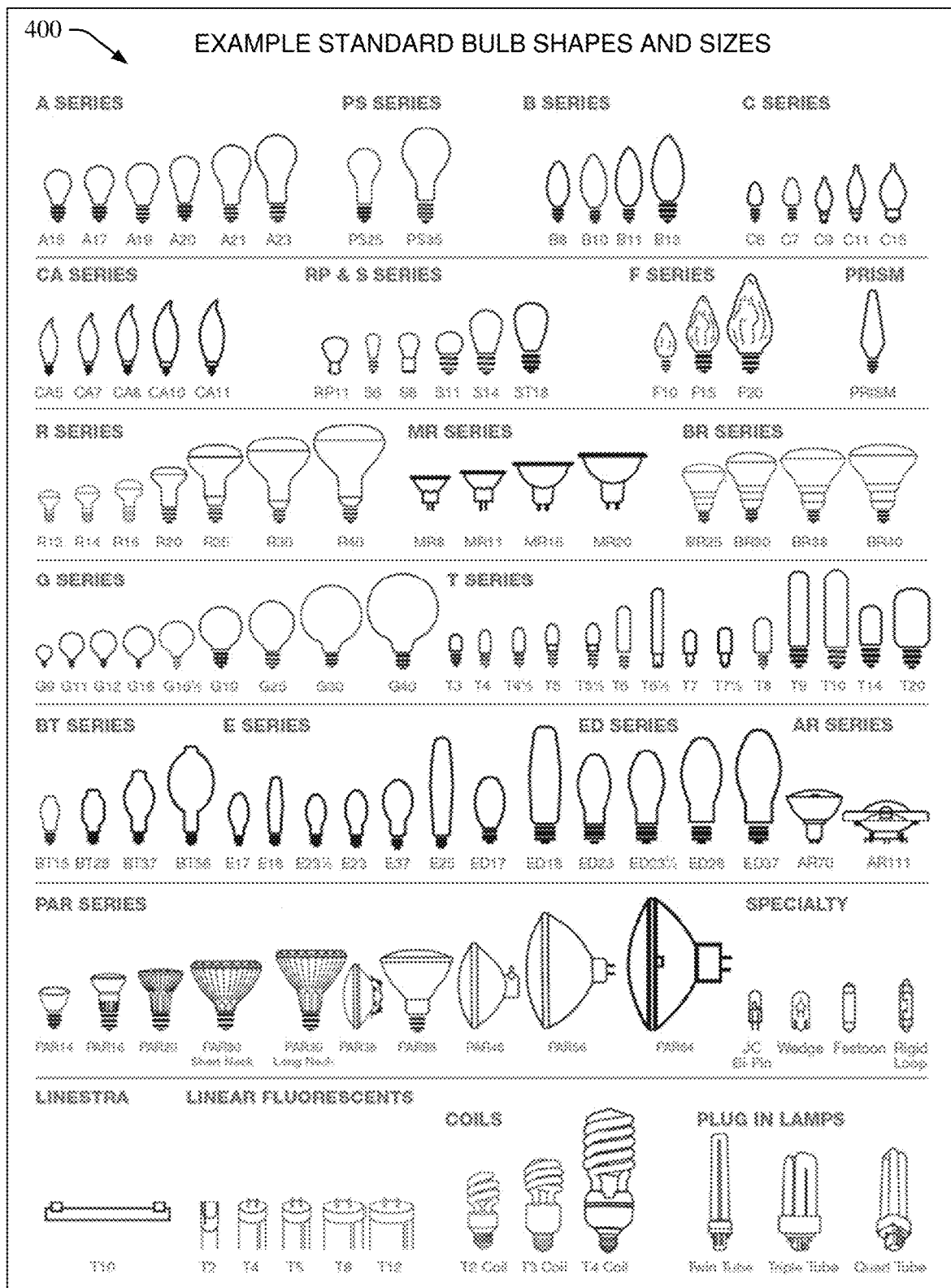
FIG. 4 presents an example, non-limiting light bulb diagram of standard shapes and sizes of light bulbs that can be employed for one or more light elements of a light component for an enhanced light device, in accordance with various aspects and embodiments of the disclosed subject matter.

Referring briefly to FIG. 4 (along with FIGS. 1, 2, and 3), FIG. 4 presents an example, non-limiting light bulb diagram 400 of standard shapes and sizes of light bulbs that can be employed for one or more light elements of a light component (e.g., 102, 202, 302) for an enhanced light device, in accordance with various aspects and embodiments of the disclosed subject matter. It is to be appreciated and understood that the enhanced light device can be customized to be in any suitable shape and any suitable size, employing one or more light elements or bulbs having desired shapes and sizes, for an application in which an enhanced light device is to be installed, in accordance with various aspects and embodiments of the disclosed subject matter.

Figure 5:
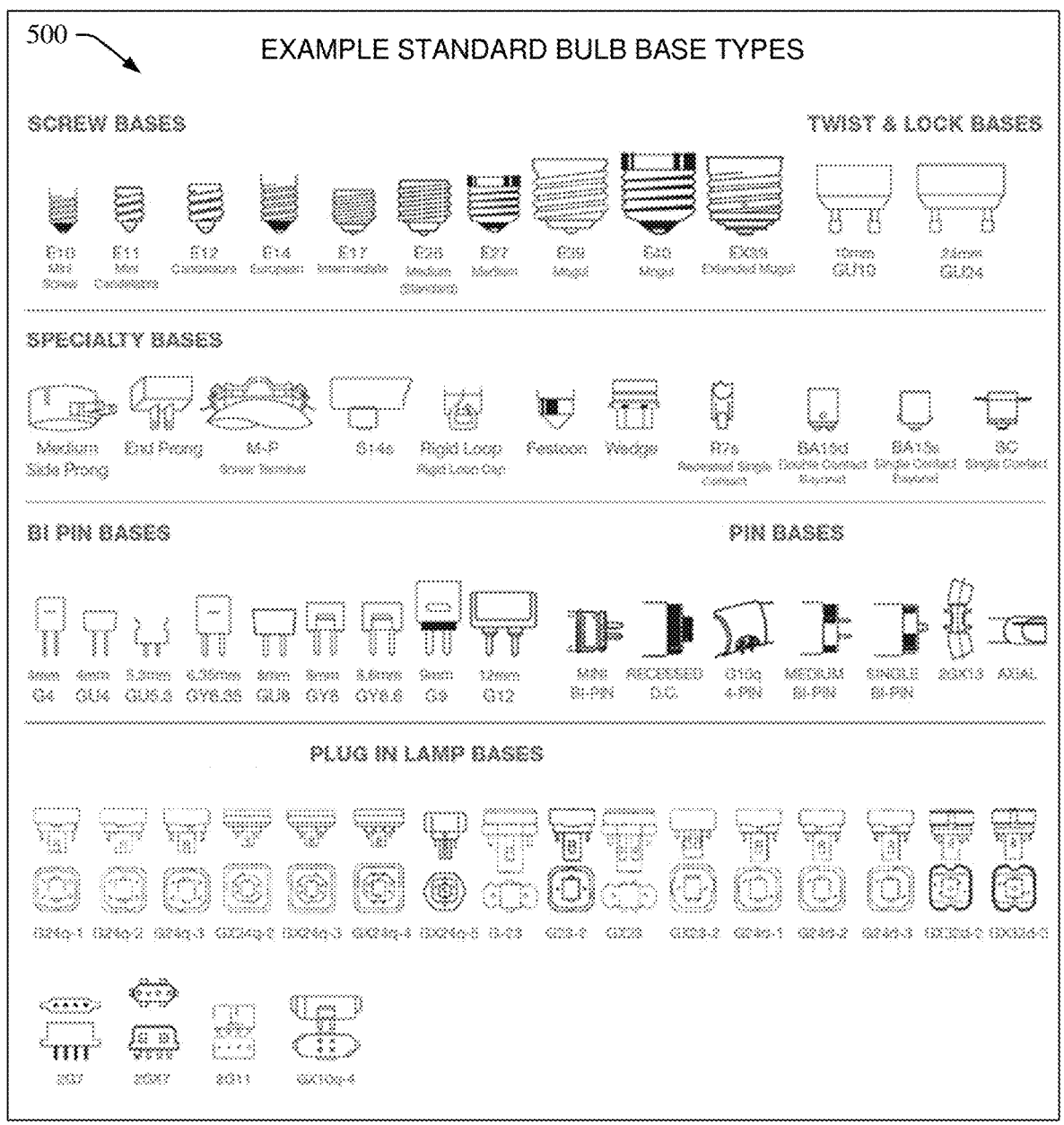
FIG. 5 illustrates an example, non-limiting diagram of standard types of base components, in accordance with various aspects and embodiments of the disclosed subject matter.

Referring briefly to FIG. 5 (along with FIGS. 1, 2, and 3), FIG. 5 illustrates an example, non-limiting diagram 500 of standard types of base components (e.g., that can be employed for base component 206 or 312), in accordance with various aspects and embodiments of the disclosed subject matter. It is to be appreciated and understood that a base component (e.g., 206, 312) can be customized to be in any desired (e.g., suitable) form for an application in which a light element(s) or bulb(s) of the enhanced light device is to be installed. Likewise, the socket component (e.g., 208, 304) can be customized to be compatible with the base component (e.g., 206, 312). Additionally, the light fixture component (e.g., 210, 306) can be customized to be in any desirable (e.g., suitable) form for an application in which a light element(s) or bulb(s) of the enhanced light device is to be installed.

With further regard to FIG. 1 (along with FIGS. 2 and 3), the system 100 (e.g., the enhanced light device 102 of the system 100) can comprise one or more power sources (not shown). Non-limiting examples the one or more power sources can include electrical grid power, a battery, an electrochemical cell, a fuel cell, natural gas generated electric power, compressed air generated electric power, diesel fuel generated electric power, gasoline generated electric power, oil generated electric power, propane generated electric power, a nuclear power system, a solar power system, a wind power system, a piezoelectric power system, micro-electrical mechanical systems (MEMS)-generated electric power, an inductive power system, a radio-frequency power system, a wireless power transfer mechanism, and/or any other suitable power source. In an example, the enhanced light device 102 of the system 100 can have a constantly, or substantially constantly, available power source, such as that provided by an electrical power grid. In another example, the enhanced light device 102 can comprise a temporary power source, such as a battery (e.g. disposable battery or rechargeable battery). In a further example, the enhanced light device 102 can generate and store its own power, such as by solar via a solar cell, fuel cell, radio-frequency harvesting, induction, piezoelectric, electro-mechanical, chemical, nuclear, carbon based-fuel, and/or any other suitable self-generating power source. This can be advantageous for long-term installations (e.g. where frequent battery changes would be required) that do not have a constantly available power source, such as an outdoor environment where a power outlet may not readily be available (e.g. a porch, a yard, a camping site, a farm field, a park, a sports field, etc.), or an indoor location where a power outlet may not readily be available (e.g. a closet, a sunroom, a cabinet, a drawer, a garage, a barn, a shed, an indoor location where an extension cord is not desired, etc.). It is to be appreciated and understood that the enhanced light device 102 can comprise a plurality of different power sources, with one or more power sources acting as a backup for another power source. It is to be appreciated and understood that the enhanced light device 102 also can include configurable power sources. For example, the enhanced light device 102 can include a modular configuration that can allow for one or more power sources to be added or removed by a manufacturer or user.

An enhanced light device (e.g., the enhanced light device 102 of the system 100, enhanced light device 200, enhanced light device 300) can comprise one or more computers, one or more processors, one or more memories, and/or one or more programs. An enhanced light device (e.g., 102, 200, 300) can communicate via any suitable form of wireless or wired communication using a communication component or device of or associated with the enhanced light device. Non-limiting examples of wireless communication can include, for example, radio communication, optical communication, sonic communication, electromagnetic induction communication, or any other suitable wireless communication.

An enhanced light device (e.g., 102, 200, 300) can be constructed of any desired (e.g., suitable) material(s) appropriate for environments in which the enhanced light device will operate. An enhanced light device can have suitable protection against an environment in which the enhanced light device will operate, wherein non-limiting examples of the materials that can be used to construct the enhanced light device can comprise materials that can be weather resistant, crush resistant, fire resistant, heat resistant, cold resistant, pressure resistant, impact resistant, liquid and/or solid material ingress protected or resistant, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the enhanced light device can operate.

The computer processing systems, computer-implemented methods, apparatus and/or computer program products of an enhanced light device (e.g., 102, 200, 300) can employ hardware and/or software that can solve problems that can be highly technical in nature (e.g., related to complex coordination between respective enhanced light devices, complex coordination between one or more enhanced light devices and another device, performance of self-configuration of an enhanced light device(s)) that are not abstract and that cannot be performed as a set of mental acts by a human. One or more embodiments of the subject computer processing systems, methods, apparatuses and/or computer program products can enable one or more enhanced light devices (e.g., 102, 200, 300) to coordinate amongst themselves, and optionally with other devices (e.g., communication devices), to perform actions to understand the environment in which the one or more enhanced light devices are installed, determine an objective (e.g. goal, intention, purpose, action, operation, configuration, etc.) of such installation, perform a self-configuration of the enhanced light device(s) according to such determined objective, and operate to achieve such determined objective. For example, the enhanced light devices can employ artificial intelligence to learn their environment and/or association with a device, and learn actions to facilitate performing self-configuration of the enhanced light devices and to operate for a determined objective of the installation in the environment and/or the association with the device.

Figure 6:
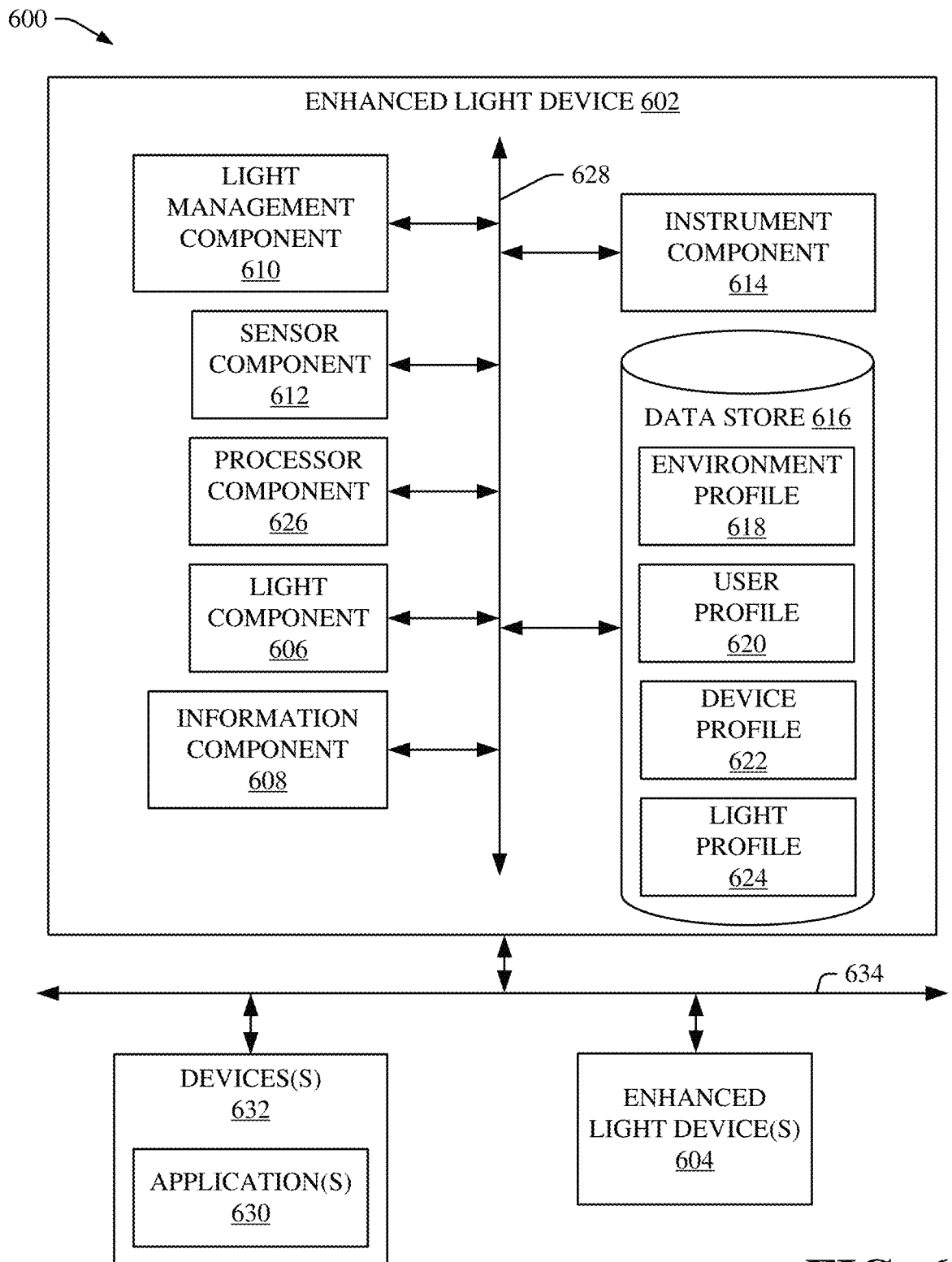
FIG. 6 illustrates a block diagram of an example, non-limiting system that can employ a set of enhanced light devices that can coordinate with each other and/or another device(s), in accordance with various aspects and embodiments of the disclosed subject matter.

FIG. 6 illustrates a block diagram of an example, non-limiting system 600 that can employ a set of enhanced light devices that can coordinate with each other and/or another device(s), in accordance with various aspects and embodiments of the disclosed subject matter. The set of enhanced light devices can comprise a plurality of enhanced light devices, including an enhanced light device 602 and one or more other enhanced light devices, such as enhanced light device(s) 604. The enhanced light devices 602 and 604 can comprise the same or similar components and functionality as the enhanced light devices (e.g., enhanced light device 102 of system 100, enhanced light device 200, enhanced light device 300) disclosed herein.

In accordance with various embodiments, the enhanced light devices 602 and 604 can be or include the structure and/or functionality of one or more of enhanced light devices 102, 200, or 300, and/or any other structure and/or functionality described herein for enhanced light devices. In one example, the enhanced light device 602 can be a different type of diffusion light device than the enhanced light device 604. In another example, the enhanced light device 604 can be the same type of enhanced light device as the enhanced light device 602 and/or can include one or more components (e.g., light component, information component, light management component, instrument component, and/or sensor component, . . . ) that can be found in the enhanced light device 602. It is to be appreciated and understood that, in the disclosure herein in which more than one enhanced light device is employed, the enhanced light devices can comprise one or more enhanced light devices 602 and/or one or more enhanced light devices 604.

The respective enhanced light devices (e.g., 602, 604) of the set of enhanced light devices can learn, understand, and react (e.g., respond) to the respective environments in which the respective enhanced light devices are installed or located and/or the respective devices with which the respective enhanced light devices are associated (e.g., attached or in proximity), determine respective objectives of such installation, location, or association, perform respective self-configuration of the respective enhanced light devices according to the respective determined objectives and the defined light management criteria, and respectively operate to achieve the respective determined objectives, in accordance with one or more aspects and embodiments described herein.

The enhanced light device 602 can include a light component 606 comprising one or more light elements, an information component 608, a light management component 610, a sensor component 612 comprising one or more sensors, and an instrument component 614 comprising one or more instruments. The light component 606, information component 608, light management component 610, sensor component 612, and instrument component 614 can respectively be the same as or similar to, and/or can comprise the same or similar functionality as, respective components (e.g., respectively named components), as more fully described herein.

The enhanced light device 602 also can include or otherwise be associated with one or more data stores (e.g., one or more memories), such as data store 616, that can store machine (e.g., computer) executable components (e.g., machine executable components can include, but are not limited to, a portion of the light component 606, all or a portion of the information component 608, all or a portion of the light management component 610, a portion of the sensor component 612, a portion of the instrument component 614, and/or all or a portion of other associated components). The data store 616 can store an environment profile 618 that can comprise data (e.g., environment data) that can relate to and/or describe characteristics (e.g., attributes), conditions, etc., of an environment in which the enhanced light device 602 is installed or located.

The data store also can store a user profile(s) 620 of a user(s) that can comprise user preferences and/or other information associated with the user. The user preferences and/or other information can include desired parameter settings, features settings, and/or function settings, etc., of the enhanced light device 602. The user can select such settings via a user interface (e.g., keyboard or keypad, voice interface, or touch display screen) of the enhanced light device 602 and/or via a user interface and/or an application 630 of another device 632 (e.g., communication device) that can communicate with the enhanced light device 602. There can be separate user profiles for different users of the enhanced light device 602. The device 632 can be, for example, a mobile phone, a computer, an electronic tablet or pad, an electronic gaming device, a television (e.g., smart television, Internet protocol television (IPTV)), electronic eyewear or bodywear, or other type of device.

The data store 616 further can store a device profile 622 that can comprise data (e.g., device-related data) that can relate to and/or describe characteristics (e.g., attributes), conditions, functions, etc., of a device with which the enhanced light device 602 is associated (e.g., a device in or on which the enhanced light device 602 is installed or attached, or a device in proximity to the enhanced light device 602).

The data store 616 also can store a light profile 624 that can comprise data that can relate to and/or describe the environment profile 618, the user profile 620, and/or the device profile 622, capabilities of the enhanced light device 602 and configuration of the enhanced light device 602. For example, the data in the light profile 624 can comprise specifications of the enhanced light device 602, parameters of the enhanced light device 602, environmental data of the environment profile 618, user data or preferences of the user profile 620, device-related data of the device profile 622, mapping information that can map the characteristics, conditions, functions, etc., of or related to the environment, device, and/or user preferences or user input information (e.g., information regarding parameter or function settings as selected by the user and/or obtained from a user profile 620) associated with a user to characteristics of the enhanced light device 602, to respective functions of the enhanced light device 602, to respective parameters of respective components of the enhanced light device 602, and/or to responsive actions that can be performed by the enhanced light device 602 (e.g., by the light component 606, information component 608, light management component 610, sensor component 612, instrument component 614, and/or the processor component 626, . . . ) to respond to an interaction of the user with, or a condition(s) (e.g., environmental condition(s), device-related condition(s)) of or associated with, the environment or device.

The data store 616 can store data structures (e.g., user data, metadata), code structure(s) (e.g., modules, objects, hashes, classes, procedures) or instructions, information relating to operation of the enhanced light device 602 or associated enhanced light devices (e.g., 604), parameters, responsive actions (e.g., responsive to device-related conditions of a device or environmental conditions of the environment), policies, defined light management criteria, defined environment criteria, defined device criteria, algorithms (e.g., defined light management algorithm(s)), protocols, interfaces, tools, and/or other information, to facilitate controlling operations associated with the enhanced light device 602. In an aspect, the processor component 626 can be functionally coupled (e.g., through a system bus 628 and/or a memory bus (not shown in FIG. 6)) to the data store 616 in order to store and retrieve information desired to operate and/or confer functionality, at least in part, to the light component 606, information component 608, light management component 610, sensor component 612, instrument component 614, the processor component 626, and data store 616, etc., and/or substantially any other operational aspects of the enhanced light device 602.

The enhanced light device 602 also can include or otherwise be associated with at least one processor component, including the processor component 626, that can execute the machine executable components and/or machine executable instructions stored in the data store 616. The processor component 626 can work in conjunction with the other components (e.g., the light component 606, information component 608, the light management component 610, sensor component 612, instrument component 614, data store 616, . . . ) to facilitate performing the various functions of the enhanced light device 602. The processor component 626 can employ one or more processors, microprocessors, or controllers that can process data, such as information relating to operation of the enhanced light device 602 or associated enhanced light devices (e.g., 604), parameters, responsive actions (e.g., responsive to device-related conditions of a device or environmental conditions of the environment), policies, defined light management criteria, defined environment criteria, defined device criteria, algorithms (e.g., defined light management algorithm(s)), protocols, interfaces, tools, and/or other information, to facilitate operation of the enhanced light device 602, as more fully disclosed herein, and control data flow between the enhanced light device 602 and other components or devices (e.g., one or more other enhanced light device (e.g., 604) associated with the communication network 634, one or more devices, such as device(s) 632, associated with the communication network 634, network devices of the communication network 634, data sources, applications, . . . ) associated with the enhanced light device 602.

The system bus 628 of the enhanced light device 602 can couple the various components including, but not limited to, the light component 606, information component 608, light management component 610, the sensor component 612, the instrument component 614, the data store 616, the processor component 626, and/or other components of the enhanced light device 602 to each other. The one or more other enhanced light devices (e.g., 604) can comprise the same or similar components and/or functionality as the enhanced light device 602. For reasons of brevity, the components (e.g., light component, information component, light management component, sensor component, instrument component, data store, processor component, . . . ) of the one or more other enhanced light devices (e.g., 604) are not shown in FIG. 6.

The communication network 634 can comprise a macro communication network and/or a micro communication network. The macro communication network can be, can comprise, or can be associated with a core network, a cellular network, an IP-based network, wireless fidelity (Wi-Fi), Wi-Max, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Wi-Max, Gi-Fi, Hi-Fi, Bluetooth, ZigBee, etc., and/or can be associated with (e.g., connected to) the macro communication network. The micro communication network can be or can comprise, for example a local area network (LAN) or wireless LAN (WLAN), that can facilitate connecting certain devices (e.g., enhanced light devices (e.g., 602, 604) and/or other devices (e.g., 632)) associated with the micro communication network to each other and/or to the macro communication network. The macro communication network and/or a micro communication network can employ radio communication, microwave communication, satellite communication, optical communication, sonic communication, electromagnetic induction communication, or any other desired (e.g., suitable) communication technology.

Respective communication devices (e.g., enhanced light device 602, enhanced light device(s) 604, and/or device(s) 632, . . . ) can be associated with (e.g., communicatively connected to) the communication network 634 via a wireless communication connection or a wireline (e.g., wired) communication connection (e.g., via a cell and associated base station). The respective communication devices (e.g., enhanced light device 602, enhanced light device(s) 604, and/or device(s) 632, . . . ) can operate and communicate in the communication network environment. At various times, a communication device (e.g., enhanced light device 602, enhanced light device(s) 604, and/or device(s) 632, . . . ) can be communicatively connected via a wireless communication connection(s) to one or more radio access networks (RANs) (not shown), which can comprise one or more base stations (not shown) to communicatively connect the communication device to the communication network 634 to enable the communication device to communicate with other communication devices associated with (e.g., communicatively connected to) the communication network 634 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 634 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 634 (e.g., macro communication network, micro communication network, core network, cellular network, or a network comprising a core network, a cellular network, and/or an IP-based network) can facilitate routing voice and data communications between a communication device(s) (e.g., enhanced light device 602, enhanced light device(s) 604, and/or device(s) 632, . . . ) and another communication device associated with the communication network 634 in the communication network environment. The communication network 634 also can allocate resources to the communication devices in the communication network 634, convert or enforce protocols, establish and enforce quality of service (QOS) for the communication devices, provide applications or services in the communication network 634, translate signals, and/or perform other desired functions to facilitate system interoperability and communication in the communication network 634 (e.g., wireless portion of the communication network 634 or wireline portion of the communication network 634). The communication network 634 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., enhanced light device 602, enhanced light device(s) 604, and/or device(s) 632, . . . ) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., a macro base station or micro base station) can serve a specified coverage area to facilitate communication by the communication device(s) (e.g., enhanced light device 602, enhanced light device(s) 604, and/or device(s) 632, . . . ) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., enhanced light device 602, enhanced light device(s) 604, and/or device(s) 632, . . . ) located in the respective area covered by the respective cell, where such coverage can be achieved via a wireless link (e.g., uplink (UL), downlink (DL)). When an attachment attempt is successful, the communication device(s) (e.g., enhanced light device 602, enhanced light device(s) 604, and/or device(s) 632, . . . ) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) (e.g., enhanced light device 602, enhanced light device(s) 604, and/or device(s) 632, . . . ) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

It is to be appreciated and understood that, in some embodiments, the enhanced light device 602 can establish a direct communication connection (e.g., a direct wireline or wireless communication connection) with the other enhanced light device(s) 604 and/or the device(s) 632, and can communicate with the other enhanced light device(s) 604 and/or the device(s) 632 without using the communication network 634.

The device 632 can be any electronic device that can electronically interact (e.g. unidirectional interaction or bidirectional interaction) with the enhanced light device 602 and/or enhanced light device(s) 604, wherein non-limiting examples of a device 632 can comprise a wearable electronic device or a non-wearable electronic device. It is to be appreciated that interaction can include in a non-limiting example, communication, control, physical interaction, or any other suitable interaction between devices (e.g., between the device 632 and the enhanced light device 602). A wearable device (e.g., a wearable communication device) can include, for example, heads-up display glasses, a monocle, eyeglasses, contact lens, sunglasses, a headset, a neck band, a watch, a visor, a cap, a mask, a headband, clothing, or any other suitable device that can be worn by a human or non-human user, wherein the wearable device comprises electronic and communication components. Non-wearable devices (e.g., a non-wearable communication device) can comprise, for example, a mobile device, a mobile phone, a camera, a camcorder, a video camera, a laptop computer, a tablet device (e.g., an electronic tablet or electronic notebook), a desktop computer, a server system, a set top box (e.g., a cable set top box, a satellite set top box), a cable modem, a television set, a monitor, a media extender device, a blu-ray device, a DVD (digital versatile disc or digital video disc) device, a compact disc device, a video game system, a portable video game console, an audio/video receiver, a radio device, a portable music player, a navigation system (e.g., a GPS system), a car stereo, a mainframe computer, a robotic device, an artificial intelligence system, a home automation system, a security system, a messaging system, a presentation system, a sound system, a warning system, a fire suppression system, a lighting system, a network storage device, a web server device, a network switching device, a network routing device, a gateway device, a network hub device, a network bridge device, a control system, a washing machine, a dryer, a refrigerator, a dishwashing machine, an oven, a stove, a microwave, a coffee maker, a kitchen appliance, a toy, or any other suitable device. For instance, in some embodiments, the device 632 can be or comprise a communication device that can enable the device 632 to communicate with the enhanced light device 602 and/or the enhanced light device(s) 604 over the communication network 634 or via a direct communication connection (e.g., a direct wireline or wireless communication connection). It is to be appreciated that the device 632 can be employed by a user to interact with the enhanced light device 602 and/or the enhanced light device(s) 604.

In some embodiments, two or more of the respective enhanced light devices (e.g., 602, 604) can coordinate with each other to understand the respective environments (and associated devices (e.g., 632)) in which the respective enhanced light devices (e.g., 602, 604) are installed or located, determine respective objectives of the respective installations or locations, perform respective self-configurations according to the respective objectives, and respectively operate to achieve the respective objectives.

For instance, the enhanced light device 602 can be associated with an area and/or a device (e.g., device 632 located in the area), and another enhanced light device(s) 604 can be associated with another area(s) and/or another device(s) (e.g., another device 632 located in the other area(s)), which can be completely distinct from the area or can partially cover (e.g., encompass) the area associated with the enhanced light device 602. The light management component 610 (e.g., a network component of the light management component 610) of the enhanced light device 602 can detect and contact the other enhanced light device(s) 604 (e.g., a network component(s) of the other light management component(s) of the other enhanced light device(s) 604) via the communication network 634 or a direct communication connection. The respective light management components of the respective enhanced light devices (e.g., 602, 604) can exchange network-related information and/or other information to facilitate setting up a communication connection with each other, and can establish the communication connection(s) between the enhanced light device 602 and the other enhanced light device(s) 604 based at least in part on the network-related information and/or other information. The communication connection can be a wireline communication connection and/or a wireless communication connection.

The enhanced light device 602 can communicate, via the communication connection and the communication network 634 (or direct communication connection), the environment profile 618, user profile 620, device profile 622, and/or the light profile 624, associated with the enhanced light device 602 to the at least one other enhanced light device 604, wherein the environment profile 618 can comprise environmental profile information regarding the environmental conditions associated with the area associated with (e.g., in proximity to) the enhanced light device 602, the user profile 620 can comprise information regarding user preferences and/or other information associated with the user, the device profile 622 can include device profile information regarding the characteristics, conditions, functions, etc., associated with the device (e.g., device 632), and the light profile 624 can comprise light profile information regarding the features (e.g., characteristics, attributes, functions, . . . ) of the enhanced light device 602. The other enhanced light device(s) 604 can communicate, via the communication connection and the communication network 634 (or the direct communication connection), its environment profile(s), user profile(s), device profile(s), and/or light profile(s), associated with the other enhanced light device(s) 604 to the enhanced light device 602, wherein the environment profile(s) associated with the other enhanced light device(s) 604 can comprise environmental profile information regarding the environmental conditions associated with the other area(s) associated with (e.g., in proximity to) the other enhanced light device(s) 604, the user profile(s) associated with the other enhanced light device(s) 604 can comprise information regarding user preferences and/or other information associated with the other user(s), the device profile(s) associated with the other enhanced light device(s) 604 can include device profile information regarding the characteristics, conditions, functions, etc., associated with the other device(s) (e.g., other device(s) 632), and the light profile(s) associated with the other enhanced light device (s) 604 can comprise light profile information regarding the features (e.g., characteristics, attributes, functions, . . . ) of the other enhanced light device(s) 604.

The respective enhanced light devices (e.g., 602, 604) can determine and coordinate respective actions, which can be responsive to the respective environmental conditions associated with the respective enhanced light devices (e.g., 602, 604), respective interactions of users with respective devices, respective conditions associated with the respective devices (e.g., 632), respective contexts of the environments, users, devices, enhanced light devices, etc., between the enhanced light device 602 and the other enhanced light device(s) 604, based at least in part on the results of analyzing the respective environmental profile information, the respective user profile information, the respective device profile information, and/or the respective light profile information, associated with the respective enhanced light devices (e.g., 602, 604). For instance, the light management component 610 of the enhanced light device 602, and/or another light management component(s) of the other enhanced light device(s) 604, can analyze (e.g., respectively analyze) the respective environmental profile information, the respective user profile information, the respective device profile information, and/or the respective light profile information, and/or associated with the respective enhanced light devices (e.g., 602, 604). Based at least in part on the results (e.g., the respective results) of the analysis (e.g., the respective analysis), the light management component 610 of the enhanced light device 602, and/or the other light management component(s) of the other enhanced light device(s) 604, can determine the respective actions that are to be performed by the respective enhanced light devices (e.g., 602, 604), in accordance with the defined light management criteria. The enhanced light device 602 (e.g., light management component 610) and the other enhanced light device(s) 604 (e.g., other light management component(s)) can negotiate and coordinate with each other to facilitate determining the respective actions that the respective enhanced light devices (e.g., 602, 604) are to perform to be responsive to the respective environmental conditions, the respective interactions of users with the respective devices, the respective device conditions, and/or the respective contexts, etc., associated with the respective enhanced light devices (e.g., 602, 604).

In response to determining the respective actions and coordinating the respective actions between the respective enhanced light devices (e.g., 602, 604), the respective enhanced light devices (e.g., 602, 604) can perform the respective actions. For instance, the enhanced light device 602 and the other diffusion light device (s) 604 can perform their respective actions in a coordinated manner to be responsive to the respective environmental conditions, the respective interactions of users with the respective devices, the respective device conditions, and/or the respective contexts, etc., associated with the respective enhanced light devices (e.g., 602, 604). For example, the light component 606, information component 608, light management component 610, instrument component 614, and/or the processor component 626 of the enhanced light device 602 can respectively perform operations to facilitate performing the action(s) (e.g., responsive action(s)) determined for the enhanced light device 602. Similarly, the other light component(s), other information component(s), other light management component(s), other instrument component(s), and/or other processor component(s) of the other enhanced light device(s) 604 can respectively perform operations to facilitate performing the action(s) determined for the other enhanced light device(s) 604.

It is to be appreciated and understood that the various aspects of systems (e.g., the system 600 or other system(s) disclosed herein), apparatuses or processes described or explained in this disclosure can constitute machine-executable component(s) embodied within machine(s) (e.g., computer(s)), e.g., embodied in one or more machine-readable mediums (or media) associated with one or more machines. Such component(s), when executed by the one or more machines, e.g., one or more computers, one or more computing devices, one or more virtual machines, etc., can cause the one or more machines to perform the operations described herein.

It also is to be appreciated and understood that, in some implementations, a user (e.g., an operator) can employ a user interface (not shown) of an application 630 on a device (e.g., 632) to enter information that can override data in the environment profile 618, the user profile 620, the device profile 622, the light profile 624, and/or actions determined by the enhanced light device 602. The application 630 can generate and present, via a display screen and/or audio sensor(s) (e.g., microphone(s)) of the device 632, one or more user interfaces with which the user can interact to input information, such as user preferences, selections, commands, and/or other information, that can be used to facilitate selecting or setting parameters, features, functions, etc., of the enhanced light device 602 (e.g., to the extent permitted in accordance with the defined light management criteria. In certain implementations, as an alternative to using the application 630, the user can utilize a web browser presented on the device 632 to interact with the enhanced light device 602 to input (e.g., enter or communicate) the information (e.g., the user preferences, selections, commands, and/or other information).

In some implementations, the enhanced light device 602 can enhance (e.g. upgrade, augment, improve, increase, etc.) operation of a legacy (e.g., older) device. There are many legacy devices that can operate reliably for a long period of time. However, given their lengthy operational lifecycles, they may fall behind in operational capabilities as compared to newer devices. Many of these legacy devices can have lights installed in them. The enhanced light device 602 can be installed in a legacy device as a retrofit to enhance the capability of the legacy device. A legacy device can include any device that can have a light which can be replaced with the enhanced light device 602. Furthermore, a legacy device can include any device that does not have a light, but on which the enhanced light device 602 can be fitted. Non-limiting examples of legacy devices can include a refrigerator, a freezer, a dryer, a washing machine, a vehicle, a machine, a flashlight, a range hood, an oven, a microwave, or any other suitable legacy device.

In certain implementations, the enhanced light device 602 can employ a high-speed data transfer mechanism (e.g. Li-Fi) to transfer content to another enhanced light device(s) 604 and/or a device(s) 632. For example, the enhanced light device 602 can transfer a movie file of a movie to a television, laptop, electronic tablet, or cell phone using Li-Fi for playback on such device.

In some embodiments, one or more enhanced light devices (e.g., 602) can employ their processing capabilities to offload or enhance processing operations of another device(s) 632 communicating with the one or more enhanced light devices (e.g., 602).

In certain implementations, a set of enhanced light devices (e.g., 602, 604, . . . ) in a building can employ their processing, memory, and/or communication capabilities to act as a cloud platform for the building.

In some implementations, the enhanced light device 602 can take an analog input, convert the analog input to digital output, and/or employ artificial intelligence with a library of functions/templates to facilitate self-configuration and/or self-operation of the enhanced light device 602.

It is to be appreciated and understood that any criteria or thresholds disclosed herein can be pre-defined, operator specified, and/or dynamically determined, for example, based at least in part on learning algorithms.

Figure 7:
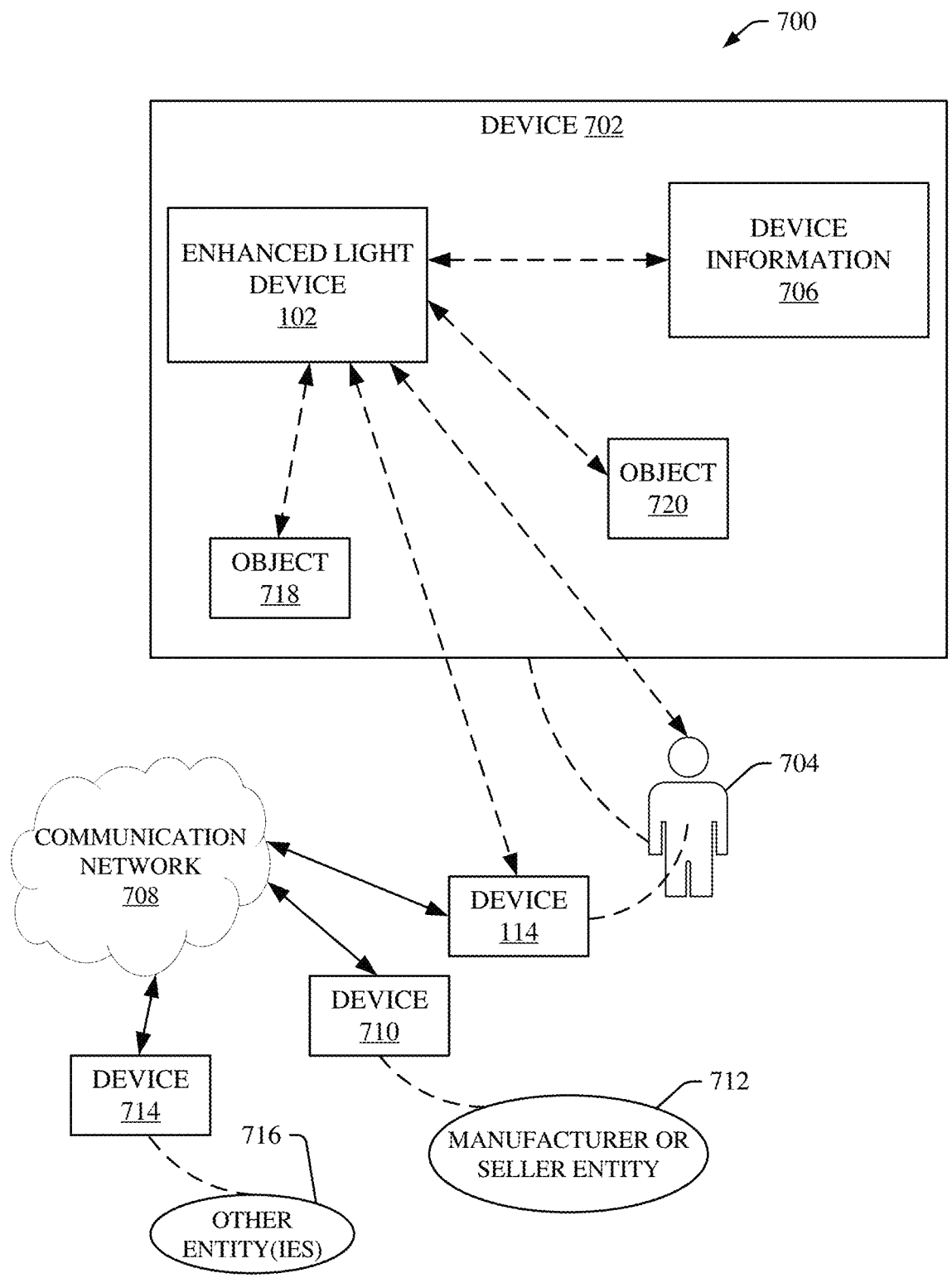
FIG. 7 presents a block diagram of another example system that can employ an enhanced light device associated with a device, in accordance with various aspects and embodiments of the disclosed subject matter.

Referring to FIG. 7, FIG. 7 presents a block diagram of another example system 700 that can employ an enhanced light device associated with a device, in accordance with various aspects and embodiments of the disclosed subject matter. The example system 700 can comprise the enhanced light device 102. The enhanced light device 102 can comprise the light component 104, the light management component 106, the information component 108, the sensor component 110, and the instrument component 112.

The enhanced light device 102 can be associated with (e.g., attached to, installed in, placed on or in proximity to) a device 702. For example, as depicted in FIG. 7, the enhanced light device 102 can be located inside of the device 702. The device 702 can be or can comprise, for example, an appliance (e.g., refrigerator, oven, microwave oven, . . . ), vehicle (e.g., automobile, truck, train, bus, plane, motorcycle, bicycle, . . . ), machine, drone, automated system or a device of an automated system, or other type of device, such as disclosed herein.

The enhanced light device 102 can learn about the device 702 and the associated environment to facilitate determining desirable information that can be provided (e.g., presented or communicated) by the enhanced light device 102 to a user 704 who can interact with the device 702. In some implementations, one or more sensors (e.g., camera) of the sensor component 110 can sense and/or capture device-related information 706 that can be located in or on the device 702. For example, many devices (e.g., refrigerator) can have a label located inside a compartment (e.g., food storage area) of the device, wherein the label can include various items of information regarding the device (e.g., name of manufacturer of the device, model of the device, serial number of the device, website information associated with the device, specifications or operating information regarding the device, . . . ). The one or more sensors of the sensor component 110 can sense and/or capture the device-related information 706, comprising the various items of information, from the label. The one or more sensors and/or the light management component 106 can analyze the sensor data (e.g., visual image of the label captured by the camera), including performing character or pattern recognition using desired character or pattern recognition techniques and technologies, to identify the device-related information 706, including the various items of information, regarding the device 702.

The light management component 106 and/or information component 108 can identify the device 702 (e.g., model of the device), the manufacturer of the device 702, serial number of the device 702, website information associated with the device 702, specifications or operating information regarding the device 702, and/or other information regarding the device 702 based at least in part on the results of analyzing the sensor data. The light management component 106 and/or information component 108 also can obtain other information regarding the device 702 from one or more extrinsic data sources (e.g., website associated with the device 702, another website(s) that contains information regarding the device 702). Such other information can comprise, for example, a user manual, troubleshooting information, repair information, maintenance information, specification or operating information (e.g., additional or more complete specification or operating information), device recall information, device-related alerts or notifications (e.g., maintenance notifications, recall notification, . . . ), update information (e.g., software update, firmware update, user manual update, . . . ), and/or other information relating to the device 702.

In some embodiments, the enhanced light device 102 can be associated with (e.g., communicatively connected to) a communication network 708 to enable the enhanced light device 102 to communicate with other enhanced light devices (not shown in FIG. 7) and/or other devices, such as device 114, which can be associated with the user 704, device 710, which can be associated with a manufacturer and/or seller entity of the device 702, and/or another device(s) 714, which can be associated with another entity(ies) 716. The enhanced light device 102, the respective devices (e.g., 114, 710, 714) can be associated with the communication network 708 via respective wireless communication connections and/or wireline communication connections. In some implementations, the enhanced light device 102 can establish a direct communication connection (e.g., Bluetooth connection, near field communication connection, . . . ) with the device 114 of the user 704.

The light management component 106 and/or information component 108, employing the instrument component 112 (e.g., communication component(s) of the instrument component 112) to facilitate communication with the communication network 708 and the device 710 to obtain information regarding the device 702 from the device 710 (e.g., one type of extrinsic data source) associated with the manufacturer and/or seller entity, and/or to facilitate communication with the communication network 708 and the device(s) 714 to obtain information regarding the device 702 from the device(s) 714 (e.g., another type of extrinsic data source) associated with the other entity(ies) 716. In certain embodiments, all or a portion of device-related information for the device 702 can be pre-loaded to the information component 108 or data store (not shown in FIG. 7) of the enhanced light device 102.

In some instances, a device 702 may not have a device label on it or the device label may not be in a location on the device 702 where the sensor component 110 is able to sense or capture device-related information from the device label. As more fully described herein, one or more sensors of the sensor component 110 can sense or capture (e.g., capture visual images) information regarding the device 702 with regard to portions of the device 702 that are accessible (e.g., are able to be sensed) by the sensor component 110, the sensor component 110 and/or light management component 106 can analyze the sensor data, including performing character or pattern recognition using character or pattern recognition techniques and technologies, to identify the device 702 and other information relating to the device 702. For instance, the sensor component 110 can detect features (e.g., dimensions, components, structure, . . . ) of the portion of the device 702 accessible to the sensor component 110. The light management component 106 and/or sensor component 110 can analyze the sensor data relating to the features to identify, or at least partially identify, the device 702 and/or other device-related information regarding the device 702, based at least in part on the results of the analysis of the sensor data relating to the features of the device 702, wherein such identification can comprise a type of device (e.g., refrigerator), a manufacturer of the device, a model of the device, and/or other identification information. As part of the analysis, the light management component 106 and/or information component 108 can use device-related information (e.g., partial device identification information) determined based on the sensor data to search for and obtain additional information regarding the device 702 from one or more extrinsic data sources (e.g., device 710, device(s) 714), as more fully described herein.

The light management component 106 and/or information component 108 can create or update a device profile to include the information regarding the device 702, including the device-related information 706, identified or obtained by the light management component 106 and/or information component 108. The light management component 106 also can create or update a user profile of the user 704, wherein the user profile can comprise user preferences or user input information received from the user 704 (e.g., via the device 114 or an interface(s) of the enhanced light device 102), use or interaction information (e.g., current or historical information) regarding the use or interaction with the device 702 by the user 704, and/or other information relating to the user 704. The light management component 106 and/or information component 108 also can create or update an environment profile to include environmental information regarding the environment (e.g., characteristics, conditions, or other features of the environment) associated with the device 702, wherein the environment can include an external environment that can surround the device 702 and/or an internal environment with respect to an internal portion(s) of the device 702 (e.g., storage compartment(s) of a refrigerator). The light management component 106 and/or information component 108 also can create or update a light profile for the enhanced light device 102, wherein the light management component 106 and/or information component 108 can determine information to be stored or updated in the light profile based at least in part on the characteristics, conditions, functions, and/or other features of the enhanced light device 102, the user profile, the device profile, and the environment profile, as more fully described herein.

In some implementations, the light management component 106 can control (e.g., modify) the parameters, characteristics, or properties of the light component 104 (e.g., modify illumination level, color, or other characteristics of the light component 104) based at least in part on various sensed conditions, such as, for example, ambient illumination in the environment, activity of a user(s) in the environment or with respect to the device 702, conditions of the device 702, weather or air conditions in the environment, a time of day, a time of year, and/or other conditions associated with the device 702 or environment, as more fully described herein. For example, one or more sensors of the sensor component 110 can sense conditions associated with the device 702 or environment, interaction of the user 704 with respect to the device 702 or environment, etc. Based at least in part on the results obtained from analyzing the sensor data relating to the conditions associated with the device 702 or environment, and/or the interaction of the user 704 with respect to the device 702 or environment, the light management component 106 can determine what the parameters, characteristics, or properties of the light component 104 should be, determine the respective adjustments to be made to the respective parameters, characteristics, or properties of the light component 104, and generate respective instructions regarding such adjustments or otherwise facilitate performing the adjustments to the light component 104. For instance, the light management component 106 can respectively update the user profile, device profile, environment profile, and light profile, based at least in part on the results of the analysis of the sensor data, and can determine the modifications to be made to the parameters, characteristics, or properties of the light component 104, based at least in part on the light profile, as more fully described herein. The light component 104 can be (re)configured (e.g., automatically, dynamically, or self configured), based at least in part on the determined respective adjustments, such that the light component 104 can emit desired (e.g., enhanced, suitable, or optimal) light to produce desired (e.g., enhanced, suitable, or optimal) light (e.g., processed light) as an output from the enhanced light device 102.

In certain embodiments, the light management component 106 can control (e.g., modify) the parameters, characteristics, or properties of the information component 108 and/or other components (e.g., instrument component 112) of the enhanced light device 102 to facilitate determining a subset of information that can be desirable to the user 704 interacting with the device 702 or in proximity to the device 702 and presenting such subset of information to the user 704 via an interface(s) (e.g., display screen, audio speaker(s), haptic interface) of the enhanced light device 102 or via the device 114 of the user 704.

As an example, the user 704 can be interacting with the device 702 (e.g., a refrigerator). The sensor component 110 can detect that the user 704 is interacting with the device 702, including detecting the type(s) of interaction(s) with the device 702 by the user 704 (e.g., opening the refrigerator door, reaching for or picking up object 718 and/or 720 (e.g., food) stored inside the device 702, trying to adjust a control(s) (e.g., temperature control) on the device 702, trying to perform maintenance or repair on the device 702, . . . ). The sensor component 110 also can sense conditions associated with the device 702 and/or environment associated with the device 702. The light management component 106 and/or information component 108 can analyze the sensor data relating to the interaction with the device 702 by the user 704 and sensor data relating to the conditions associated with the device 702 and/or environment.

Based at least in part on the results of analyzing the sensor data, the light management component 106 and/or information component 108 can determine or identify the type(s) of interaction(s) of the user 704 with the device 702, conditions of the device 702 and/or environment, the context of the user 704, the context of the device 702, and/or the context of the environment. The light management component 106 can respectively update the user profile, the device profile, and the environment profile, based at least in part on the analysis results. The light management component 106 also can update the light profile based at least in part on the user profile, the device profile, and the environment profile, as updated, and/or the analysis results.

The light management component 106 can determine an adjustment, if any, to make to the lighting provided by the light component 104, based at least in part on the light profile. The light management component 106 and/or the information component 108 also can determine the subset of information (e.g., desirable information) relating to the device 702 and/or environment to provide to the user 704, and can determine how to provide the subset of information to the user 704, based at least in part on the light profile and/or the analysis results. For example, if the light management component 106 and/or information component 108 determines that the interaction with the device 702 (e.g., refrigerator) by the user 704 is that the user 704 is reaching inside a compartment of the device 702 to pick up an object 718, the light management component 106 and/or information component 108 can determine a subset of information regarding the device 702 and/or object 718 that can be useful or relevant to the user 704. For instance, the object 718 can be an item of food, and the light management component 106 and/or information component 108 can provide, to the user 704, a subset of information regarding the item of food (e.g., the item of food was placed in the refrigerator six days ago; the expiration date for the item of food has passed; power to the refrigerator was temporarily lost, and, as a result, the item of food may no longer be safe to eat; . . . ). The light management component 106 also can control the components of the enhanced light device 102 to provide the subset of information to the user 704 in a desired manner, in accordance with the defined light management criteria, which can include or take into account user preferences of the user 704 stored in the user profile. For example, in accordance with the defined light management criteria, the light management component 106 can facilitate presenting the subset of information to the user via an interface(s) (e.g., display screen, audio speaker(s), haptic interface) of the enhanced light device 102 or via the device 114 of the user 704 (e.g., via the display screen, audio speaker(s), or haptic component of the device 114). The subset of information can be in the form of a message, notification (e.g., visual, audio, or haptic notification), and/or alert (e.g., visual, audio, or haptic alert).

As another example, the device 702 can be an oven, and the object 718 (e.g., first food item, such as a beef roast) and object 720 (e.g., second food item, such as baked potatoes) can be in the oven cooking, wherein the light management component 106 and/or information component 108 can determine that the user 704 has been interacting with the oven to cook objects 718 and 720 based at least in part on the results of analyzing sensor data from the sensor component 110. The light management component 106 and/or information component 108, employing the sensor component 110, can monitor respective conditions of the device 702 (e.g., oven) and the objects 718 and 720, including tracking the amount of time the objects 718 and 720 have been cooking in the oven, the temperature inside the oven, the respective internal temperatures of object 718 (e.g., beef roast) and object 720 (e.g., potatoes), the respective remaining amount of time of cooking for the respective objects 718 and 720, and/or other conditions. Based at least in part on the results of analyzing sensor data, as such sensor data is received from the sensor component 110 and/or the respective profiles (e.g., user profile, device profile, environment profile, light profile), the light management component 106 and/or information component 108 can determine desirable information (e.g., subset of information that can be useful and/or relevant) to assist the user 704 in properly cooking the food items (e.g., objects 718 and 720), including, for instance, making sure that the internal temperature of the beef roast (e.g., which can be determined or estimated based on sensor data from a thermometer or other sensor of the instrument component 112) is sufficiently high to make the beef roast sufficiently safe to eat, notifying the user 704 when the food items are suitably cooked, and/or notifying the user 704 if a problem is occurring or has occurred with regard to cooking the food items, etc. The light management component 106 and/or information component 108 can facilitate providing such desirable information to the user via the enhanced light device 102 and/or device 114 of the user 704.

As still another example, the interaction with the device 702 by the user 704 can be the user 704 adjusting a control on the device 702 (e.g., temperature control on a refrigerator, oven temperature control on an oven, . . . ), wherein such interaction can be detected by the sensor component 110 and identified by the light management component 106 and/or information component 108. The light management component 106 and/or information component 108 can identify or determine the type of control adjustment the user is attempting to make to the control and/or the objective (e.g., adjusted operation outcome) for the device 702 that the user 704 is attempting to achieve, and/or can query the user 704, via an interface(s) of the enhanced light device 102 or the device 114, regarding the type of control adjustment the user is attempting to make and/or the objective. The light management component 106 and/or information component 108 can determine desirable information that can assist the user 704 in making the adjustment to the control and/or achieving the desired objective, and can provide the desirable information to the user 704 via an interface(s) of the enhanced light device 102 or the device 114.

As yet another example, the interaction with the device 702 by the user 704 can be the user 704 performing maintenance of a repair on the device 702 (e.g., machine, automobile, . . . ), wherein such interaction can be detected by the sensor component 110 and identified by the light management component 106 and/or information component 108. The light management component 106 and/or information component 108 can identify or determine the type of maintenance or repair that the user 704 is attempting to perform on the device 702, including the components or parts involved in the maintenance or repair, and can determine the context of the device 702 (e.g., state of the device (e.g., operational, fault, service due, . . . ; state of the maintenance or repair (e.g., at what point the user 704 is in performing the maintenance or repair), the context of the user 704, etc. The light management component 106 and/or information component 108 can determine desirable information that can assist the user 704 in performing the maintenance or repair on the device 702. Such desirable information can comprise, for example, directions (e.g., step-by-step instructions) in the user manual or from another data source (e.g., a website providing expert advice) that can instruct the user 704 how to perform the maintenance or repair, a video or drawings and/or audio illustrating how to perform the maintenance or repair (e.g., a video obtained from an online data source or from a video portion of the user manual), safety information (e.g., discontinue power to device 702 while doing maintenance or repair, be aware of certain sharp or otherwise dangerous parts on the device 702) to ensure that the user 704 is safely performing the maintenance or repair, and/or other useful and/or relevant information relating to the task. The light management component 106 and/or information component 108 can provide (e.g., present) the desirable information to the user 704 via an interface(s) of the enhanced light device 102 or the device 114.

Figure 8:
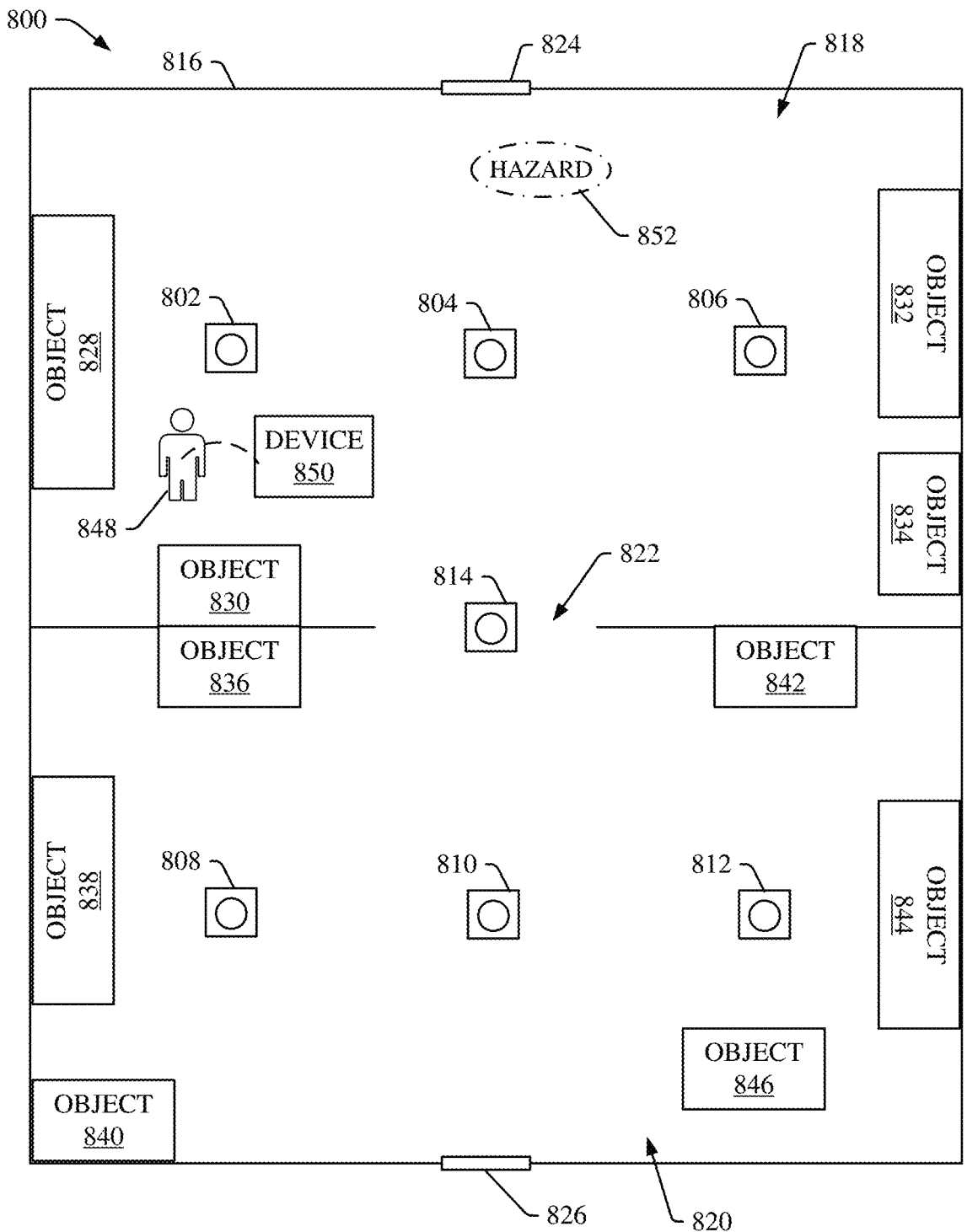
FIG. 8 illustrates a diagram of example scenarios in which enhanced light devices can be used to provide desirable lighting and desirable information to a user, in accordance with various aspects and embodiments of the disclosed subject matter.

Turning to FIG. 8, FIG. 8 illustrates a diagram of example scenarios 800 in which enhanced light devices can be used to provide desirable lighting and desirable information to a user, in accordance with various aspects and embodiments of the disclosed subject matter. The example scenarios 800 can comprise a set of enhanced light devices, such as enhanced light devices 802, 804, 806, 808, 810, 812, and 814, that can be distributed throughout an area 816, which can be a building or structure (as depicted), or at least a portion of, or can be an outdoor area. The respective enhanced light devices (e.g., 802, 804, 806, 808, 810, 812, and 814) each can comprise a light component, a light management component, an information component, a sensor component, and an instrument component that can respectively be the same as or similar to, and/or can comprise the same or similar functionality as, respective components (e.g., respectively named components), as more fully described herein. Respective enhanced light devices can be installed on (e.g., attached to) the ceiling or walls, and/or can be installed, placed, or located in various places on the floor (e.g., enhanced light devices as floor lamps or lighting that can extend to a desired height from the floor).

The set of enhanced light devices (e.g., 802, 804, 806, 808, 810, 812, and 814) can be employed in a variety of situations for a variety of applications, wherein the set of enhanced light devices can be employed to provide desirable lighting to user(s) and desirable (e.g., useful and/or relevant) information to the user(s), in accordance with the defined light management criteria. For instance, in one version of the example scenarios 800, the set of enhanced light devices (e.g., 802, 804, 806, 808, 810, 812, and 814) can be employed in (e.g., and distributed throughout) a museum that also includes art and/or historical artifacts for showing to people. In another version of the example scenarios 800, the set of enhanced light devices (e.g., 802, 804, 806, 808, 810, 812, and 814) can be employed in (e.g., and distributed throughout) a store or shopping mall that also includes various things for sale to people patronizing the store or shopping mall (e.g., indoor mall or outdoor mall). In still other versions of the example scenarios 800, the set of enhanced lights (e.g., 802, 804, 806, 808, 810, 812, and 814) can be employed in (e.g., and distributed throughout) a home, a building (e.g., office and/or government building), a warehouse, a manufacturing or assembly facility (e.g., plant), an industrial automation facility, an airport (e.g., airport terminal), a bus station, a set of drones, an aircraft, a ship or boat, a stadium, a ballpark, a sports or entertainment facility, an indoor or outdoor concert venue, a medical facility (e.g., hospital, urgent care center, physician's office), a casino, a restaurant, a parking lot, a street (e.g., public or private street), or another desired structure, venue, or location (e.g., indoor or outdoor location).

The at least the portion of the area 816 (e.g., building or structure of or in the area) can include rooms, sections, or demarcated sub-areas, such as sub-area 818 and sub-area 820, wherein sub-area 818 and sub-area 820 can be adjacent to each other, and access to sub-area 818 from sub-area 820, and vice versa, is enabled by a throughway or opening 822 between the sub-area 818 and sub-area 820. In this example scenario 800, a door 824 can be located at the other end of the sub-area 818 that is on the opposite side from the opening 822, wherein the door 824 can be used to exit or enter the sub-area 818 from another sub-area or from the outside (e.g., outside of the building or structure). Another door 826 can be located at the other end of the sub-area 820 that is on the opposite side from the opening 822, wherein this other door 826 can be used to exit or enter the sub-area 820 from another sub-area or from the outside (e.g., outside of the building or structure).

The at least the portion of the area 816 (e.g., building or structure of or in the area) can have a set of objects, such as, for example, objects 828, 830, 832, 834, 836, 838, 840, 842, 844, and 846, that can be distributed throughout the area 816, wherein, for instance, objects 828, 830, 832, and 834 can be distributed throughout the sub-area 818, and objects 836, 838, 840, 842, 844, and 846 can be distributed throughout the sub-area 820.

In the version of the example scenarios 800 where the area 816 is a museum that can include art and/or historical artifacts, the respective objects (e.g., 828, 830, 832, 834, 836, 838, 840, 842, 844, and 846) can be respective items of art, historical artifacts, or other exhibits. The respective enhanced light devices (e.g., 802, 804, 806, 808, 810, 812, and 814) can learn about their environment, including learning about the respective items of art, historical artifacts, or other exhibits in the area 816, and, in particular, in proximity to them, and can convey desirable (e.g., useful, relevant, informative) information to people (e.g., patrons) who are in the area 816 (e.g., in proximity to an item of art, artifact, or exhibit in the area 816).

For instance, object 828 can be a painting in proximity to the enhanced light device 802. In some embodiments, information regarding the painting (e.g., name of painting, artist, year painting was created, and/or historical information relating to the painting) can be pre-loaded into the enhanced light device 802. In other embodiments, the light management component and/or information component of the enhanced light device 802 can learn information regarding the painting by analyzing the painting. For example, one or more sensors (e.g., camera) of the sensor component of the enhanced light device 802 can sense and/or capture information regarding the painting from the painting itself (e.g., capture an image of the painting) or from a label (e.g., a label that identifies the name of the painting, the artist, . . . ) in proximity to the painting. The light management component and/or information component of the enhanced light device 802 can analyze (e.g., including performing pattern or character recognition analysis on) sensor data relating to the sensed or captured information, and, based at least in part on the results of the analysis, can identify the name of the painting, the name of the artist of the painting, and/or other pertinent information (e.g., year the painting was created) regarding the painting. The light management component and/or information component of the enhanced light device 802 also can supplement the information regarding the painting by performing a search (e.g., Internet or intranet search) regarding the painting and/or the artist, via the communication network, to obtain additional information regarding the painting or the artist (e.g., historical or contextual information relating to the painting or artist, other art created by the artist, personal history of the artist, . . . ) from one or more extrinsic data sources (e.g., websites or communication devices of entities associated with the communication network).

When a person 848, who can have a device 850 (e.g., communication device, such as a mobile phone or electronic tablet) is in proximity to the painting (e.g., object 828), the sensor component of the enhanced light device 802 can detect that the person 848 and/or device 850 is in proximity to the painting and/or can sense or capture (e.g., via a camera) information regarding the interaction of the person 848 with the painting (e.g., the person 848 is looking at the painting, and/or the person 848 is using the device 850 (or his or her camera) to capture a picture of the painting). The light management component and/or information component of the enhanced light device 802 can analyze (e.g., including performing pattern or character recognition analysis on) the sensor data relating to the sensed or captured information regarding the person 848 and/or device 850 to identify or determine the interaction of the person 848 with the painting. In some embodiments, as part of the analysis, to facilitate determining desirable information to present to the person 848, the light management component and/or information component also can determine or estimate demographic information (e.g., age, gender, residence, profession or employment, income level, . . . ) regarding the person 848, based at least in part on the results of the analysis of the sensor data and/or other data (e.g., demographic or other types of data obtained from another data source(s)).

Based at least in part on the results of the analysis of the sensor data and/or other data, the light management component and/or information component can determine desirable (e.g., useful, relevant, informative) information, comprising information relating to the painting, the artist, and/or other desirable information (e.g., information regarding other paintings (e.g., object 844) or artists who the person 848 may be interested in based at least in part on the person's interest in this painting or artist), to provide to the person 848. The light management component and/or information component can facilitate presenting the desirable information to the person 848 via one or more interfaces (e.g., display screen, audio speaker(s)) of the enhanced light device 802 and/or via the device 850, which can be connected to the enhanced light device 802 via the communication network or a direct communication connection. For example, the desirable information can provide the person 848 historical information relating to the period in time the painting (e.g., object 828) was created, which can provide the person 848 with some historical context regarding the artist and/or painting that may enable the person 848 to better understand what the artist was trying to convey or depict in the painting, and/or what was occurring at that time in history that may have influenced the artist when the artist created the painting, etc. The desirable information also can inform the person 848 that the artist of the painting (e.g., object 828) was a friend (or rival) of another artist who created another painting (e.g., object 844) that is located in a particular location in the sub-area 820.

The enhanced light devices (e.g., 802, 804, 806, 808, 810, 812, and 814) can communicate and coordinate with each other to exchange information with each other and perform other respective actions in a coordinated manner, in accordance with the defined light management criteria. For instance, the enhanced light device 812, which is in proximity to object 844 (e.g., another painting), can have certain information relating to the object 844 stored thereon (e.g., in the information component and/or data store of the enhanced light device 812). The enhanced light device 812 can communicate with the other enhanced light devices, including enhanced light device 802, to make the other enhanced light devices aware that it is in proximity to the object 844 (e.g., other painting) and has the certain information relating to the object 844. In the above example, when the enhanced light device 802 was determining the desirable information to present to the person 848, the enhanced light device 802 can be aware of the other painting in proximity to the enhanced light device 812 and that the enhanced light device 812 has the certain information relating to the painting. The light management component and/or information component of the enhanced light device 802 can determine all or a portion of the certain information relating to the other painting that can be desirable to the person 848, can communicate with the enhanced light device 812 to obtain all or the portion of the certain information relating to the other painting from the enhanced light device 812, and can include all or the portion of the certain information relating to the other painting as part of the desirable information the enhanced light device 802 presents to the person 848.

The enhanced light devices (e.g., 802, 804, 806, 808, 810, 812, and 814) also can communicate and coordinate with each other to exchange information regarding scheduled exhibits, for instance, to inform people in one part of the area 816 that an exhibit is scheduled to start at a certain time in another part of the area 816 and/or to inform people about a change in scheduling of an exhibit. For example, there can be an exhibit scheduled for object 846 (e.g., famous art sculpture by a famous artist) at 3:00 p.m. with a notable art historian making a presentation at the exhibit. The enhanced light devices can receive information regarding this exhibit, including information regarding the art sculpture (e.g., object 846) being exhibited, information regarding the notable art historian, and the scheduled time for the exhibit. However, due to certain circumstances (e.g., the art historian is going to be late), the start of the exhibit has to be delayed until 3:30 p.m., wherein a museum representative (not shown in FIG. 8) near the enhanced light device 812 can communicate with the enhanced light device 812 (e.g., directly using an interface(s) of the enhanced light device 812 or via a communication device of the representative in communication with the enhanced light device 812) to inform the enhanced light device 812 that the start of the exhibit is being delayed until 3:30 p.m. The light management component of the enhanced light device 812 can communicate with the other light management components of the other enhanced light devices (e.g., 802, 804, 806, 808, 810, and 814) to inform the other enhanced light devices that the exhibit is being delayed until 3:30 p.m. The other enhanced light devices can inform people in their respective regions of the delay in the start of the exhibit. For example, the light management component and/or information component of the enhanced light device 802 can provide information regarding the delay in the start of the exhibit to the person 848 via an interface(s) of the enhanced light device or via the device 850 of the person 848.

As another example application of coordination of the enhanced light devices, the enhanced light devices (e.g., 802, 804, 806, 808, 810, 812, and 814) can communicate and coordinate with each other to control the traffic flow of people in the area 816 to facilitate reducing congestion of people in a particular part (e.g., near a particular work of art) of the area 816 and enhancing the overall experience and enjoyment of people attending the museum. For instance, the respective sensor components and light management components can monitor, sense, and track respective traffic flows of people in respective regions of the area 816 in proximity to respective enhanced light devices (e.g., 802, 804, 806, 808, 810, 812, and 814). A light management component of an enhanced light device (e.g., 802) can identify a particular region of the area 816 that currently has a relatively higher volume of traffic of people, as compared to other regions of the area 816, or can determine that historically (e.g., at least in recent days or weeks) the particular region of the area 816 will have a relatively higher volume of traffic of people, as compared to the other regions of the area 816, for instance, due to the popularity of a particular work of art (e.g., object 830). The light management component of the enhanced light device 802 can determine that it would be beneficial to the museum and visitors, from a visitor experience standpoint and/or a safety standpoint, to control the traffic flow of people in the area 816 to try to control the volume of traffic of people to that particular region and particular work of art (e.g., object 830) during the current time or at times when historically there is a relatively higher volume of traffic of people.

The light management component of the enhanced light device 802 can determine that visitors can be provided information to advise (e.g., notify) the visitors that there can be wait times for visitors to see the particular work of art (e.g., object 830) during such time periods of higher volume or expected higher volume, recommendations to see other art pieces or exhibits in other regions of the area 816 during such time periods, and/or incentives to induce visitors to avoid, or at least avoid an unscheduled visit to, the particular region of the area 816 where the particular work of art is located during such time periods of higher volume or expected higher volume. Such incentives can comprise, for example, in exchange for the visitor avoiding, or at least avoiding an unscheduled visit to, the particular region of the area 816 where the particular work of art is located, scheduling a specific time for a visitor (e.g., person 848) to view of the particular work of art, wherein the visitor can be placed in a priority line to view the particular work of art at the specific time and/or providing the visitor a discount on products or services provided by the museum or by other entities in exchange for the visitor avoiding the particular region of the area 816 where the particular work of art is located.

The light management component of the enhanced light device 802 can facilitate communicating the information regarding the congestion issue, the time period of the congestion issue, the notification of wait times or at least potential wait times, the recommendations, and/or the incentives to the other enhanced light devices (e.g., 804, 806, 808,

810, 812, and 814). The respective enhanced light devices (e.g., 802, 804, 806, 808, 810, 812, and 814) can communicate the information regarding the congestion issue, the time period of the congestion issue, the notification of wait times or at least potential wait times, the recommendations, and/or the incentives to respective visitors (e.g., directly from the enhanced light devices or via respective communication devices of the respective visitors that can be communicatively connected to the respective communication devices) in the respective regions of the area 816 where the respective enhanced light devices are located. This can enable the respective enhanced light devices (e.g., 802, 804, 806, 808, 810, 812, and 814) to desirably control the traffic flow of people in the area 816 (e.g., by identifying and directing people to another region(s) of the area 816 that has or is expected to have a relatively lower traffic flow and informing people (e.g., visitors) that access to such other region(s) of the area 816 can be more favorable (e.g., shorter wait time and/or line to see an exhibit) to them at this time or another particular time period than to visit the particular work of art in the particular region that has or is expected to have a relatively higher volume of traffic). This can improve the overall experience and enjoyment of visiting the museum by people and/or enhance the safety and security of visitors.

In another version of the example scenarios 800 where the area 816 is a store or shopping mall, the respective objects (e.g., 828, 830, 832, 834, 836, 838, 840, 842, 844, and 846) can be or can comprise respective items (e.g., articles of clothing, products, a shelf with articles of clothing or other products on it, a rack with articles or clothing or other products on it, . . . ) for sale. The respective enhanced light devices (e.g., 802, 804, 806, 808, 810, 812, and 814) can learn about their environment, including learning about the respective items in the area 816, and, in particular, in proximity to them, and can convey desirable (e.g., useful, relevant, informative) information to people (e.g., patrons) who are in the area 816 (e.g., in proximity to an object or enhanced light device in a particular region of the area 816). For example, the respective enhanced light devices can recognize products available for sale in the respective regions of the area where the respective enhanced light devices are located or installed, can obtain respective information regarding the respective products, including available promotions or sales for the products, and can convey the respective information regarding the respective products to respective patrons who are in the area 816 (e.g., in the store or mall).

For instance, respective sensor components of the respective enhanced light devices can detect and/or capture respective information (e.g., visual images) of respective items (e.g., articles of clothing or other products) in respective regions of the area 816 in proximity to the respective enhanced light devices. A light management component and/or information component of an enhanced light device can analyze the sensor data relating to the respective items that are in the regions of the area 816 in proximity to the enhanced light device. The light management component and/or information component of the enhanced light device can identify the respective items in the region and other information relating to the respective items (e.g., identify type of product, manufacturer or brand of product, price of product, discount sale or promotion associated with the product, . . . ), based at least in part on the results of the analysis of the sensor data. The enhanced light device also can receive or have access to other information regarding the respective items in the other respective regions of the area 816 from the other enhanced light devices in the area 816 and/or from one or more extrinsic data sources (e.g., one or more communication devices associated with the one or more extrinsic data sources). In some embodiments, respective information regarding the respective items (e.g., name of manufacturer, name or model of item, price of item, price discount or promotion associated with the item, . . . ) can be pre-loaded into the enhanced light device 802 and/or other enhanced light devices.

When a person 848, who can have a device 850 (e.g., communication device) is in proximity to an enhanced light device, such as enhanced light device 802, and/or is interacting with or in proximity to an item (e.g., clothing or other product on sale; shelf or rack containing clothing or other products) in proximity to the enhanced light device, the sensor component of the enhanced light device 802 can detect that the person 848 and/or device 850 is in proximity to the item and/or can sense or capture (e.g., via a camera and/or another sensor) information regarding the interaction of the person 848 with the item (e.g., the person 848 is looking at or picking up the item). The light management component and/or information component of the enhanced light device 802 can analyze (e.g., including performing pattern or character recognition analysis on) the sensor data relating to the sensed or captured information regarding the person 848 and/or device 850 to identify or determine the interaction of the person 848 with the item. In some embodiments, as part of the analysis, to facilitate determining desirable information to present to the person 848, the light management component and/or information component also can obtain, determine, or estimate other data, such as, for example, demographic data (e.g., age, gender, residence, profession or employment, income level, . . . ) regarding the person 848, based at least in part on the results of the analysis of the sensor data. The light management component can obtain all or some of the other data (e.g., extrinsic data, which can comprise demographic data and/or other types of data) from an extrinsic data source(s), for example.

Based at least in part on the results of the analysis of the sensor data and/or other data, the light management component and/or information component can determine desirable (e.g., useful, relevant, informative) information, comprising information relating to the item, another item that may be of interest to the user (e.g., another item on sale, another item (e.g., tie) that can be relevant to the item (e.g., sport coat)), and/or other desirable information (e.g., information regarding store promotions or discounts), to provide to the person 848. For instance, if the person 848 is interacting with a particular shirt, the light management component can determine another item of clothing (e.g., sport coat, tie, suit, pants, . . . ) that can at least potentially be of interest to the person 848 due, for example, to the other item of clothing desirably (e.g., suitably) matching the particular suit as part of an outfit and/or the other item of clothing can be on sale or associated with another sales promotion. The light management component of the enhanced light device 802 can facilitate presenting information relating to the other item of clothing to the user via the enhanced light device 802 or the device 850 (e.g., communication device) of the user. In some implementations, the other item of clothing can be located in another region of the store (e.g., other region of the area 816), and the enhanced light device 802 can search for and/or obtain information relating to the other item of clothing from another enhanced light device (e.g., 808) that is located in that other region of the store. In some implementations, the light management component can dynamically generate a sales promotion for the item and the other item to sell them to the user for a discounted price, if the person 848 purchases both items, and can present information relating to the sales promotion to the person 848 for consideration by the person 848.

As another example, the person 848 can be interacting with (e.g., can be determined to be expressing interest in) a particular item (e.g., car, boat, furniture, barbeque grill, . . . ) that can be relatively expensive. The light management component can determine the context of the particular item and/or the context of the person 848, based at least in part on the results of analyzing sensor data relating to the item and/or person 848, and/or other information (e.g., identification information that can identify the person 848; demographic information that can demographically categorize the person 848), wherein the other information can be received from another enhanced light device or another (e.g., extrinsic) data source. Based at least in part on the context of the particular item and/or the context of the person 848, the light management component can determine a sales promotion to discount the price of the particular item and/or a financing promotion to provide desirable financing terms to enable the person 848 to finance the purchase of the particular item. The light management component can facilitate presenting information relating to the sales promotion and/or financing promotion to the person 848 for consideration by the person 848.

The light management component and/or information component can facilitate presenting the desirable information (e.g., information relating to the other item, and/or information regarding a sales promotion or financing promotion) to the person 848 via one or more interfaces (e.g., display screen, audio speaker(s)) of the enhanced light device 802 and/or via the device 850, which can be connected to the enhanced light device 802 via the communication network or a direct communication connection.

The enhanced light devices (e.g., 802, 804, 806, 808, 810, 812, and 814) also can communicate and coordinate with each other to exchange information to enhance the safety and security of people in the area 816, for instance, in connection with hazards in or near the area 816. For example, enhanced light device 804 and/or enhanced light device 806 can detect (e.g., via their respective sensors) a hazard 852 (e.g., fire, electrical hazard, or other hazard) in proximity to the door 824. The enhanced light device 804 and/or enhanced light device 806 can communicate information regarding the hazard 852 to the enhanced light device 802 in proximity to the person 848. The light management component of the enhanced light device 802 can determine desirable (e.g., suitable, acceptable, or optimal) information to provide to the person 848, wherein the desirable information can notify the person 848 of the hazard 852 and/or the location of the hazard 852 (e.g., relative to the location of the person 848), present a map or directions to the person 848 to enable the user to avoid the hazard 852 and safely exit the area 816 (e.g., through the door 826), present indicators (e.g., visual, audio, and/or haptic indicators) to assist (e.g., guide) the person 848 to avoid the hazard 852, and/or present other desirable information to the person 848 via the enhanced light device 802 and/or the communication device 850. Enhanced light devices 802, 804, and/or 806 also can provide information regarding the hazard 852 to the other enhanced light devices (e.g., 808, 810, 812, and 814) so that the other enhanced light devices can provide desirable information (e.g., map information, directions, indicators (e.g., direction indicators)) to the person 848 and/or other persons to enable the person 848 and/or other persons to safely navigate through the area 816 to avoid the hazard 852 and/or exit the area 816 (e.g., via the door 826).

Figure 9:
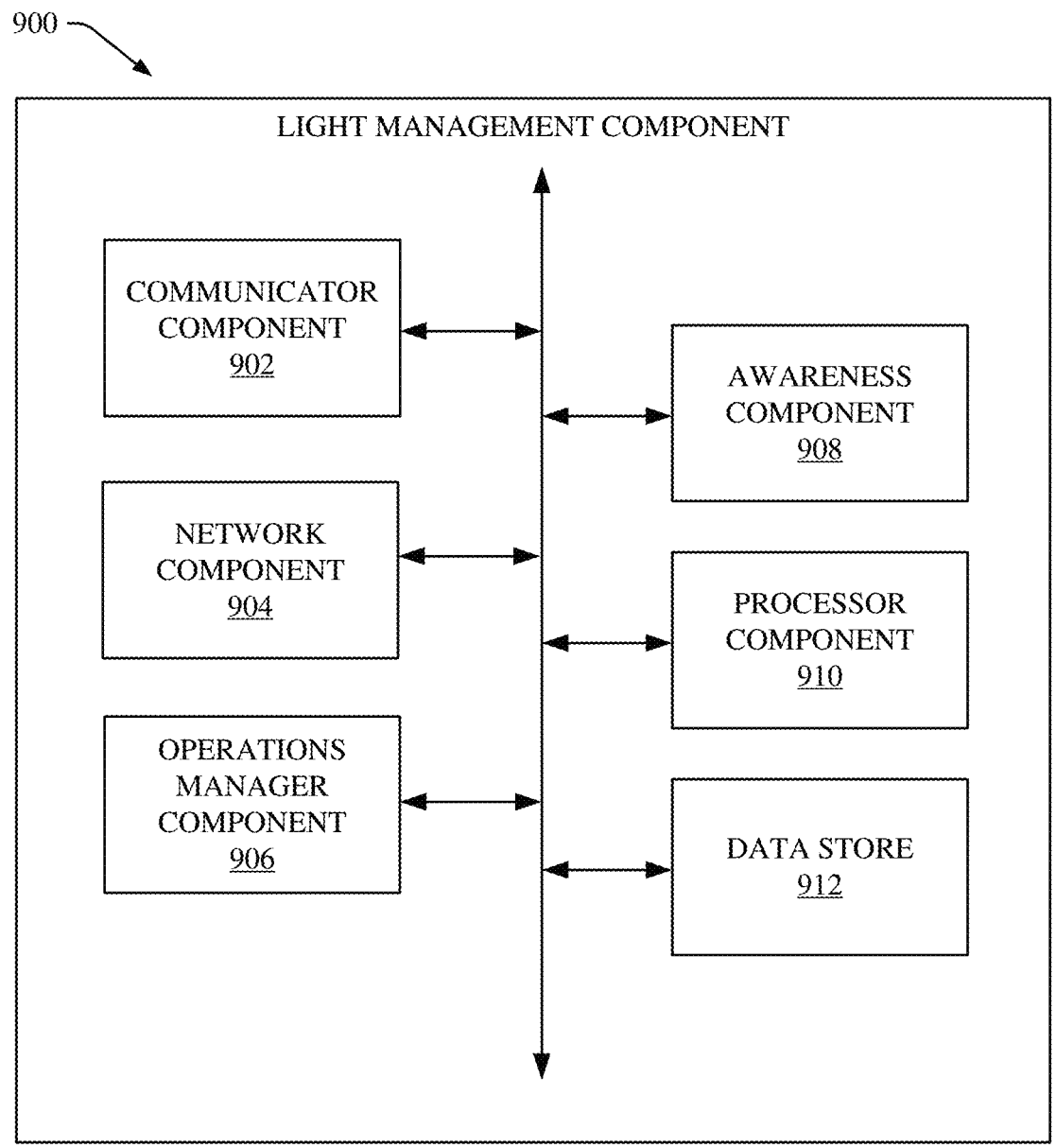
FIG. 9 depicts a block diagram of an example, non-limiting light management component, in accordance with various aspects and embodiments described herein.

FIG. 9 depicts a block diagram of an example, non-limiting light management component 900, in accordance with various aspects and embodiments described herein. In some implementations, the light management component 900 can be part of an enhanced light device.

The light management component 900 can comprise a communicator component 902 that can communicate data between the enhanced light device and one or more other devices, such as, for example, one or more other enhanced light devices and/or one or more devices (e.g., communication devices, such as a mobile phone, computer, electronic tablet, . . . ; appliance, machine, security system, or other device or system that has communication functionality) that can be located in an area and/or can be associated with one or more entities (e.g., another user(s), law enforcement, a fire department, an emergency response entity, . . . ). The communicator component 902 can communicate information using wireline or wireless communication technologies and protocols, as more fully described herein. The communicator component 902 also can facilitate presenting desired visual information and/or audio information to one or more users in proximity to the enhanced light device.

The light management component 900 also can include a network component 904 that can employ one or more communication network technologies and/or protocols to facilitate establishing a communication connection between the enhanced light device and one or more other devices, such as, for example, one or more other enhanced light devices and/or devices that can be located in an area and/or can be associated with one or more entities. The communication connection can be a wireline communication connection and/or a wireless communication connection using wireline or wireless communication technologies and protocols, as more fully described herein.

The light management component 900 further can comprise an operations manager component 906 that can control (e.g., manage) operations associated with the light management component 900. For example, the operations manager component 906 can facilitate generating instructions to have components of the light management component 900 perform operations, and can communicate respective instructions to respective components (e.g., communicator component 902, network component 904, awareness component 908, . . . ) of the light management component 900 to facilitate performance of operations by the respective components of the light management component 900 based at least in part on the instructions, in accordance with the defined light management criteria and the defined light management algorithm(s). The operations manager component 906 also can facilitate controlling data flow between the respective components of the light management component 900 and controlling data flow between the light management component 900 and another component(s) or device(s) (e.g., another enhanced light device(s) associated with the enhanced light device; a device, such as a communication device; a base station or other component or device of the communication network) associated with (e.g., connected to) the light management component 900.

The light management component 900 also can include an awareness component 908 that can enable the enhanced light device to learn and understand the environment in which the enhanced light device is installed or located, determine one or more objectives of the installation or location of the enhanced light device, determine capabilities and/or features of the enhanced light device, perform a self-configuration of the enhanced light device in accordance with the one or more determined objectives and the determined capabilities and/or features of the enhanced light device, and perform operations to achieve the one or more determined objectives.

The light management component 900 can comprise a processor component 910 that can work in conjunction with the other components (e.g., communicator component 902, network component 904, operations manager component 906, awareness component 908, data store 912) to facilitate performing the various functions of the light management component 900. The processor component 910 can employ one or more processors, microprocessors, or controllers that can process data, such as information relating to conditions or contexts (e.g., device conditions or contexts, environmental conditions or contexts, user conditions or contexts) associated with the enhanced light device or an associated device and/or other associated enhanced light devices or associated devices, operation of the enhanced light device or other associated enhanced light devices, parameters, characteristics and/or properties associated with the enhanced light device, responsive actions (e.g., actions responsive to environmental, device, or user conditions or contexts; determining desirable information to present to a user), policies, defined light management criteria, defined environment criteria, defined device criteria, algorithms (e.g., defined light management algorithm(s)), protocols, interfaces, tools, and/or other information, to facilitate operation of the light management component 900 and the enhanced light device, as more fully disclosed herein, and control data flow between the light management component 900 and other components (e.g., other enhanced light devices, communication devices, base station or other devices of the communication network, data sources, applications, . . . ) associated with the light management component 900.

The data store 912 that can store data structures (e.g., user data, metadata), code structure(s) (e.g., modules, objects, hashes, classes, procedures) or instructions, information relating to conditions or contexts (e.g., device conditions or contexts, environmental conditions or contexts, user conditions or contexts) associated with the enhanced light device or an associated device and/or other associated enhanced light devices or associated devices, operation of the enhanced light device or other associated enhanced light devices, parameters, characteristics and/or properties associated with the enhanced light device, responsive actions (e.g., actions responsive to environmental, device, or user conditions or contexts; determining desirable information to present to a user), policies, defined light management criteria, defined environment criteria, defined device criteria, algorithms (e.g., defined light management algorithm(s)), protocols, interfaces, tools, and/or other information, to facilitate controlling operations associated with the light management component 900 and the enhanced light device. In an aspect, the processor component 910 can be functionally coupled (e.g., through a memory bus) to the data store 912 in order to store and retrieve information desired to operate and/or confer functionality, at least in part, to the communicator component 902, network component 904, operations manager component 906, awareness component 908, and data store 912, etc., and/or substantially any other operational aspects of the light management component 900.

Figure 10:
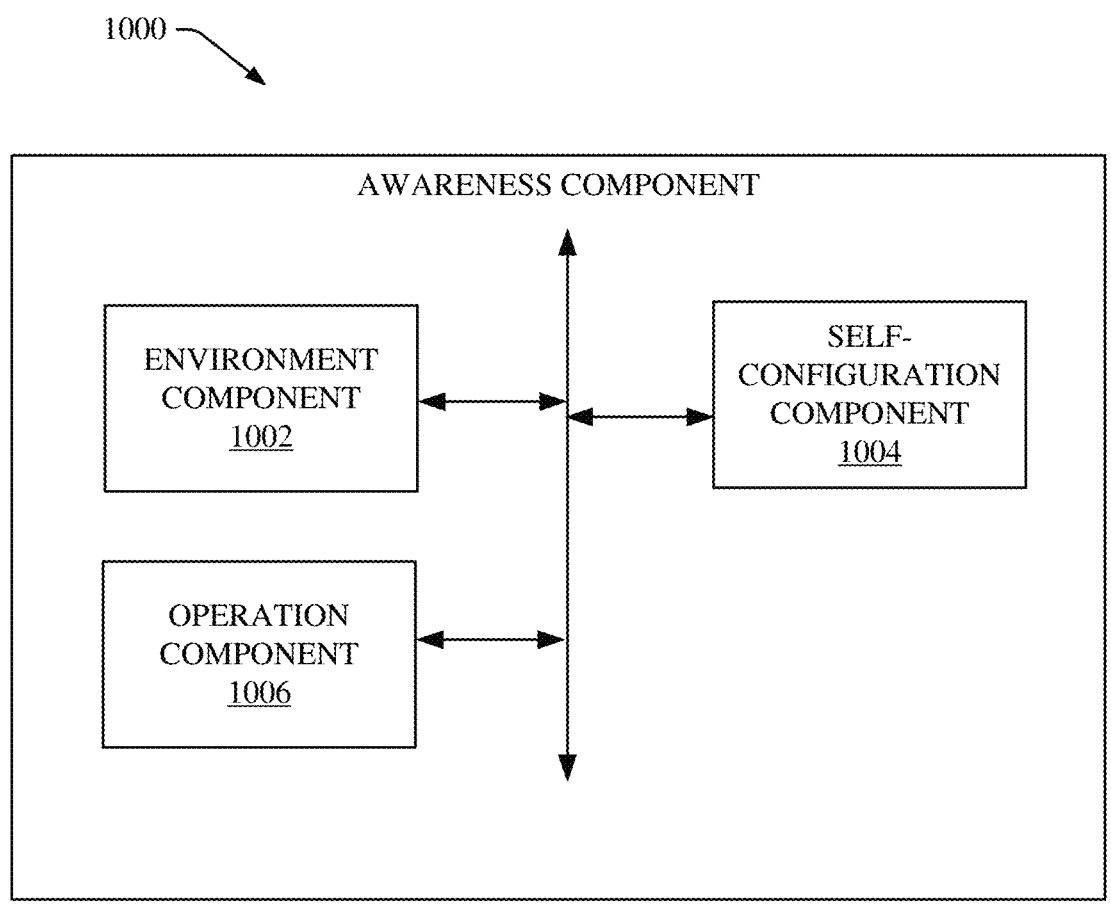
FIG. 10 illustrates a block diagram of an example, non-limiting awareness component, in accordance with various aspects and embodiments of the disclosed subject matter.

FIG. 10 illustrates a block diagram of an example, non-limiting awareness component 1000, in accordance with various aspects and embodiments of the disclosed subject matter. The awareness component 1000 can facilitate enabling an enhanced light device to determine (e.g., ascertain, infer, calculate, predict, prognose, estimate, derive, forecast, detect, and/or compute) characteristics of the environment in which the enhanced light device is installed or located or characteristics of a device associated with (e.g., attached to or in proximity to) the enhanced light device in the environment, determine characteristics, capabilities, and/or features of the enhanced light device, determine one or more objectives of the installation or location of the enhanced light device, perform a configuration (e.g., automatic, dynamic, or self configuration) of the enhanced light device in accordance with the determined characteristics, capabilities, conditions, and/or features of the enhanced light device and the one or more determined objectives, and determine and execute one or more desired actions for the enhanced light device to achieve the one or more determined objectives, in accordance with one or more embodiments described herein. Repetitive description of like elements employed in other embodiments described herein is omitted for sake of brevity.

The awareness component 1000 can comprise an environment component 1002 that can determine characteristics, conditions, or features of an environment in which the enhanced light device is installed or located. The environment component 1002 can employ one or more sensors (of a sensor component) or instruments (of an instrument component) to obtain information about the environment in which the enhanced light device is installed or located. The environment component 1002 can determine characteristics or conditions of the environment, and can generate an environment profile of the environment, based at least in part on the results of analyzing the information regarding the environment. In accordance with various non-limiting embodiments, the characteristics or conditions can include objects, devices, people, flora, fauna, predators, pests, colors, scents, hazards, biohazards, chemicals, dimensional characteristics, health status, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable conditions or characteristics of the environment that can be determined from information obtained by the sensors or instruments. The environment component 1002 also can generate or facilitate generating or updating all or a portion of a device profile for a device associated with the environment and/or all or a portion a user profile associated with a user associated with the environment.

It is to be appreciated and understood that the environment component 1002 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine the conditions, characteristics, or features of the environment based at least in part on the information obtained by one or more sensors or instruments.

The awareness component 1000 also can include a self-configuration component 1004 that can determine characteristics, capabilities, conditions, and/or features of the enhanced light device. The self-configuration component 1004 can generate or update a light profile of the enhanced light device based at least in part on the environment profile of the environment, device profile of the device, and/or the user profile of a user (e.g., person, visitor) associated with the enhanced light device and the characteristics, capabilities, conditions, and/or features of the enhanced light device, in accordance with the defined light management criteria. The self-configuration component 1004 also can determine one or more objectives of the installation or location of the enhanced light device, and perform a self-configuration, automatic configuration, or dynamic configuration of the enhanced light device, in accordance with the one or more determined objectives and the light profile of the enhanced light device.

The awareness component 1000 also can comprise an operation component 1006 that can determine and execute one or more desired (e.g., suitable, acceptable, enhanced, or optimal) actions for the enhanced light device to perform to achieve the one or more determined objectives (e.g., to be responsive to the conditions, characteristics, or contexts of the environment, the device, or the user). For example, the operation component 1006 can employ intelligence (e.g., artificial intelligence) to monitor the environment, or associated device or user, for conditions relating to the characteristics according to the one or more determined objectives using one or more sensors or instruments, determine one or more desired (e.g., suitable, acceptable, enhanced, or optimal) actions for the enhanced light device (e.g., the light component, the enhanced component, and/or one or more instruments of the enhanced light device) to perform to achieve the one or more determined objectives based at least in part on the conditions relating to the characteristics and the determined capabilities, conditions, or features of the enhanced light device, and execute the one or more desired actions (e.g., responsive actions). In an example, the operation component 1006 can select actions from a library of actions stored in a data store or in one or more knowledges sources. In another example, the operation component 1006 can create actions to be performed by the enhanced light device based at least in part on artificial intelligence.

Figure 11:
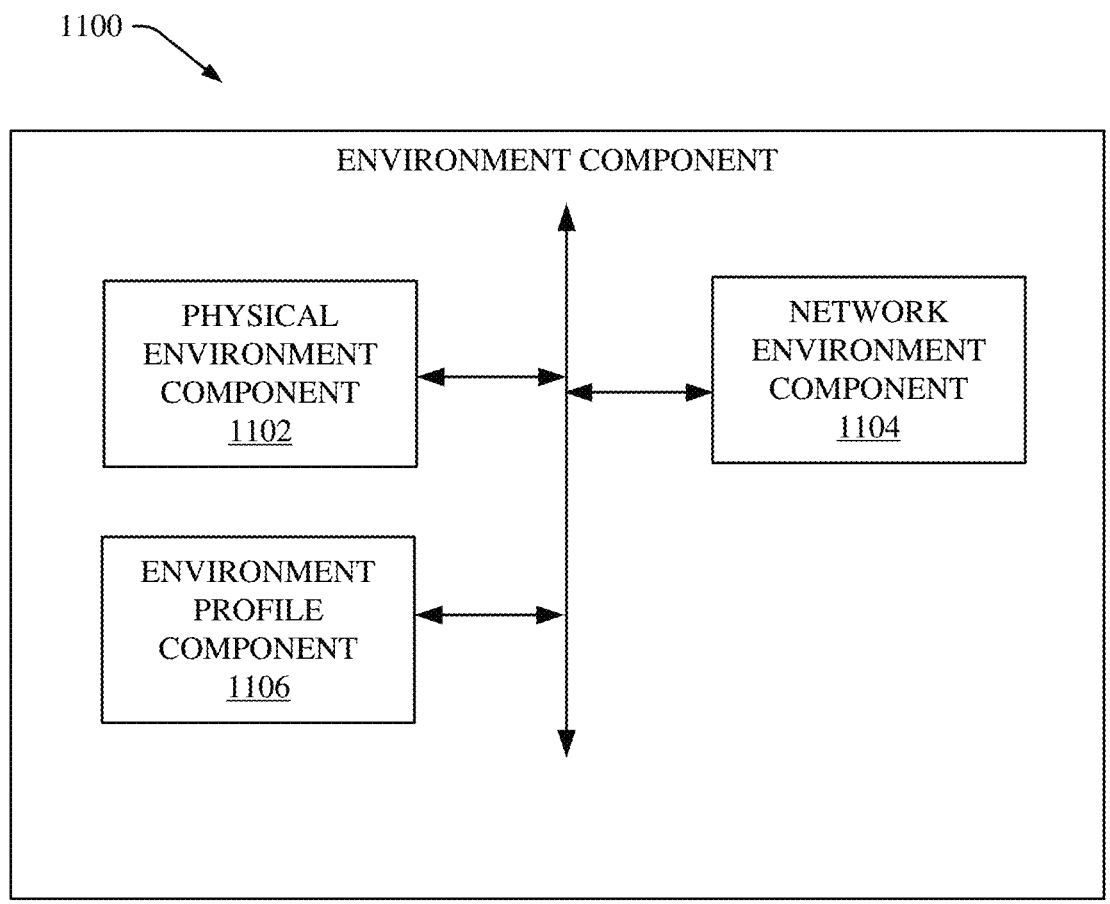
FIG. 11 depicts a block diagram of an example, non-limiting environment component, in accordance with one or more aspects and embodiments described herein.

FIG. 11 depicts a block diagram of an example, non-limiting environment component 1100, in accordance with one or more aspects and embodiments described herein. The environment component 1100 can comprise a physical environment component 1102 that can employ one or more sensors of a sensor component, as described herein, to obtain physical information about the physical environment in which the enhanced light device is installed or located. In an example, the physical environment component 1102 can employ a camera to obtain visual information about the environment. In another example, the physical environment component 1102 can employ a microphone to obtain audio information about the environment. In a further example, the physical environment component 1102 can employ a GPS device to obtain its location in the environment. In still another example, the physical environment component 1102 can employ an LIDAR sensor to obtain mapping information about the environment. In yet another example, the physical environment component 1102 can employ a GPS device and LIDAR sensor to map the locations of characteristics, conditions, or features recognized by the physical environment component 1102 in the environment. It is to be appreciated and understood that the physical environment component 1102 can employ any suitable sensor or instrument to obtain corresponding information produced by the sensor or instrument about the physical environment.

The environment component 1100 can comprise a network environment component 1104 that can employ one or more sensors or instruments as described herein to obtain information about the network environment in which the enhanced light device is installed or located. In an example, the network environment component 1104 can employ a communication device to discover communication networks operating in the environment. The network environment component 1104 can connect to one or more of the networks using suitable security and authentication schemes and obtain device information about devices and/or other enhanced light devices operating on the one or more networks. In a non-limiting example, device information regarding a device can comprise device type, device model number, device location, device functionality, device configuration, device security, communication protocols supported, or any other suitable attribute of a device. It is to be appreciated and understood that the network environment component 1104 can employ suitable security techniques to prevent unauthorized access to the enhanced light device while obtaining device information regarding other devices on the one or more networks. The enhanced light device (e.g., the light management component or the network environment component 1104) can determine what security and/or communication protocols it should employ and self-configure for operation using the appropriate security and/or communication protocols.

The environment component 1100 also can include an environment profile component 1106 that can create an environment profile that can describe the characteristics, conditions, and/or features of the environment in which the enhanced light device is installed or located based at least in part on the physical information and the device information obtained by the one or more sensors or instruments. For example, the environment profile component 1106 can employ intelligent recognition techniques to recognize characteristics, conditions, and/or features of the environment based at least in part on the physical information and the device information. In an additional example, the environment profile component 1106 can associate device information obtained from the devices with corresponding physical information associated with the devices obtained from sensors. The environment profile component 1106 also can employ knowledge resources (e.g., Internet, libraries, encyclopedias, databases, devices, or any other suitable knowledge resources (e.g., extrinsic data sources)) to obtain detailed information describing the characteristics, conditions, and/or features of the environment. For example, the environment profile component 1106 can obtain detailed product information related to recognized characteristics, conditions, or features of the environment. In another example, the environment profile component 1106 can obtain risk information related to recognized characteristics, conditions, or features of the environment. In a further example, the environment profile component 1106 can obtain information describing interaction between various recognized characteristics, conditions, or features of the environment. The environment profile component 1106 can obtain any suitable information associated with recognized characteristics, conditions, or features of the environment from any suitable knowledge resource.

Furthermore, the environment profile component 1106 can generate a confidence metric indicative of a confidence of a determination of a characteristic, condition, or feature that has been made by the environment profile component 1106 based at least in part on any suitable function. For example, the environment profile component 1106 can employ the multiple sources of information (e.g., physical information, device information, and information from knowledge sources) and perform a cross-check validation across the various sources to generate a confidence metric indicative of a confidence of an accuracy of a determination of a characteristic, condition, or feature.

The environment profile component 1106 can employ the characteristics, conditions, features, and/or any associated obtained information to generate the environment profile that describes the characteristics, conditions, or features of the environment. The environment profile component 1106 can organize the environment profile in any desired (e.g., suitable, acceptable, or optimal) manner, non-limiting examples of which can include an array, a table, a tree, a map, a graph, a chart, a list, network topology, or any other suitable manner of organizing data in a profile. In a non-limiting example, the environment profile can include respective entries for each characteristic, condition, or feature of the environment that comprise a detailed description of the characteristic, condition, or feature, a location of the characteristic, condition, or feature in the environment, tracking information describing changes to the characteristic, condition, or feature over time, source used to determine the characteristic, condition, or feature, confidence of accuracy of the determined characteristic, condition, or feature, or any other suitable information associated with the characteristic, condition, or feature. The environment profile can comprise a map of the environment identifying characteristics, conditions, or features, and their respective locations on the map.

It is to be appreciated and understood that the environment profile component 1106 also can be employed to generate, or facilitate generating or updating, all or a portion of a device profile for a device associated with the environment and/or all or a portion a user profile associated with a user associated with the environment.

Figure 12:
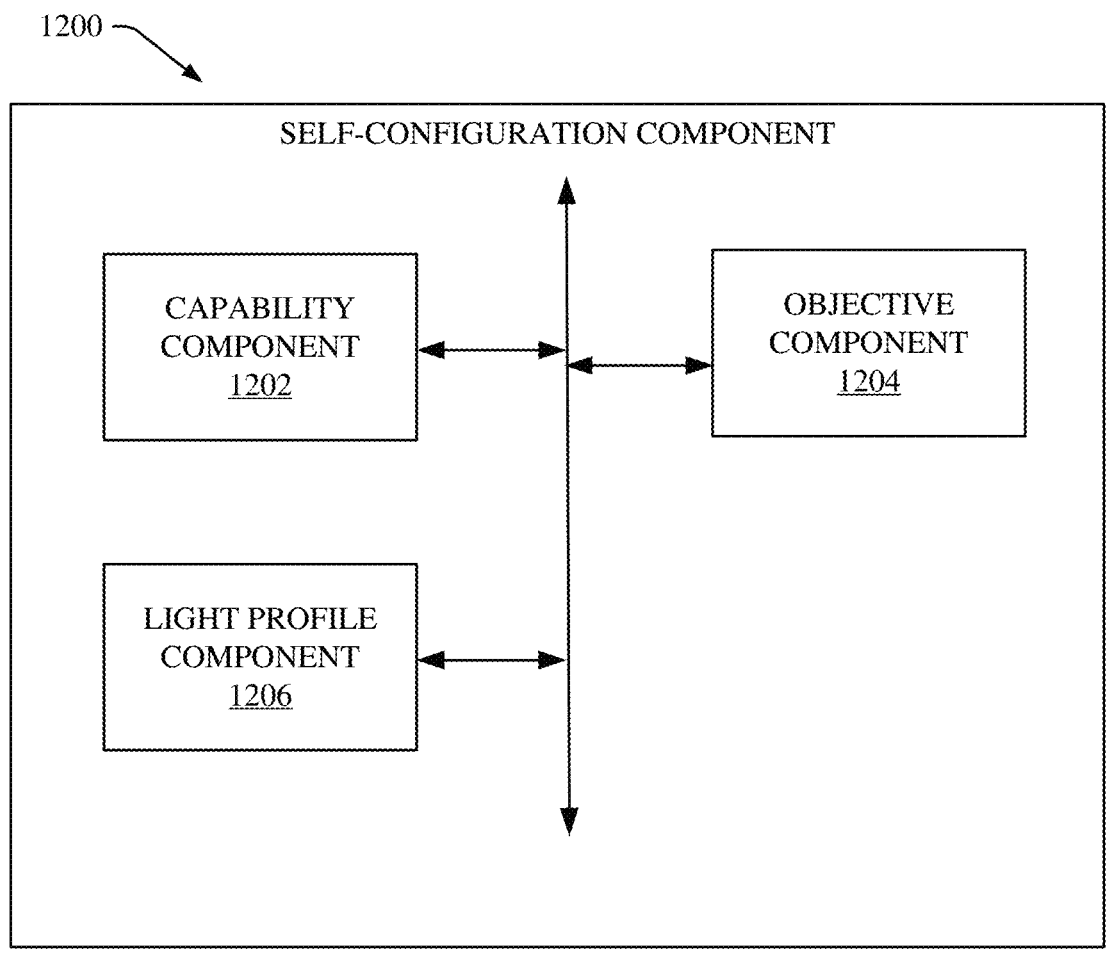
FIG. 12 presents a block diagram of an example, non-limiting self-configuration component, in accordance with one or more aspects and embodiments of the disclosed subject matter.

FIG. 12 presents a block diagram of an example, non-limiting self-configuration component 1200, in accordance with one or more aspects and embodiments of the disclosed subject matter. The self-configuration component 1200 can analyze the enhanced light device (e.g., characteristics, properties, components, features, and/or conditions of the enhanced light device) and/or information relating to the enhanced light device. Based at least in part on the results of the analysis, the self-configuration component 1200 can determine characteristics, properties, capabilities, features and/or conditions of the enhanced light device, determine one or more objectives of the installation or location of the enhanced light device, and perform a self-configuration, and/or an automatic or dynamic configuration, of the enhanced light device according to the one or more determined objectives.

The self-configuration component 1200 can include a capability component 1202 that can perform a self-examination of the enhanced light device to determine characteristics, properties, capabilities, features and/or conditions of the enhanced light device, including in relation to where the enhanced light device is installed or located. For example, the capability component 1202 can determine characteristics, properties, capabilities, features and/or conditions of the enhanced light device, such as, in non-limiting examples, power sources, computers, processor components (e.g., processors, microprocessors, controllers, . . . ), memories (e.g., data stores), programs, sensors, instruments, light component (e.g., light elements), information component, or any other suitable capability of the diffusion light device. In an example, the capability component 1202 can probe a system bus to facilitate determining characteristics, properties, capabilities, features and/or conditions of the enhanced light device. In another example, the capability component 1202 can examine a memory (e.g., data store) for information regarding characteristics, properties, capabilities, features and/or conditions of the enhanced light device. In a further example, the capability component 1202 can obtain information regarding characteristics, properties, capabilities, features and/or conditions of the enhanced light device from one or more knowledge sources (e.g., extrinsic data sources). It is to be appreciated and understood that the capability component 1202 can employ any suitable mechanism to determine the characteristics, properties, capabilities, features and/or conditions of the enhanced light device.

The self-configuration component 1200 also can include an objective component 1204 that can determine one or more objectives of the installation or location of the enhanced light device. For example, the objective component 1204 can employ intelligence (e.g., artificial intelligence) to determine an objective of the installation or location of the enhanced light device based at least in part on an environment profile of the environment, a device profile of a device, and/or a user profile of a user, associated with the enhanced light device and the determined characteristics, properties, capabilities, features and/or conditions of the enhanced light device. In a non-limiting example, an objective can be related to safety, automation, control, communication, instruction, entertainment, social enhancement, economics, mood enhancement, activity enhancement, notification, coordination, monitoring, intervention, time management, workflow management, or any other suitable objective. In an example, the objective component 1204 can select one or more objectives from a library of objectives stored in a data store or in one or more knowledges sources. In another example, the objective component 1204 can create one or more objectives based at least in part on artificial intelligence. In a further example, the objective component 1204 can create linked objectives, wherein one or more objectives can depend on one or more other objectives. For example, an objective can become active if another objective is achieved. In another example, an objective can become inactive if another objective is achieved. It is to be appreciated and understood that the objective component 1204 can employ any suitable mechanism to determine objectives of the enhanced light device.

The self-configuration component 1200 further can comprise a light profile component 1206 that can generate a light profile for (e.g., representative of) the enhanced light device based at least in part on the characteristics, properties, capabilities, features and/or conditions of the enhanced light device and/or the one or more determined objectives. The light profile can comprise or be based at least in part on the environment profile associated with the environment, device profile associated with the device, and/or user profile associated with the user, that is associated with the enhanced light device, characteristics, properties, capabilities, features and/or conditions of the enhanced light device, and objectives of the enhanced light device. The light profile component 1206 can organize the light profile in any desired (e.g., suitable or acceptable) manner, non-limiting examples of which can include an array, a table, a tree, a map, a graph, a chart, a list, a topology, or any other suitable manner of organizing data in a particular profile. In a non-limiting example, the light profile can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, the light profile component 1206 can configure settings of one or more parameters of the enhanced light device (e.g., of the light component, light elements, information component, processor component, data store, programs, sensor component, instrument component, light fixture, housing, lens, base component, socket component, or any other suitable parameters of components of the enhanced light device) to achieve the one or more objectives, and store the settings in the light profile.

Some of the processes performed by the components of or associated with the enhanced light device can be performed by specialized computers for carrying out defined tasks related to determining characteristics of the environment in which an enhanced light device is installed or located, determining capabilities of the enhanced light device, determining one or more objectives of the installation or location of the enhanced light device, performing a self-configuration of the enhanced light device according to the one or more determined objectives, and determining and executing suitable actions for the enhanced light device to perform to achieve the one or more determined objectives. The subject computer processing systems, methods, apparatuses, and/or computer program products can be employed to solve new problems that arise through advancements in technology, computer networks, the Internet, and the like. The subject computer processing systems, methods, apparatuses, and/or computer program products can provide technical improvements to systems for determining characteristics or properties of the environment in which the enhanced light device is installed or located, determining capabilities of the enhanced light device, determining one or more objectives of the installation of the enhanced light device, performing a self-configuration, and/or automatic or dynamic configuration, of the enhanced light device according to the one or more determined objectives, and determining and executing suitable actions for the enhanced light device to perform to achieve the one or more determined objectives by improving processing efficiency among processing components in these systems, reducing delay in processing performed by the processing components, reducing memory requirements, and/or improving the accuracy in which the processing systems are determining characteristics of the environment in which the enhanced light device is installed or located, determining capabilities of the enhanced light device, determining one or more objectives of the installation or location of the enhanced light device, performing a self-configuration, and/or automatic or dynamic configuration, of the enhanced light device according to the one or more determined objectives, and determining and executing suitable actions for the enhanced light device to perform to achieve the one or more determined objectives.

The embodiments of systems, devices, and/or methods described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 13-16. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 13:
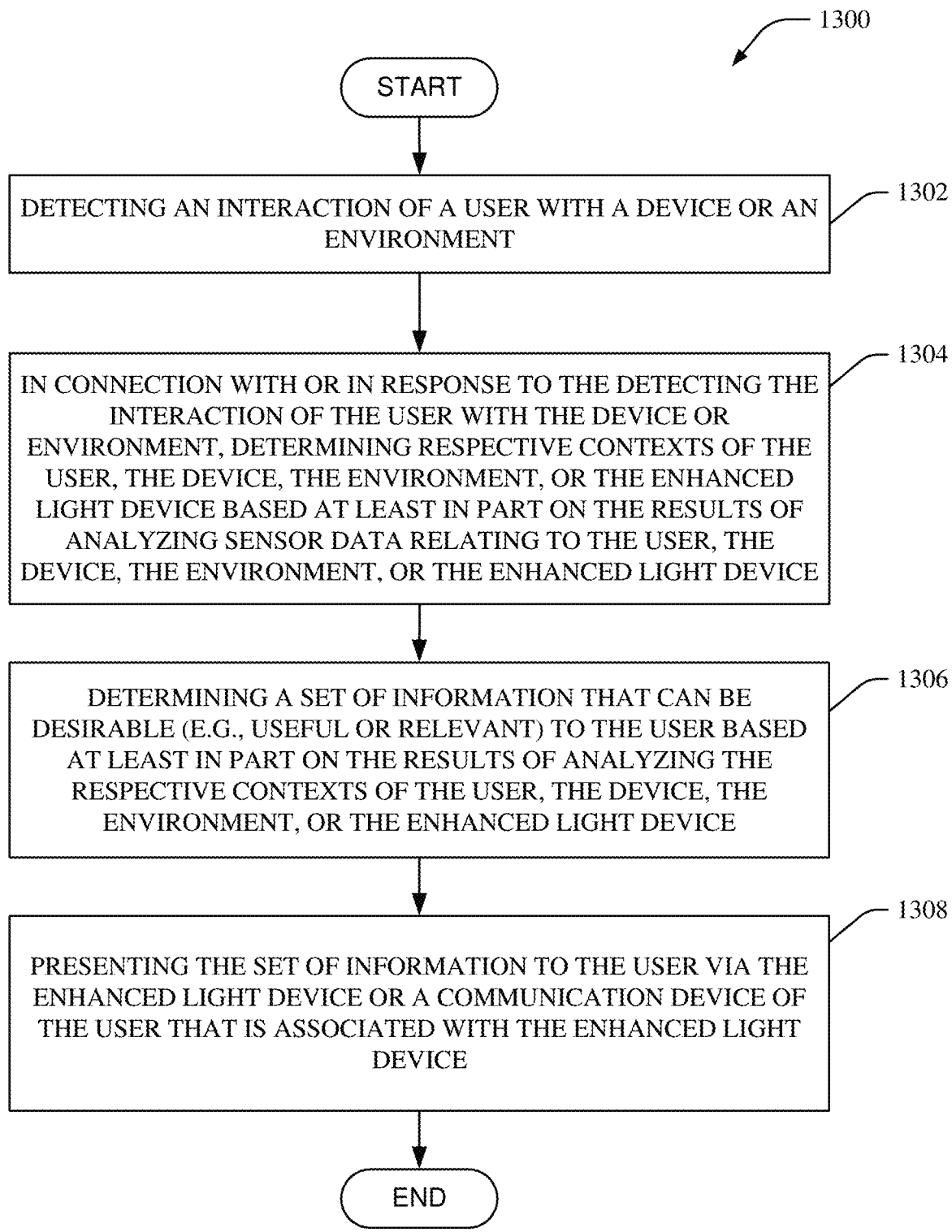
FIG. 13 illustrates a flow diagram of an example, non-limiting method that can facilitate controlling operation of one or more enhanced light devices to facilitate determining and providing desirable information regarding a device and/or environment to a user, in accordance with various aspects and embodiments of the disclosed subject matter.

FIG. 13 illustrates a flow diagram of an example, non-limiting method 1300 that can facilitate controlling operation of one or more enhanced light devices to facilitate determining and providing desirable (e.g., useful or relevant) information regarding a device and/or environment to a user, in accordance with various aspects and embodiments of the disclosed subject matter. The method 1300 can be employed, for example, by a system comprising a processor and/or a light management component of an enhanced light device.

At 1302, interaction of a user with a device or an environment can be detected. The light management component can detect or identify the interaction of the user with the device or the environment, which can include interaction with the enhanced light device, based at least in part on the results of analyzing sensor data received from one or more sensors of a sensor component of the enhanced light device. One or more sensors of the sensor component can monitor the device or environment, and can sense the interaction of the user with the device or the environment. The one or more sensors can generate sensor data relating to the interaction of the user with the device or the environment, and can communicate the sensor data to the light management component. The light management component can analyze the sensor data and can detect or identify the interaction of the user with the device or environment based at least in part on the results of the analysis of the sensor data.

At 1304, in connection with or in response to the detecting the interaction of the user with the device or environment, respective contexts of the user, the device, the environment, or the enhanced light device can be determined based at least in part on the results of analyzing sensor data relating to the user, the device, the environment, or the enhanced light device. The sensor component can sense or detect respective conditions, characteristics, or features of the user, device, environment, or enhanced light device, and can generate sensor data relating to the respective conditions, characteristics, or features of the user, device, environment, or enhanced light device. The light management component can analyze the sensor data relating to the respective conditions, characteristics, or features of the user, device, environment, or enhanced light device. Based at least in part on the results of such data analysis, the light management component can determine the respective contexts of the user, the device, the environment, or the enhanced light device.

At 1306, a set of information that can be desirable (e.g., useful or relevant) to the user can be determined based at least in part on the results of analyzing the respective contexts of the user, the device, the environment, or the enhanced light device. The light management component can analyze the respective contexts of the user, the device, the environment, or the enhanced light device. Based at least in part on the results of such analysis, the light management component can determine the set of information that can be desirable to the user. The set of information can comprise information stored on the enhanced light device (e.g., in the information component or data store) and/or other information obtained from one or more data sources (e.g., one or more communication devices) that can provide the other information.

As an example, the device can be an automobile, with the enhanced light device being installed in the automobile. Based at least in part on the results of analyzing sensor data relating to the automobile and sensor data relating to the user, the light management component can determine that the context of the automobile is that the air conditioner of the automobile is not functioning properly to cool the inside of the automobile to a desired temperature, and can determine that the context of the user is that the user is interacting with the controls of the air conditioner. Based at least in part on the determined contexts of the automobile and the user, the light management component can determine that information relating to malfunctioning of the air conditioner and/or air conditioner-related information from the user manual for the automobile can or may be useful or relevant to the user and can include such information relating to the air conditioner in the set of information to be presented to the user.

At 1308, the set of information can be presented to the user via the enhanced light device or a communication device of the user that is associated with the enhanced light device. The light management component can facilitate presenting (e.g., displaying, broadcasting, providing haptic feedback regarding) the set of information to the user via the enhanced light device or the communication device of the user, wherein the communication device can be associated with (e.g., communicatively connected to) the enhanced light device.

Figure 14:
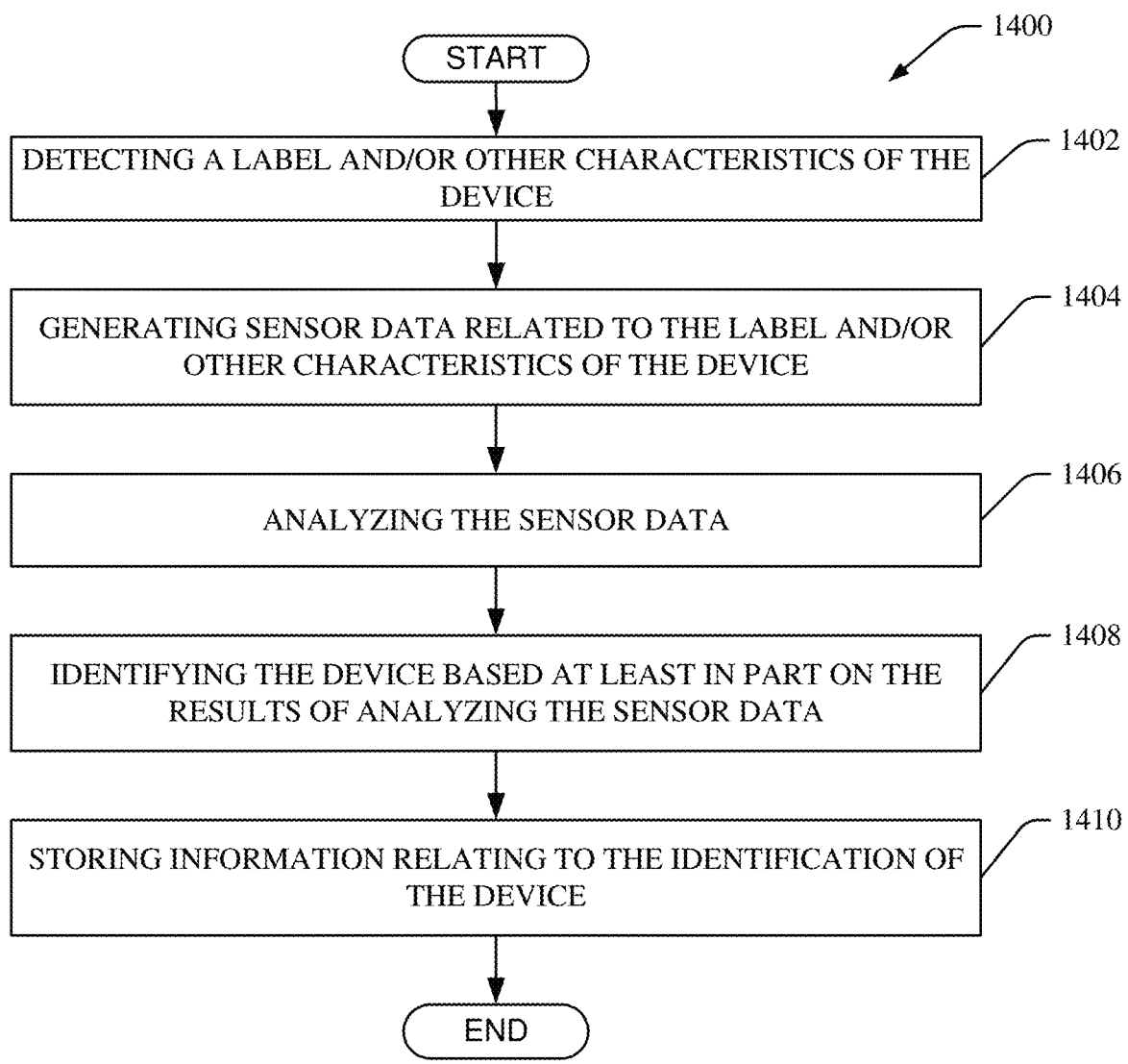
FIG. 14 presents a flow diagram of an example, non-limiting method that can facilitate identifying a device associated with an enhanced light device, in accordance with various aspects and embodiments of the disclosed subject matter.

FIG. 14 presents a flow diagram of an example, non-limiting method 1400 that can facilitate identifying a device associated with an enhanced light device, in accordance with various aspects and embodiments of the disclosed subject matter. The method 1400 can be employed, for example, by an enhanced light device comprising a system, which includes a processor, and/or a light management component, an information component, and a sensor component.

At 1402, a label and/or other characteristics of the device can be detected. One or more sensors of the sensor component of the enhanced light device can sense or detect the label and/or other characteristics of the device. For example, a sensor (e.g., camera) of the sensor component can detect a label that is affixed to the device (e.g., appliance, such as a refrigerator, oven, . . . ; vehicle; machine; automated system or a device of an automated system; . . . ) and can capture an image of the label. As another example, a sensor (e.g., camera) of the sensor component can detect an icon, logo, or emblem situated on the device and/or other characteristics (e.g., features) of the device, and can capture an image(s) of the icon and/or other characteristics. The icon, logo, or emblem can, for instance, have a unique design that can be associated with and indicative of the manufacturer and/or model of the device. The other characteristics can comprise, for example, the shape and/or dimensions of the device, or portion thereof (e.g., inside of appliance where the enhanced light device is located), functionality of the device (e.g., controlling or modifying temperature (e.g., oven that produces heat; refrigerator that produces cooler temperatures; . . . )), attachments to the device (e.g., shelfs or drawers of a refrigerator; rack(s) of an oven, . . . ), and/or other characteristics that can facilitate identifying the device.

At 1404, sensor data related to the label and/or other characteristics of the device can be generated. The one or more sensors can generate sensor data related to the label and/or other characteristics of the device.

At 1406, the sensor data can be analyzed. The light management component can analyze the sensor data related to the label and/or other characteristics of the device. For example, the light management component can analyze the image of the label or other characteristic(s) of the device, wherein such analysis can include performing pattern recognition on the image to identify patterns, such as characters (e.g., letters, numbers) or words; logos, icons, or emblems; patterns of device components (e.g., rack of an oven; shelf of a refrigerator). In some embodiments, the sensor (e.g., camera) can perform all or part of the analysis of the image, wherein such analysis can include performing pattern recognition on the image to identify patterns, such as characters (e.g., letters, numbers) or words, logos, icons, or emblems. As another example, the light management component can analyze other sensor data from other sensors (e.g., temperature sensor, humidity sensor, . . . ) that can indicate or facilitate identifying particular functionalities of the device (e.g., oven can produce heat, refrigerator can produce cooler temperatures, . . . ).

At 1408, the device can be identified based at least in part on the results of analyzing the sensor data. The light management component can identify the device based at least in part on the results of analyzing the sensor data. In some implementations, as part of the analysis, based at least in part on the results of analyzing the sensor data, the light management component can search for additional (e.g., supplemental) information regarding the device from one or more data sources (e.g., communication devices or another enhanced light device) via a communication network, can analyze the additional information, and can identify the device based at least in part on the results of analyzing the sensor data and the additional information. For example, based at least in part on the results of analyzing certain sensor data, the light management component is able to identify the manufacturer of the device, but has not definitively identified the model of the device, wherein the analysis results also indicate the shape, dimensions, and functionality of the device.

The light management component also can use the analysis results regarding the identification of the manufacturer of the device and the shape, dimensions, and functionality of the device to search for additional information regarding the device to identify the model of the device. For instance, using such analysis results as part of a search (with the light management component knowing the manufacturer of the device and the shape, dimensions, and functionality of the device from such analysis results), the light management component can search via the Internet (e.g., search websites and associated communication devices associated with the Internet) for the additional information regarding the model of the device, can locate a website(s) that has the desired additional information regarding the model of the device, and can determine or identify the model of the device, and/or other desired identifying information regarding the device, based at least in part on the additional information.

At 1410, information relating to the identification of the device can be stored. The light management component can store the information relating to the identification of the device in the information component and/or a data store of the enhanced light device.

Figure 15:
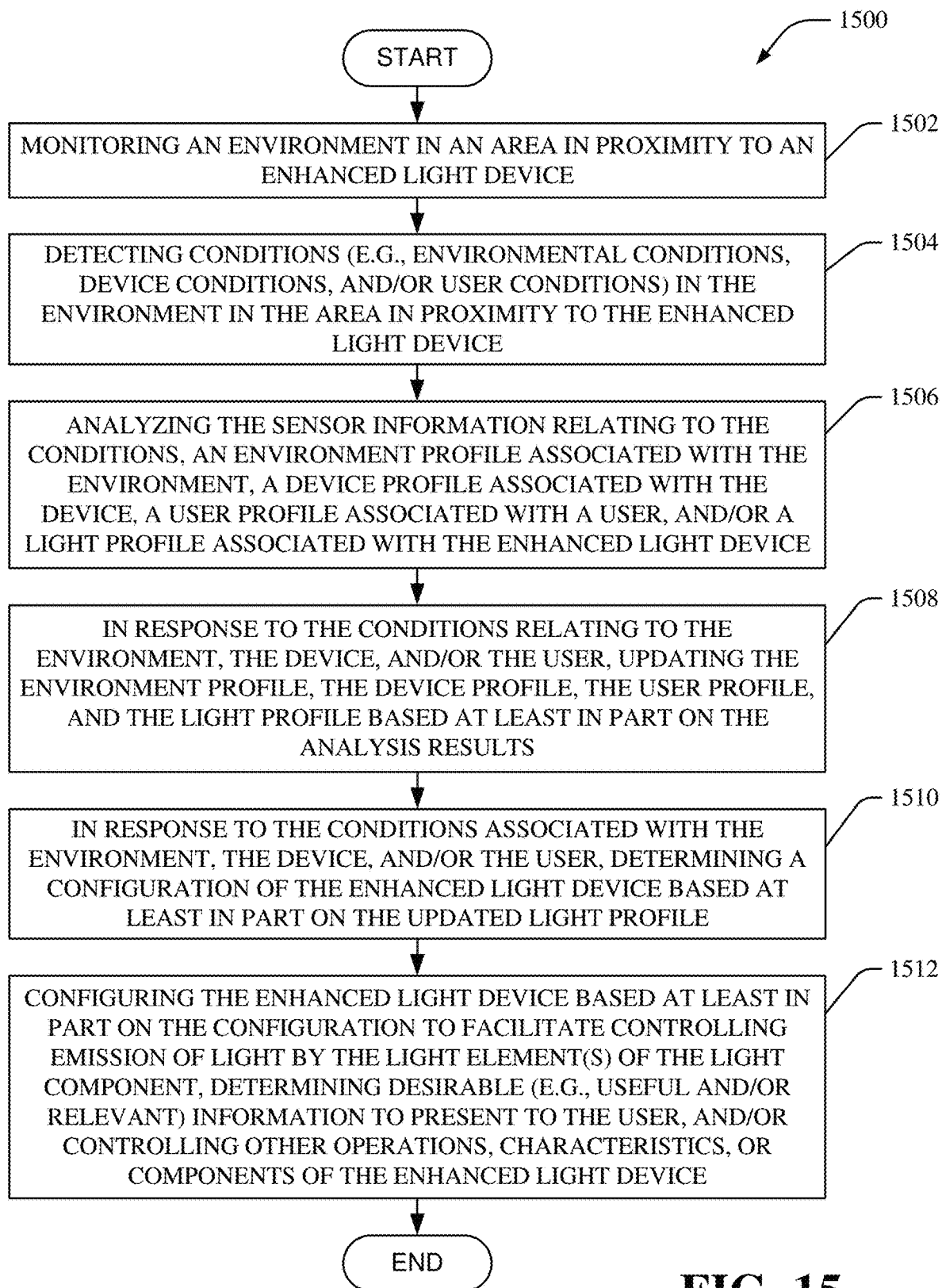
FIG. 15 depicts a flow diagram of another example, non-limiting method that can facilitate controlling operation of one or more enhanced light devices, in accordance with various aspects and embodiments of the disclosed subject matter.

FIG. 15 depicts a flow diagram of another example, non-limiting method 1500 that can facilitate controlling operation of one or more enhanced light devices, in accordance with various aspects and embodiments of the disclosed subject matter. The method 1500 can be employed, for example, by a system comprising a processor, a light management component, an information component, a sensor component, and/or an instrument component.

At 1502, an environment in an area in proximity to an enhanced light device can be monitored. One or more sensors of a sensor component of the enhanced light device can monitor the area.

At 1504, conditions (e.g., environmental conditions, device conditions, and/or user conditions) can be detected in the environment in the area in proximity to the enhanced light device. One or more of the sensors can detect the conditions (e.g., change in conditions) in the environment, the device, and/or the user in the area in proximity to the enhanced light device and can generate sensor information indicating, representing, and/or describing the conditions.

At 1506, the sensor information relating to the conditions, an environment profile associated with the environment, a device profile associated with the device, a user profile associated with a user, and/or a light profile associated with the enhanced light device, can be analyzed. The light management component can receive the sensor information from one or more of the sensors. The light management component also can access and retrieve the environment profile, the device profile, the user profile, and/or the light profile from a data store of the enhanced light device. The light management component can analyze the sensor information, the environment profile, the device profile, the user profile, and/or the light profile to generate analysis results.

At 1508, in response to the conditions relating to the environment, the device, and/or the user, the environment profile, the device profile, the user profile, and the light profile can be updated based at least in part on the analysis results. To account for the conditions (e.g., change in conditions) relating to the environment, the device, and/or the user, the light management component can determine respective updates to, and perform respective updates to, the environment profile, the device profile, the user profile, and the light profile based at least in part on the analysis results.

At 1510, in response to the conditions associated with the environment, the device, and/or the user, a configuration (e.g., re-configuration) of the enhanced light device can be determined based at least in part on the updated light profile (which can be updated based at least in part on the updated environment profile, updated device profile, and/or updated user profile). To self-configure the enhanced light device to respond to the conditions associated with the environment, the device, and/or the user, the light management component can determine a configuration of the enhanced light device based at least in part on the updated light profile (e.g., based at least in part on the results of analyzing the updated light profile). The light profile can comprise information (e.g., light profile information) that can indicate or specify the configuration of various parameters of various components (e.g., a light element(s) of the light component, the information component, an instrument(s) of the instrument component, a processor, a program(s), . . . ) of the enhanced light device. In some implementations, the light management component can structure the light profile to map respective configurations of respective parameters of respective components of the enhanced light device to respective conditions of the environment, respective conditions of the device, respective conditions of the user, and/or user preferences of the user.

At 1512, the enhanced light device can be configured based at least in part on the configuration to facilitate controlling emission of light by the light element(s) of the light component, determining desirable (e.g., useful and/or relevant) information to present to the user, and/or controlling other operations, characteristics, or components of the enhanced light device. The light management component can facilitate configuring the enhanced light device (e.g., respective components of the enhanced light device), in accordance with the configuration determined for the enhanced light device, based at least in part on the light profile, to facilitate controlling the emission of light by the light element(s), determining the desirable information to present to the user, and/or other operations, characteristics, or components of the enhanced light device. For example, one or more respective parameters of one or more respective components of the enhanced light device can be configured (e.g., reconfigured), set, or adjusted to facilitate configuring (e.g., auto or self configuring) the respective components of the enhanced light device, in accordance with the light profile.

The light management component can update (e.g., automatically or dynamically update) the environment profile, device profile, user profile, and/or light profile in real time, or substantially real time, and/or in response to a condition detected with respect to the environment, the device, and/or the user, in the area in proximity to the enhanced light device, to account for and respond to any changes with respect to the environment, the device, an/or the user in the area in proximity to the enhanced light device. The light management component can control (e.g., automatically or dynamically control), in real time or at least substantially real time, the configuration and the operation of the enhanced light device based at least in part the light profile (e.g., as updated).

Figure 16:
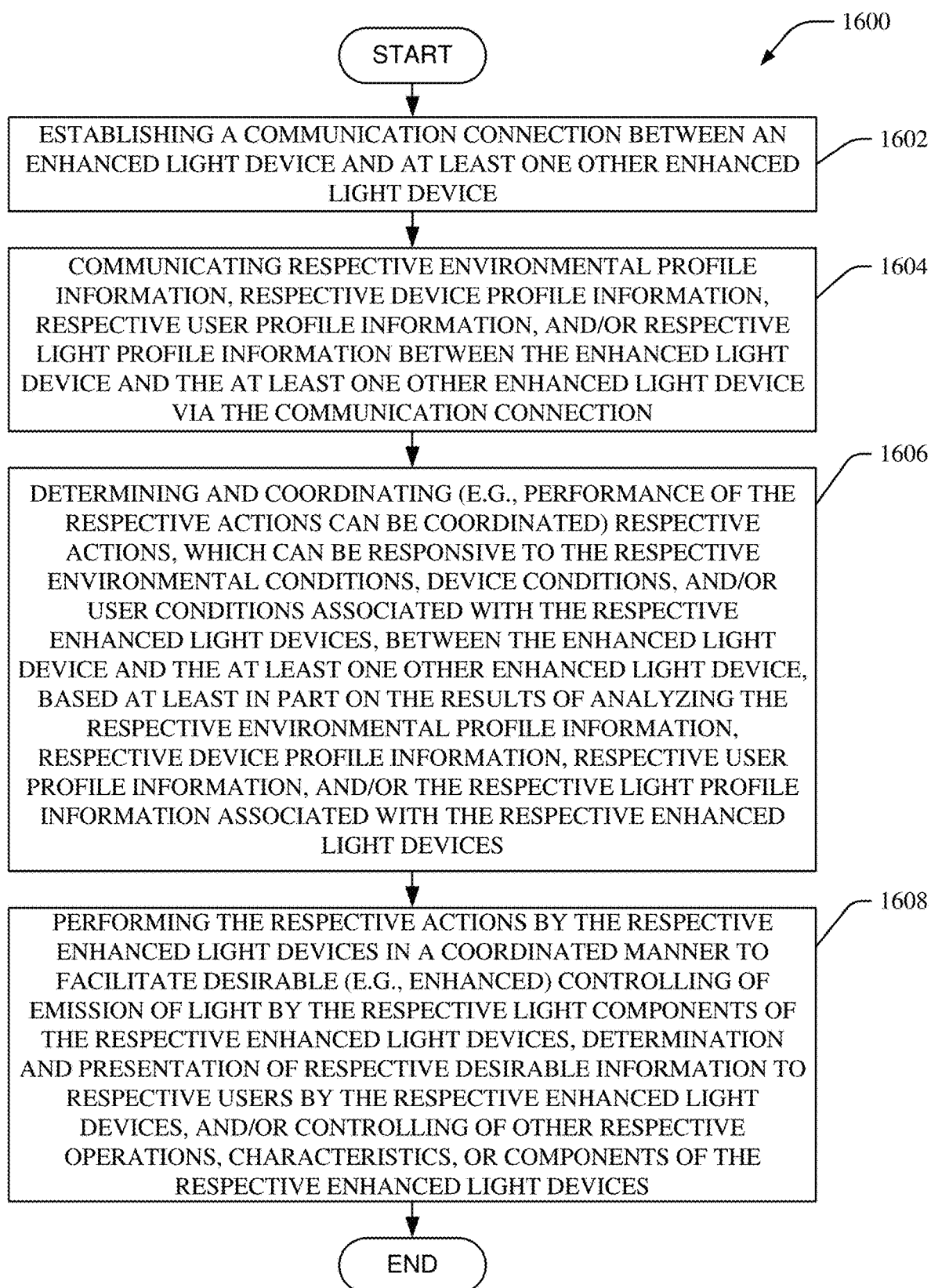
FIG. 16 illustrates a flow diagram of an example, non-limiting method that can facilitate controlling and coordinating respective operation of enhanced light devices, in accordance with various aspects and embodiments of the disclosed subject matter.

FIG. 16 illustrates a flow diagram of an example, non-limiting method 1600 that can facilitate controlling and coordinating respective operation of enhanced light devices, in accordance with various aspects and embodiments of the disclosed subject matter. The method 1600 can be employed, for example, by respective enhanced light devices that can comprise respective systems comprising respective processors and/or respective light management components.

At 1602, a communication connection can be established (e.g., created, generated) between an enhanced light device and at least one other enhanced light device. The enhanced light device can be associated with an area and/or a device, and the at least one other enhanced light device can be associated with at least one other area and/or at least one other device, wherein the at least one other area can be completely distinct from the area or can partially cover (e.g., encompass) the area. The light management component (e.g., a network component of the light management component) of the enhanced light device can detect and contact the at least one other enhanced light device (e.g., at least one network component of at least one other light management component of the at least one other enhanced light device). The respective light management components can exchange network-related information and/or other information to facilitate setting up a communication connection (e.g., at least one communication connection) with each other, and can establish the communication connection between the enhanced light device and the at least one other enhanced light device based at least in part on the network-related information and/or other information. The communication connection can be a wireline communication connection and/or a wireless communication connection.

At 1604, respective environmental profile information, respective device profile information, respective user profile information, and/or respective light profile information can be communicated between the enhanced light device and the at least one other enhanced light device via the communication connection. The enhanced light device can communicate the environment profile, the device profile, the user profile, and/or the light profile associated with the enhanced light device to the at least one other enhanced light device, wherein the environment profile can comprise environmental profile information regarding the environmental conditions associated with the area associated with (e.g., in proximity to) the enhanced light device, the device profile can comprise device profile information regarding the features (e.g., characteristics, attributes, functions, . . . ) and identity (e.g., manufacturer, model, and/or serial number) of the device associated with (e.g., in proximity to) the enhanced light device, the user profile can comprise information (e.g., user preferences, user interactions with the device or environment, . . . ) relating to a user (e.g., in, interacting with, or in proximity to the environment or device), and the light profile can comprise light profile information regarding the features (e.g., characteristics, attributes, functions, . . . ) of the enhanced light device.

The at least one other enhanced light device can communicate at least one other environment profile, at least one other device profile, at least one other user profile, and/or at least one other light profile associated with the at least one other enhanced light device to the enhanced light device, wherein the at least one other environment profile can comprise environmental profile information regarding the environmental conditions associated with the at least one other area associated with (e.g., in proximity to) the at least one other enhanced light device, the at least one other device profile can comprise device profile information regarding the features (e.g., characteristics, attributes, functions, . . . ) and identity (e.g., manufacturer, model, and/or serial number) of the at least one other device associated with (e.g., in proximity to) the at least one other enhanced light device, the at least one other user profile can comprise information (e.g., user preferences, user interactions with the device or environment, . . . ) relating to at least one other user (e.g., in, interacting with, or in proximity to the at least one other environment or device), and the at least one other light profile can comprise light profile information regarding the features (e.g., characteristics, attributes, functions, . . . ) of the at least one other enhanced light device.

At 1606, respective actions, which can be responsive to the respective environmental conditions, device conditions, and/or user conditions associated with the respective enhanced light devices, can be determined and coordinated (e.g., performance of the respective actions can be coordinated) between the enhanced light device and the at least one other enhanced light device, based at least in part on the results of analyzing the respective environmental profile information, respective device profile information, respective user profile information, and/or the respective light profile information associated with the respective enhanced light devices. The light management component of the diffusion light device, and/or the at least one other light management component of the at least one other diffusion light device, can analyze (e.g., respectively analyze) the respective environmental profile information and/or the respective light profile information associated with the respective diffusion light devices. Based at least in part on the results (e.g., the respective results) of the analysis (e.g., the respective analysis), the light management component and/or the at least one other light management component can determine the respective actions (e.g., action to emit light, action to adjust characteristics of the light to be emitted, action to determine and present desirable information to present to a user(s), and/or an(s)) that are to be performed by the respective enhanced light devices, in accordance with the defined light management criteria. The light management component and the at least one other light management component can negotiate and coordinate with each other to facilitate determining the respective actions that the respective enhanced light devices are to perform to be responsive to the respective environmental conditions, device conditions, and/or user conditions associated with the respective enhanced light devices.

At 1608, the respective actions can be performed by the respective enhanced light devices in a coordinated manner to facilitate desirable (e.g., enhanced) controlling of emission of light by the respective light components of the respective enhanced light devices, determination and presentation of respective desirable information to respective users by the respective enhanced light devices, and/or controlling of other respective operations, characteristics, or components of the respective enhanced light devices. The enhanced light device and the at least one other enhanced light device can perform their respective actions in a coordinated manner to be responsive to the respective environmental conditions, respective device conditions, and/or respective user conditions that are associated with the respective enhanced light device. The respective light management components, respective information components, respective instrument components, respective processor components, etc., of the respective enhanced light devices can facilitate the respective performance of the respective operations associated with the respective actions being performed by the respective enhanced light devices.

Figure 17:
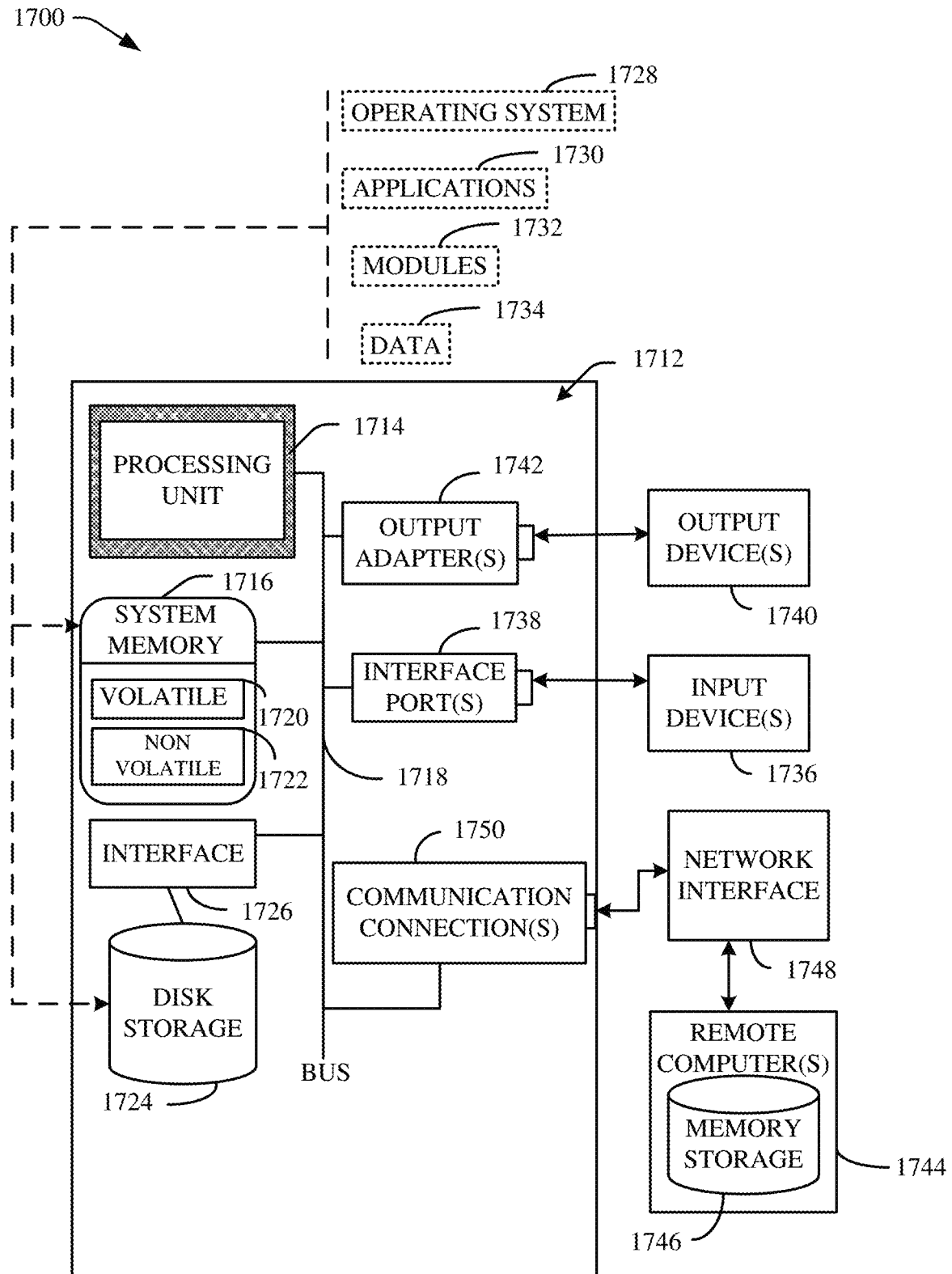
FIG. 17 illustrates a block diagram of an example, non-limiting operating environment in which one or more embodiments described herein can be facilitated.
Figure 18:
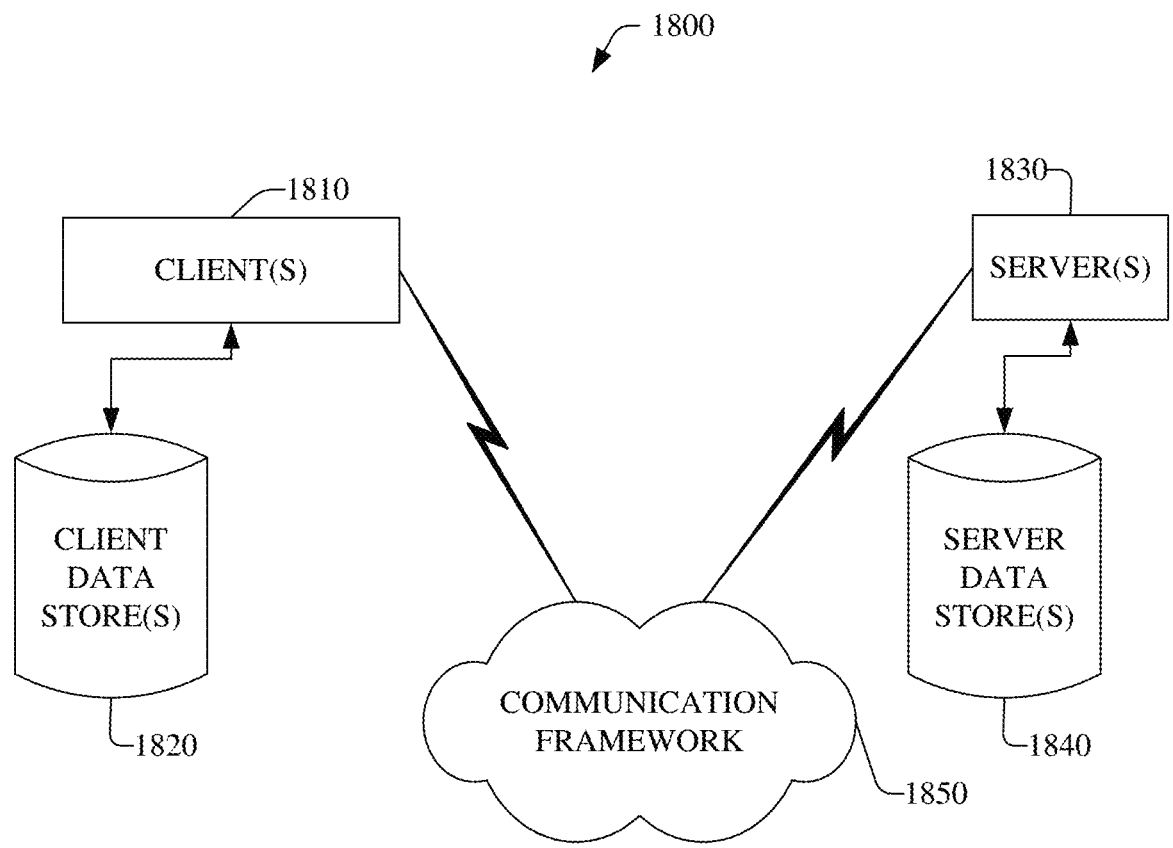
FIG. 18 is a schematic block diagram of a sample-computing environment.

In order to provide a context for the various aspects of the disclosed subject matter, FIGS. 17 and 18 as well as the following discussion are intended to provide a general description of a suitable environment in which the various aspects of the disclosed subject matter can be implemented. FIG. 17 illustrates a block diagram of an example, non-limiting operating environment in which one or more embodiments described herein can be facilitated. Repetitive description of like elements employed in other embodiments described herein is omitted for sake of brevity.

With reference to FIG. 17, a suitable operating environment 1700 for implementing various aspects of this disclosure can also include a computer 1712. The computer 1712 can also include a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714. The system bus 1718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394, IEEE 1494), and Small Computer Systems Interface (SCSI). The system memory 1716 can also include volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1712 also can include removable/non-removable, volatile/non-volatile computer storage media. FIG. 17 illustrates, for example, a disk storage 1724. Disk storage 1724 can also include, but is not limited to, devices like a magnetic disk drive, floppy disk drive, tape drive, Jaz drive, Zip drive, LS-100 drive, flash memory card, or memory stick. The disk storage 1724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used, such as interface 1726. FIG. 17 also depicts software that acts as an intermediary between users and the basic computer resources described in the suitable operating environment 1700. Such software can also include, for example, an operating system 1728. Operating system 1728, which can be stored on disk storage 1724, acts to control and allocate resources of the computer 1712. System applications 1730 take advantage of the management of resources by operating system 1728 through program modules 1732 and program data 1734, e.g., stored either in system memory 1716 or on disk storage 1724. It is to be appreciated that this disclosure can be implemented with various operating systems or combinations of operating systems. A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port can be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a computer, a server, a router, a network PC, a workstation, a microprocessor based appliance, a peer device or other common network node and the like, and typically can also include many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1750 refers to the hardware/software employed to connect the network interface 1748 to the system bus 1718. While communication connection 1750 is shown for illustrative clarity inside computer 1712, it can also be external to computer 1712. The hardware/software for connection to the network interface 1748 can also include, for exemplary purposes only, internal and external technologies such as, modems including regular telephone grade modems, cable modems and DSL modems, ISDN adapters, and Ethernet cards.

FIG. 18 is a schematic block diagram of a sample-computing environment 1800 (e.g., computing system) with which the subject matter of this disclosure can interact. The system 1800 includes one or more client(s) 1810. The client(s) 1810 can be hardware and/or software (e.g., threads, processes, computing devices). The system 1800 also includes one or more server(s) 1830. Thus, system 1800 can correspond to a two-tier client server model or a multi-tier model (e.g., client, middle tier server, data server), amongst other models. The server(s) 1830 can also be hardware and/or software (e.g., threads, processes, computing devices). The servers 1830 can house threads to perform transformations by employing this disclosure, for example. One possible communication between a client 1810 and a server 1830 may be in the form of a data packet transmitted between two or more computer processes.

The system 1800 includes a communication framework 1850 that can be employed to facilitate communications between the client(s) 1810 and the server(s) 1830. The client(s) 1810 are operatively connected to one or more client data store(s) 1820 that can be employed to store information local to the client(s) 1810. Similarly, the server(s) 1830 are operatively connected to one or more server data store(s) 1840 that can be employed to store information local to the servers 1830.

It is to be appreciated and understood that components (e.g., enhanced light device, light component, information component, light management component, sensor component, instrument component, network component, processor component, data store, . . . ), as described with regard to a particular system or method, can include the same or similar functionality as respective components (e.g., respectively named components or similarly named components) as described with regard to other systems or methods disclosed herein.

Embodiments of the disclosed subject matter can be a system, a method, an apparatus and/or a machine (e.g., computer) program product at any possible technical detail level of integration. The machine program product can include a machine (e.g., computer) readable storage medium (or media) having machine readable program instructions thereon for causing a processor to carry out aspects of the disclosed subject matter. The machine readable storage medium can be a tangible device that can retain and store instructions for use by an instruction execution device. The machine readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives machine readable program instructions from the network and forwards the machine readable program instructions for storage in a machine readable storage medium within the respective computing/processing device. Machine readable program instructions for carrying out operations of various aspects of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The machine readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the machine readable program instructions by utilizing state information of the machine readable program instructions to customize the electronic circuitry, in order to perform aspects of the disclosed subject matter.

Aspects of the disclosed subject matter are described herein with reference to flowchart illustrations and/or block diagrams of methods, apparatus (systems), and machine program products according to embodiments of the disclosed subject matter. It will be understood that each block of the flowchart illustrations and/or block diagrams, and combinations of blocks in the flowchart illustrations and/or block diagrams, can be implemented by machine readable program instructions. These machine readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine readable program instructions can also be stored in a machine readable storage medium that can direct a computer, a programmable data processing apparatus, and/or other devices to function in a particular manner, such that the machine readable storage medium having instructions stored therein comprises an article of manufacture including instructions which implement aspects of the function/act specified in the flowchart and/or block diagram block or blocks. The machine readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosed subject matter has been described above in the general context of machine (e.g., computer)-executable instructions of a machine program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the disclosed machine (e.g., computer)-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An enhanced light bulb configured for installation in a light fixture, the enhanced light device comprising:
   a light component configured to emit light;
   one or more sensor components;
   a memory that stores machine-executable components; and
   a processor that executes the machine-executable components stored in the memory, wherein the machine-executable components comprise:
   a light management component configured to:
   determine, via data captured from the one or more sensors, a context of a user in an environment in which the enhanced light device is installed, wherein the context is at least one of a user context of the user, an environment context of the environment, or a device context of a device in the environment, and
   determine information that relates to the environment or the device to present to the user based at least in part on the context.

2. The enhanced light bulb of claim 1, wherein the light management component is further configured present the information that relates to the environment or the device via at least one interface of the enhanced light device or via a communication device associated with the user, and wherein the at least one interface comprises at least one of a display screen, an audio speaker, or a haptic component.

3. The enhanced light bulb of claim 1, wherein the light management component is further configured to determine the information relating to controlling the device based in the context.

4. The enhanced light bulb of claim 1, wherein the light management component is further configured to determine the information relating to controlling a characteristic of the environment based in the context.

5. The enhanced light bulb of claim 1, wherein the light management component is further configured to determine the information based on a user profile of the user.

6. The enhanced light bulb of claim 1, wherein the light management component is further configured to determine at least one action for the enhanced light device to perform in response to detection, via the one or more sensors, of a user action in response to presentation of the information.

7. The enhanced light bulb of claim 1, wherein the light management component is further configured to coordinate an action with at least one device that is not in the environment based on the context.

8. An enhanced light device, the enhanced light device comprising:
- a light fixture;
- a light component configured to emit light, the light component configured for installation in the light fixture;
- one or more sensor components;
- a memory that stores machine-executable components; and
- a processor that executes the machine-executable components stored in the memory, wherein the machine-executable components comprise:
    - a light management component configured to:
        - determine, via data captured from the one or more sensors, a context of a user in an environment in which the enhanced light device is installed, wherein the context is at least one of a user context of the user, an environment context of the environment, or a device context of a device in the environment, and
        - determine information that relates to the environment or the device to present to the user based at least in part on the context.

9. The enhanced light device of claim 8, wherein the light management component is further configured present the information that relates to the environment or the device via at least one interface of the enhanced light device or via a communication device associated with the user, and wherein the at least one interface comprises at least one of a display screen, an audio speaker, or a haptic component.

10. The enhanced light device of claim 8, wherein the light management component is further configured to determine the information relating to controlling the device based in the context.

11. The enhanced light device of claim 8, wherein the light management component is further configured to determine the information relating to controlling a characteristic of the environment based in the context.

12. The enhanced light device of claim 8, wherein the light management component is further configured to determine the information based on a user profile of the user.

13. The enhanced light device of claim 8, wherein the light management component is further configured to determine at least one action for the enhanced light device to perform in response to detection, via the one or more sensors, of a user action in response to presentation of the information.

14. The enhanced light device of claim 8, wherein the light management component is further configured to coordinate an action with at least one device that is not in the environment based on the context.

15. A method comprising:
- determining, by an enhanced light device using one or more sensor components of the enhanced light device, a context of a user in an environment in which the enhanced light device is installed, wherein the context is at least one of a user context of the user, an environment context of the environment, or a device context of a device in the environment, and
- determining, by the enhanced light device, information that relates to the environment or the device to present to the user based at least in part on the context.

16. The method of claim 15, further comprising presenting, by the enhanced light device via at least one interface of the enhanced light device or via a communication device associated with the user, the information that relates to the environment or the device, and wherein the at least one interface comprises at least one of a display screen, an audio speaker, or a haptic component.

17. The method of claim 15, further comprising determining the information relating to controlling the device based in the context.

18. The method of claim 15, further comprising determining the information relating to controlling a characteristic of the environment based in the context.

19. The method of claim 15, further comprising determining the information based on a user profile of the user.

20. The method of claim 15, further comprising determining at least one action for the enhanced light device to perform in response to detection, via the one or more sensors, of a user action in response to presentation of the information.

* * * * *